United States Patent
Fukae et al.

(10) Patent No.: US 8,248,960 B2
(45) Date of Patent: Aug. 21, 2012

(54) DATA TRANSMISSION WITH DYNAMIC MODULATION SCHEME AND/OR TRANSFER RATE

(75) Inventors: Fumihiro Fukae, Sakurai (JP); Koji Sakai, Osaka (JP); Hitoshi Naoe, Nara (JP); Kota Tanaka, Kyoto (JP); Atsuhiro Doi, Tenri (JP)

(73) Assignee: Sharp Kabushiki Kaisha, Osaka (JP)

( * ) Notice: Subject to any disclaimer, the term of this patent is extended or adjusted under 35 U.S.C. 154(b) by 1149 days.

(21) Appl. No.: 12/111,832

(22) Filed: Apr. 29, 2008

(65) Prior Publication Data

US 2008/0279304 A1    Nov. 13, 2008

(30) Foreign Application Priority Data

May 1, 2007    (JP) ................................ 2007-121118
Dec. 27, 2007  (JP) ................................ 2007-338327

(51) Int. Cl.
  *H04J 3/22*   (2006.01)
  *H04B 10/00*  (2006.01)
  *G06F 15/16*  (2006.01)

(52) U.S. Cl. ........ 370/252; 370/467; 375/295; 709/228; 398/107; 398/128

(58) Field of Classification Search .............. 375/295, 375/296; 370/252, 464–469; 709/227, 228; 398/106, 107, 118, 128
See application file for complete search history.

(56) References Cited

U.S. PATENT DOCUMENTS

| | | | | |
|---|---|---|---|---|
| 7,394,987 | B2* | 7/2008 | Hong et al. | 398/106 |
| 7,630,645 | B2* | 12/2009 | Hong et al. | 398/107 |
| 2004/0218598 | A1 | 11/2004 | Kobayashi | |
| 2004/0218599 | A1 | 11/2004 | Kobayashi | |
| 2004/0218624 | A1 | 11/2004 | Kobayashi | |
| 2004/0218625 | A1 | 11/2004 | Kobayashi | |
| 2004/0218627 | A1 | 11/2004 | Kobayashi | |
| 2004/0221056 | A1 | 11/2004 | Kobayashi | |
| 2004/0221312 | A1 | 11/2004 | Kobayashi | |

(Continued)

FOREIGN PATENT DOCUMENTS

JP    9-224069 A    8/1997

(Continued)

OTHER PUBLICATIONS

Naoe et al., Standardization of IrSimple, a High-speed Infrared Communications Protocol, vol. 95, Feb. 2007, pp. 63-68.

(Continued)

*Primary Examiner* — Kerri Rose
(74) *Attorney, Agent, or Firm* — Birch, Stewart, Kolasch & Birch, LLP

(57) ABSTRACT

A plurality of connection frames are transmitted which differ from each other in at least either modulation scheme or transfer rate. Accordingly, a receiving-end device can properly receive a connection frame even in an environment where the connection frame is likely to be affected by noise.

15 Claims, 30 Drawing Sheets

U.S. PATENT DOCUMENTS

| | | |
|---|---|---|
| 2004/0221315 A1 | 11/2004 | Kobayashi |
| 2004/0228365 A1 | 11/2004 | Kobayashi |
| 2004/0233181 A1 | 11/2004 | Kobayashi |
| 2005/0062699 A1 | 3/2005 | Kobayashi |
| 2005/0062711 A1 | 3/2005 | Kobayashi |
| 2005/0066085 A1 | 3/2005 | Kobayashi |
| 2005/0271022 A1 | 12/2005 | Osawa et al. |
| 2006/0083239 A1 | 4/2006 | Kobayashi |
| 2007/0200860 A1 | 8/2007 | Kobayashi |
| 2007/0201492 A1 | 8/2007 | Kobayashi |
| 2007/0258453 A1 | 11/2007 | Kobayashi |
| 2007/0286246 A1 | 12/2007 | Kobayashi |
| 2008/0008172 A1 | 1/2008 | Kobayashi |
| 2008/0246711 A1 | 10/2008 | Kobayashi |
| 2009/0010253 A1 | 1/2009 | Kobayashi |
| 2009/0136232 A1 * | 5/2009 | Yamaguchi et al. .......... 398/128 |
| 2010/0031098 A1 | 2/2010 | Kobayashi |

FOREIGN PATENT DOCUMENTS

| | | | |
|---|---|---|---|
| JP | 11-187075 A | | 7/1999 |
| JP | 2005-51740 A | | 2/2005 |
| JP | 2006-186598 A | | 7/2006 |
| WO | WO2007023888 | * | 3/2007 |

OTHER PUBLICATIONS

Zhang et al., "IrDA Standard and its Application," Optoelectronic IC Technology, vol. 23, No. 4, Dec. 2003, pp. 9-13.

* cited by examiner

FIG. 3

| ADR | SNRM | Source Address | Destination Address | Connection Address | Connection Parameter |

FIG. 18

| PA | STA | Data | CRC | Flush Byte | STO |

STA = '100'101'010'100'100'010'000'001'001'010'101'001'000'001'010'000'.

DATA TRANSMISSION WITH DYNAMIC MODULATION SCHEME AND/OR TRANSFER RATE

This nonprovisional application claims priority under 35 U.S.C. §119(a) on Patent Applications No. filed in Japan on May 1, 2007 and No. filed in Japan on Dec. 27, 2007, the entire contents of which are hereby incorporated by reference.

FIELD OF THE INVENTION

The present invention relates to data transmitting devices which transmit a connection frame containing transmission conditions for a data frame prior to the transmission of the data frame. The invention relates also to data receiving devices which receive data from the data transmitting device and to data transmitting and receiving systems which include the data transmitting device and the data receiving device.

BACKGROUND OF THE INVENTION

Photographs, in recent years, are handled in the form of image data in increasingly more situations as people have come to enjoy widespread use of digital cameras, mobile phones with a built-in camera for a digital camera function, and similar devices. This trend has triggered the proliferation of televisions and like display devices which are capable of displaying photographs transferred from digital cameras, mobile phones, etc. and of printers and like image forming devices which are capable of printing the photographs.

Meanwhile, large volumes of data, such as image data, are more and more frequently transferred between information devices. The transfer of large volumes of data is very often carried out using wireless communication technology. Infrared communications are especially popular among various wireless communication technologies for its advantages listed below:

Unlike radio waves, there is no legal regulation governing the use of infrared frequencies. Global standards can be established.

Transmitters and receivers are compact, lightweight, and inexpensive. Their power consumption is low.

Undesirable information leakage and interference seldom occur because light travels in a straight line. For the same reason, space can be used efficiently.

IrDA standards, established by an industry organization IrDA (Infrared Data Association), is an example set of infrared communications standards. IrDA standards divide into some layers of standards (a hardware layer, a data link layer, a protocol layer, etc.). IrDA standards are especially popular in data transfer between devices like mobile phones, mobile information terminals, laptop computers, digital cameras, printers, and electronic wrist watches over a distance of few meters within a PAN (Personal Area Network).

However, traditional IrDA standards require repeated bidirectional communications for procedures including search for a second party and its identification and negotiation, in order to confirm that both parties are ready for communications. The transfer rate during the repetition of the procedures is specified at a relatively low value, which we regard as a problem. In addition, the procedures inevitably entail some waiting periods which add to the total communications time. This is another problem.

Search for a second party is not always needed in infrared communications because the user often directs the light emitting section of the transmitting-end device at the light receiving section of the receiving-end device by himself/herself before a data transmission. Considering this fact, Japanese Unexamined Patent Publication (Tokukai) No. 2005-347886 (published Dec. 15, 2005; hereinafter, "patent document 1"), as an example, offers switching between IrDA communications and non-IrDA communications. The technology thus achieves high-speed data communications when there is no need to search for potential receiver apparatus in infrared communications. Specifically, the data transmitting device of patent document 1 comprises: first communications means for transmitting data according to IrDA standards; second communications means for transmitting data not according to IrDA standards; and switching means for switching between a process carried out by the first communications means and a process carried out by the second communications means. The second communications means transmits management information for managing data to be transmitted. The data transmitting device then receives, from a device responding to the transmitted management information, communications capability information indicating the communications capability of that device. The data to be transmitted is transmitted in packets based on the received communications capability information. With these procedures implemented, one can omit the search for potential receiver apparatus in infrared communications.

Patent document 1 is an example of proposed high-speed data communication technology viable when there is no need to search for potential receiver apparatus in infrared communications. Other examples include the communications standards called IrSimple and the communications methods based on half-duplex communications mode abbreviated as IrSimpleShot® and IrSS®. For more details of the IrSimple, see "Standardization of High-speed Infrared Communications Protocol IrSimple" by NAOE Hitoshi, et al. Sharp Technical Report, Vol. 95, February, 2007, page 63-68.

FIG. 16 shows transmission timing for a connection frame SNRM (SIR (9,600 bps)-RZI) and data frames UI (FIR (4 Mbps)-4 ppm) in conventional IrSS-based half-duplex communications. As shown in the figure, in IrSS-based infrared communications, an SNRM (Set Normal Response Mode) frame is transmitted prior to the transmission of data frames (UI (Unnumbered Information) frames) in FIR (fast infrared) mode. The SNRM frame is a connection frame (communications information messaging frame) in low-speed SIR (serial infrared) mode (9,600 bps). The "frame" in this context is identical in meaning to the term frame typically used in the field of communications and refers to a chunk of information with a defined beginning and end. The "connection frame" is a collection of information needed to establish a communicable link between a transmission-end device and a receiving-end device.

Discussion is in progress also on communications using visible light which has similar properties to infrared radiation. Applications to half-duplex communications like IrSS are especially expected.

However, with the conventional technology above, the receiving-end device is sensitive to infrared noise produced by, for example, a liquid crystal television containing a cold cathode tube, a plasma television, or an inverter-type fluorescence lamp. The device may not be able to receive the connection frame normally, hence possibly failing to properly receive data frames which are transmitted following the connection frame.

FIG. 17 shows a signal pattern in SIR mode. As shown in the figure, the data bits 0 and 1 in the RZI (Return to Zero Inversion) modulation used in SIR mode are represented by the presence and absence of a pulse during a predetermined period. For example, in the SIR mode (9,600 bps) used for the transmission of a connection frame, a pulse, 1.41 μsec to 22.13 μsec wide, is inserted in a period of about 104 μsec for a data bit 0, whilst no pulse is inserted in a period of about 104 μsec for a data bit 1.

The connection frame that should be received in SIR mode may be buried in noise in an environment where there are a lot of infrared noise pulses, about a few microsecond to a dozen microsecond wide: for example, when there is an inverter-type fluorescence lamp near the receiving device. The noise could be erroneously recognized as pulses representing data bits and disrupts normal reception of the connection frame. As a result, the receiving-end device fails to switch to FIR mode for data frame reception and cannot receive data frames transmitted in FIR mode.

Also, it is known that IrSS-based infrared communications can be disrupted when the receiving device is a liquid crystal television containing a cold cathode tube, a plasma television, or a like device which emits infrared noise. The radiant infrared may reflect off a human body or a physical object and produce infrared noise pulses, about a few microsecond to a dozen microsecond wide, disrupting the communications similarly to the previous case. The adverse effect of infrared noise produced by the reflection off a human body is especially obtrusive in IrSS-based infrared communications because the user holds a transmission-end terminal and approaches the infrared receiving section of a receiving-end device up to a distance of about 20 cm to 1 m, for manipulation. Infrared noise is also known to increase when the temperature of the cold cathode tube falls below about 0° C. to 10° C. For example, if the liquid crystal television is powered on at low temperature, in some cases, it takes about 10 minutes to raise the temperature of the cold cathode tube and reduce the effect of infrared noise.

The infrared noise again seriously affect the reception of the connection frame if the receiving circuit in the receiving-end device contains AGC (Auto Gain Control). AGC functions to reduce gain for a strong reception signal and increase gain for a weak reception signal, in order to maintain the amplified signal level at a constant value. The infrared noise, as mentioned above, is a result of the reflection off a human body or a physical object. Since the reception signal level is generally weak, the AGC works to increase gain. Therefore, the AGC operates to increase the gain, for example, during the non-pulse period representing a 0 during the reception of an SIR-mode connection frame (9,600 bps). The infrared noise, otherwise buried in the connection frame, could be erroneously recognized as a reception signal (pulses representing data bits).

The non-pulse period during frame transmission is longer in SIR mode (9,600 bps) than, for example, in SIR mode (115.2 kbps) and FIR mode (4 Mbps). In the receiving-end device, the AGC operates to increase gain for infrared noise, which adds to the chances of erroneously recognizing the infrared noise as a reception signal.

Infrared noise could hamper data reception by the data transmitting device of patent document 1 as in the previous cases when it is used in half-duplex infrared communications in which the management packet (connection frame) and the image data (data frames) are transmitted by different signal formats. More specifically, If the signal format used for the transmission of the connection frame is more sensitive to infrared noise than the signal format used for the transmission of the data frames as in IrSS-based infrared communications, the connection frames may not normally be received due to the infrared noise, making it difficult to receive the data frames.

Future infrared communication technologies will likely involve specifications which develop from IrDA standards, like IrSS, and would have the same nature as IrSS. In addition, given the same modulation scheme, noise resistance can still be improved by introducing error recovery by error correcting code, for example, Reed-Solomon code. However, it is not easy to change the signal format for the connection frame that is transmitted before any other frame, while securing compatibility with traditional standards. It is unlikely that the signal format for the connection frames will ever be changed.

The description above is concerned with problems of conventional data transmitting devices which transmit a connection frame and data frames by infrared communications. Similar problems occur with data transmitting devices which transmit a connection frame containing transmission conditions for the data frames using a non-infrared transmission medium before the data frames are transmitted.

SUMMARY OF THE INVENTION

The present invention, conceived to address the conventional problems, has an objective of properly transmitting/receiving data frames in an environment where the connection frame could be easily affected by noise.

A first data transmitting device in accordance with the present invention is, to solve the problems, characterized in that the data transmitting device includes: a modulating section for modulating frames to be transmitted to a data receiving device; and a transmitting section for transmitting the modulated frames to the data receiving device, wherein the data transmitting device transmits, to the data receiving device, a plurality of connection frames each representing a transmission condition for data frames containing content information before transmitting the data frames to the data receiving device, the plurality of connection frames differing from each other in at least either one of modulation scheme and transfer rate.

According to the first data transmitting device, a receiving-end device can receive a plurality of connection frames differing from each other in either one of modulation scheme and transfer rate. Even if the receiving-end device cannot normally receive one of the connection frames, the receiving-end device will likely normally receive the other connection frame, different from that connection frame in either modulation scheme or transfer rate. Accordingly, the receiving-end device will likely be able to control the reception of the data frames in accordance with the normally received connection frame. The receiving-end device can properly receive the data frames in an environment where one of the connection frames is prone to noise.

A second data transmitting device in accordance with the present invention is, to solve the problems, characterized in that the data transmitting device includes: a modulating section for modulating frames to be transmitted to a data receiving device; and a transmitting section for transmitting the modulated frames to the data receiving device, wherein the data transmitting device transmits, to the data receiving device, a connection frame representing a transmission condition for data frames containing content information before transmitting the data frames to the data receiving device, the connection frame being modulated either by a scheme according to which values contained in the connection frame are represented by positions of pulses on a time axis in a predetermined period or by a scheme according to which values of data bits are not successively identical more than or equal to a predetermined number of times.

The modulation scheme according to which data values are represented by positions of pulses on a time axis in a predetermined period and the modulation scheme according to which values of data bits are not successively identical more than or equal to a predetermined number of times are less likely to be affected by noise than the modulation scheme according to which data values are represented by presence and absence of a pulse in a predetermined period.

Therefore, according to the second data transmitting device, the receiving-end device will likely normally receive the connection frame in an environment where the connection frame is prone to noise when compared with the conventional configuration in which a connection frame is transmitted by a modulation scheme according to which data values are represented by presence and absence of a pulse in a predetermined period (RZI).

A data receiving device of the present invention is, to solve the problems, characterized in that the data receiving device receives data frames containing content information from a data transmitting device which, before transmitting the data frames, transmits a connection frame representing a transmission condition for the data frames, wherein the data transmitting device either transmits the data frames according to a first transmission condition and the connection frame according to a second transmission condition differing from the first transmission condition in at least either one of modulation scheme and transfer rate or transmits the data frames according to the first transmission condition and the connection frame according to both the first transmission condition and the second transmission condition, the data receiving device including: a receiving section for receiving frames from the data transmitting device; and a demodulating section for demodulating the frames received by the receiving section, wherein: in a reception standby state before receiving the connection frame, the receiving section is set up to receive a frame transmitted according to the first transmission condition, and the demodulating section is set up to demodulate the frame received by the receiving section according to the first transmission condition; and if the frame demodulated by the demodulating section is a data frame, the data receiving device receives and demodulates those data frames transmitted subsequently to that data frame according to the first transmission condition.

According to the data receiving device, in a reception standby state before receiving the connection frame, the receiving section is set up to receive a frame transmitted according to the first transmission condition, and the demodulating section is set up to demodulate the incoming frame according to the first transmission condition. If the demodulated frame is a data frame, the data receiving device receives and demodulates those data frames transmitted subsequently to that data frame according to the first transmission condition. Accordingly, even when it is difficult to receive the connection frame transmitted according to the second transmission condition, the data receiving device can receive the data frames transmitted according to the first transmission condition with enhanced reliability.

Additional objects, advantages and novel features of the invention will be set forth in part in the description which follows, and in part will become apparent to those skilled in the art upon examination of the following or may be learned by practice of the invention.

BRIEF DESCRIPTION OF THE DRAWINGS

FIG. 3 shows an example of a connection frame in SNRM frame format.

FIG. 18 shows an example of a physical layer frame format in VFIR mode.

DESCRIPTION OF THE EMBODIMENTS

Embodiment 1

Figure 2:
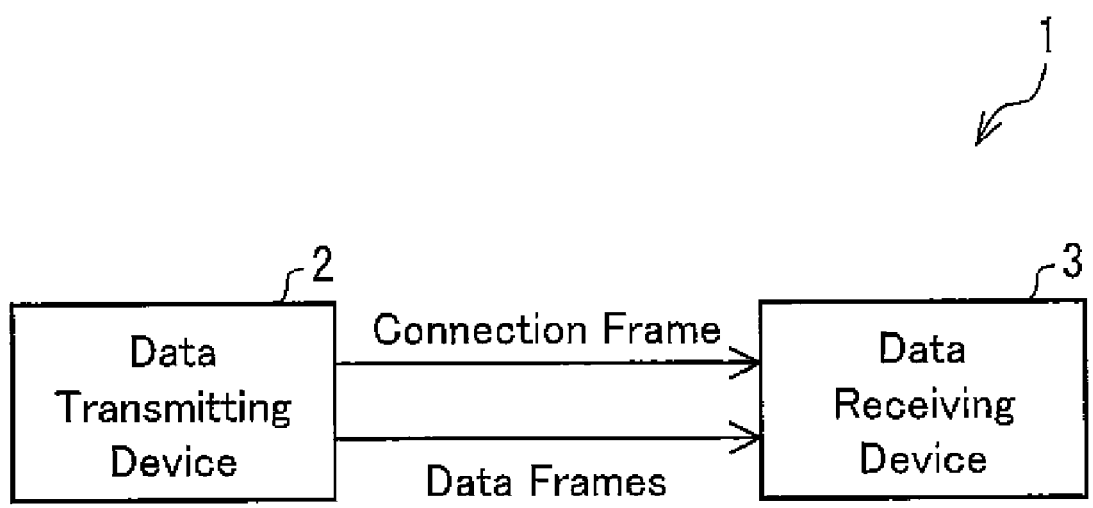
FIG. 2 schematically shows a data transmitting and receiving system of an embodiment of the present invention.

An embodiment of the present invention will be described. FIG. 2 schematically shows a data transmitting and receiving system 1 of the present embodiment.

1. Configuration of Data Transmitting and Receiving System 1

As shown in the figure, the data transmitting and receiving system 1 includes a data transmitting device 2 and a data receiving device 3. The data transmitting and receiving system 1 is adapted to transmit the data (for example, image data) stored in the data transmitting device 2 to another data receiving device by infrared communications using a communications method called IrSS.

The data transmitting device 2 and the data receiving device 3 provide an infrared communications device capable of wireless data communications with infrared as the communications medium. The data transmitting device 2 may be mounted to, for example, a mobile phone with a built-in camera, a laptop personal computer, a PDA, a digital camera, or a like electronic device. The data receiving device 3 may be mounted to, for example, a television monitor, such as a liquid crystal television, or an electronic device, such as a display monitor or an image server. Apart from these examples, the data transmitting device 2 and the data receiving device 3 may be applied to any other device so long as the device either transmit or receive data.

2. Configuration of Data Transmitting Device 2

Figure 1:
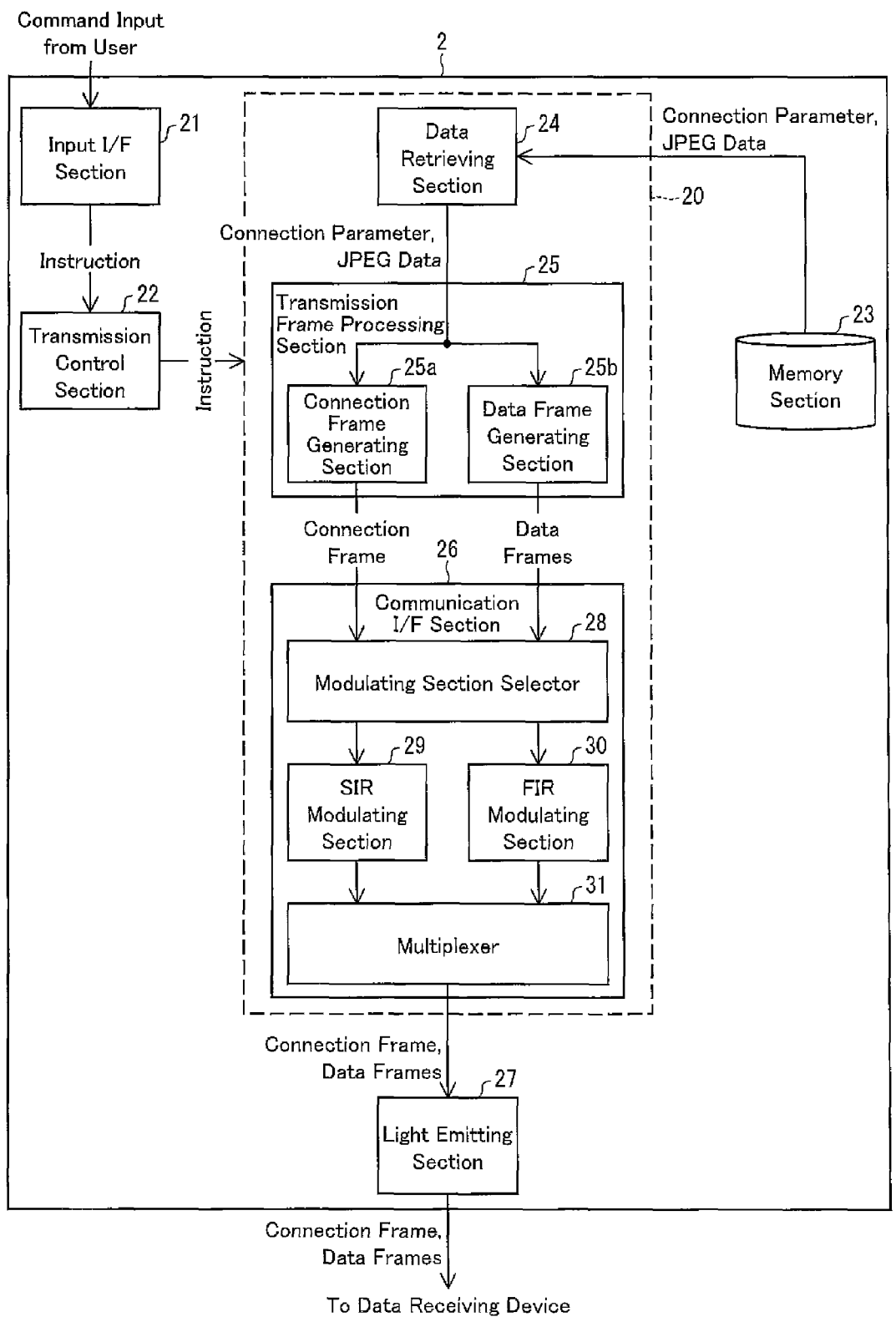
FIG. 1 is a schematic block diagram of a data transmitting device of an embodiment of the present invention.

FIG. 1 is a schematic functional block diagram of the data transmitting device 2. As shown in the figure, the data transmitting device 2 includes an input I/F section 21, a transmission control section 22, a memory section 23, a transmission processing section 20, and a light emitting section 27. The transmission processing section 20 includes a data retrieving section 24, a transmission frame processing section 25, and a communication I/F section 26. The present embodiment will discuss examples in which JPEG data (image data) frames are transmitted as data frames from the data transmitting device 2 to the data receiving device 3. However, this is not the only possibility; the data frames transmitted from the data transmitting device 2 to the data receiving device 3 may contain other content data (for example, image data encoded by a different method, text data, or audio data).

The input I/F section 21 is an interface receiving command inputs from the user made on a manipulation input section (not shown). Examples of the commands include a command by which JPEG data to be transmitted is selected and a command by which JPEG data is transmitted.

The transmission control section 22 controls the operation of the various sections of the data transmitting device 2. According to the contents of a transmit request received by the input I/F section 21 from the user, the transmission control section 22 controls the generation of frames in a predetermined frame format, the modulation of the generated frames by a predetermined modulation scheme, and the transmission by the controls the data receiving device 3. The processing performed by the transmission control section 22 will be detailed later.

The memory section 23 is storage means for storing image data (content data), such as JPEG data. The section 23 stores also connection parameters representing such as frame transmission conditions and other information, OS (Operating System) programs, various information used in the data transmitting device 2, and control programs for the various sections of the data transmitting device 2. The memory section 23 may be non-volatile storage means, such as a flash memory.

The transmission processing section 20 includes a data retrieving section 24, a transmission frame processing section 25, and a communication I/F section 26.

The data retrieving section 24 retrieves data from the memory section 23 according to instructions from the transmission control section 22 and feeds the data to the transmission frame processing section 25 or the transmission control section 22.

The transmission frame processing section 25 generates IrSS frames for data to be transmitted according to instructions from the transmission control section 22. The section 25 includes a connection frame generating section 25a and a data frame generating section 25b.

Upon reception of an instruction to generate a connection frame from the transmission control section 22, the connection frame generating section 25a generates a connection frame (SNRM frame; communications information messaging frame) in SNRM frame format according to the connection parameters retrieved by the data retrieving section 24 from the memory section 23 and sends the connection frame to a modulating section selector 28 in the communication I/F section 26. The connection frame contains conditions (ex. a bit rate) and other information on the transmission of data frames which will be transmitted subsequently to the connection frame. FIG. 3 shows an example of a connection frame in SNRM frame format.

Figure 4:
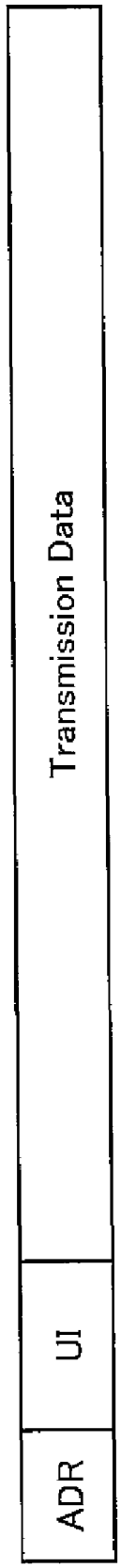
FIG. 4 shows an example of a data frame in UI frame format.

Upon reception of an instruction to generate data frames from the transmission control section 22, the data frame generating section 25b generates data frames (UI frames) in UI frame format according to the data retrieved by the data retrieving section 24 from the memory section 23 and feeds the data frames to the modulating section selector 28 in the communication I/F section 26. FIG. 4 shows an example of a data frame in UI frame format.

The communication I/F section 26 includes a modulating section selector 28, an SIR modulating section 29, an FIR modulating section 30, and a multiplexer 31.

The modulating section selector 28 passes the incoming frames (connection and data frames) from the transmission frame processing section 25 onto the SIR modulating section 29 or the FIR modulating section 30 according to an instruction from the transmission control section 22. More specifically, in response to the instruction from the transmission control section 22, in SIR mode, that is, to realize communications according to a set of protocols specified as SIR, the selector 28 passes the incoming frames from the transmission frame processing section 25 to the SIR modulating section 29. In contrast, in FIR mode, that is, to realize communications according to a set of protocols specified as FIR, the selector 28 passes the incoming frames from the transmission frame processing section 25 to the FIR modulating section 30.

The SIR modulating section 29 modulates the incoming frames from the transmission frame processing section 25 by a method which matches SIR mode and outputs the modulated frames to the light emitting section 27.

Figure 5:
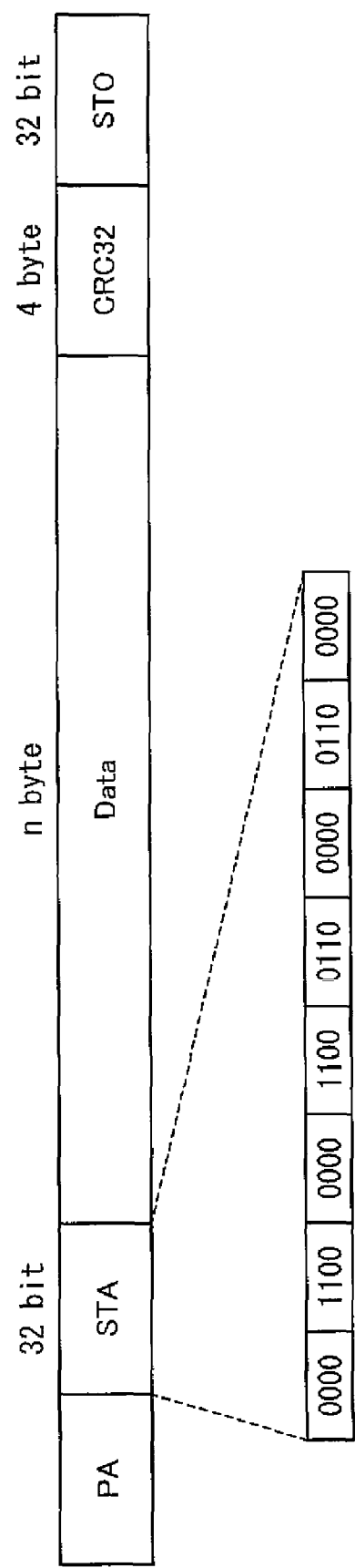
FIG. 5 shows an example of a physical layer frame format in FIR mode.

The FIR modulating section 30 modulates the incoming frames from the transmission frame processing section 25 by a method which matches FIR mode and outputs the modulated frames (physical layer frames) to the light emitting section 27. FIG. 5 shows an example of a physical layer frame format in FIR mode.

If SIR mode is selected according to an instruction from the transmission control section 22, the multiplexer 31 outputs the output of the SIR modulating section 29 to the light emitting section 27. If FIR mode is selected, the multiplexer 31 outputs the output of the FIR modulating section 30 to the light emitting section 27.

The light emitting section 27 is a light emitting module (light emitting element) for infrared communications. The section 27 is built around an infrared LED (light emitting diode) or LD (laser diode) for data transmission. The light emitting section 27, when set up for SIR mode according to an instruction from the transmission control section 22, transmits frames at bit rate of 9,600 bps and when set up for FIR mode, transmits frames at a bit rate of 4 Mbps.

Figure 17:
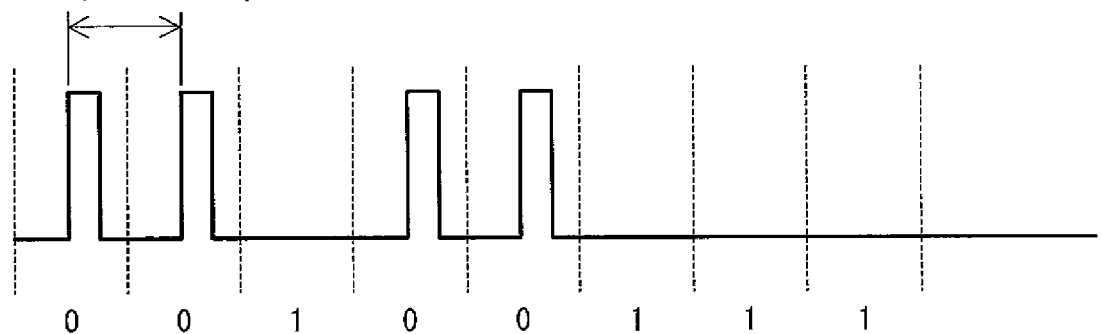
FIG. 17 shows a signal pattern transmitted in SIR mode.

The signal format used in SIR mode follows RZI (Return to Zero Inversion) modulation. As illustrated in FIG. 17 described above, when the bit rate is 9,600 bps, a 0 and a 1 are represented by the presence and absence of an infrared pulse, 1.41 μsec to 22.13 μsec wide, in a period of about 104 μsec. Specifically, in RZI modulation, a 1 and a 0 are represented by generating a pulse in the period of about 104 μsec for data 0 and no pulse in the period of about 104 μsec for data 1.

In the signal format used in SIR mode, if the bit rate is 9,600 bps, the duty drops to about 2% when a no-pulse state (as a result of sending 1 s) continues for an extended period of time. When that happens, the AGC (automatic gain controller) in the data receiving device 3 operates to increase the gain, making it more likely that infrared noise is erroneously recognized as a pulse representing a 0. Therefore, SIR mode is easily affected by infrared noise (communications errors are likely in the presence of infrared noise).

Figure 6:
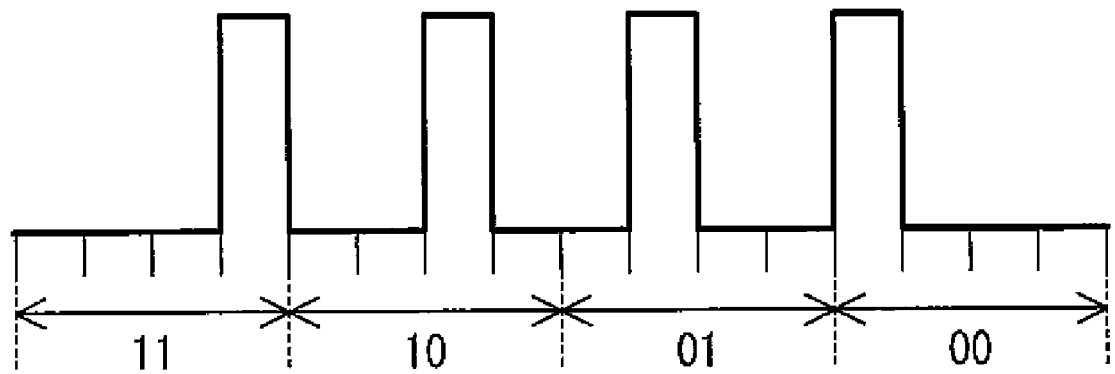
FIG. 6 shows a signal format for FIR modulation.

FIG. 6 shows a light emitting pattern for the light emitting section 27 in FIR mode, that is, a signal format for FIR modulation. As shown in the figure, the signal format used in FIR mode follows 4 PPM (4 Pulse Position Modulation) modulation. 2-bit data is represented by the position (on the time axis) of an infrared pulse, about 125 nsec wide, in a period of about 500 nsec.

In the signal format used in FIR mode, as illustrated in FIG. 6, the duty is constant at 25% since an infrared pulse of a specified width (about 125 nsec) appears at a certain rate (once about 500 nsec). The AGC (automatic gain controller) in the data receiving device 3 is capable of distinguishing unambiguously between the signals (infrared pulses) and noise. Therefore, FIR mode is a modulation scheme which is relatively resistant to infrared noise (communications errors are unlikely in the presence of infrared noise) when compared to SIR mode.

3. Configuration of Data Receiving Device 3

Figure 7:
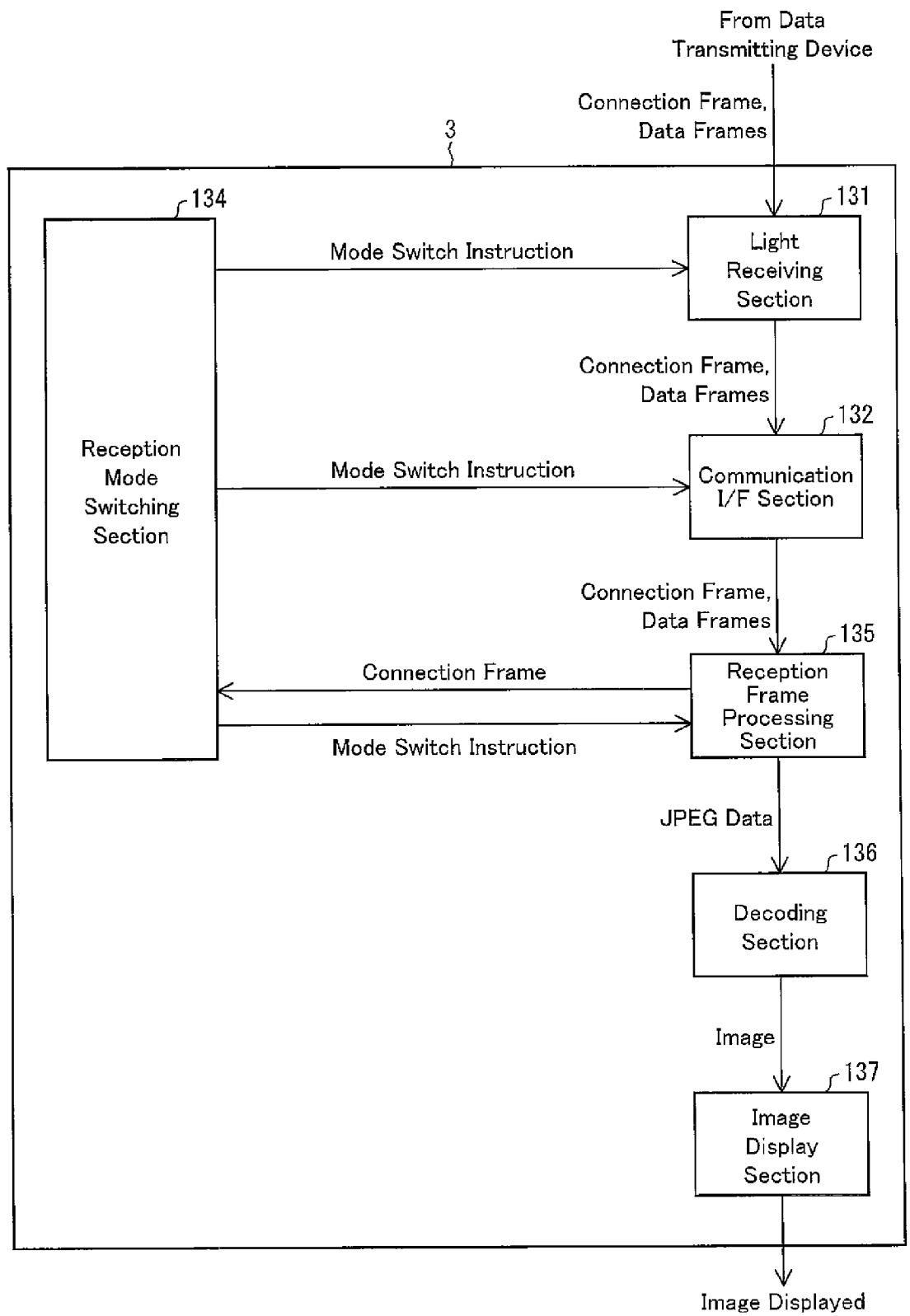
FIG. 7 is a block diagram of an example of a data receiving device contained in a data transmitting and receiving system of an embodiment of the present invention.

FIG. 7 is a schematic block diagram of the data receiving device 3. As shown in the figure, the data receiving device 3 includes a light receiving section (receiving section) 131, a communication I/F section 132, a reception mode switching section 134, a reception frame processing section 135, a decoding section 136, and an image display section 137.

The light receiving section 131 is a light receiving module (light receiving element) for infrared communications. The section 131 is built around a photo diode for data reception. The light receiving section 131 receives frames by sensing lighting-on/off of the light emitting section 27 in the data transmitting device 2 using the photo diode. The light receiving section 131 is switchable between SIR mode and FIR mode according to an instruction from the reception mode switching section 134. The section 131, when set up for SIR mode, receives SIR frames (frames transmitted in SIR mode). When set up for FIR mode, the section 131 receives FIR frames (frames transmitted in FIR mode). The light receiving section 131 passes the received frames (connection and data frames) to the communication I/F section 132.

The light receiving section 131 includes an amplifier amplifying incoming signals and an AGC adjusting the gain by the amplifier. The AGC changes the built-in amplifier's gain and bandwidth according to the signal format for the mode that matches an instruction from the reception mode switching section 134. The specifications as to the light reception sensitivity of the light receiving section 131 differ between SIR mode and FIR mode: 4 μW/cm$^2$ for SIR mode and 10 μW/cm$^2$ for FIR mode. The section 131 receives weaker infrared light in SIR mode than in FIR mode. In this respect, SIR mode is again prone to infrared noise when compared to FIR mode.

The communication I/F section 132 switches the light receiving section 131 between the light receiving modes according to an instruction (mode switch instruction) from the reception mode switching section (reception control section) 134. The communication I/F section 132 turns the light receiving section 131 into SIR mode if the section 132 receives an instruction to switch to SIR mode from the reception mode switching section 134 and into FIR mode if the section 132 receives an instruction to switch to FIR mode from the reception mode switching section 134.

The reception frame processing section 135 demodulates frames fed from the communication I/F section 132. In addition, the section 135 is switched between SIR mode and FIR mode according to an instruction (mode switch instruction) from the reception mode switching section 134. If the demodulated frame is a connection frame, the reception frame processing section 135 passes the connection frame onto the reception mode switching section 134. Meanwhile, if the demodulated frame is a data frame, the section 135 stores the data frames passed from the communication I/F section 132 in memory (not shown), and upon having collected all the data frames, reproduces the JPEG data for output to the decoding section 136.

The reception mode switching section (reception control section) 134 generates a mode switch instruction signal according to the information contained in the connection frame received from the reception frame processing section 135. The section 134 outputs the signal to the light receiving section 131, the communication I/F section 132, and the reception frame processing section 135. For example, the light receiving section 131, the communication I/F section 132, and the reception frame processing section 135 are defaulted to operate in SIR mode. The section 134, upon receiving a connection frame, generates a mode switch instruction signal according to the transmission conditions, (ex. bit rate) for subsequent data frames, communicated by the connection frame. Accordingly, for example, when the connection frame contains information that the bit rate for the subsequent data frames should be 4 Mbps, the section 134 sets up the light receiving section 131, the communication I/F section 132, and the reception frame processing section 135 so that the sections 131, 132, and 135 can receive data frames at the bit rate of 4 Mbps.

The decoding section 136 decodes the JPEG data supplied from the reception frame processing section 135 into an image. The image display section 137 displays the image obtained by the decoding in the decoding section 136.

4. Operation of Data Transmitting Device 2

Figure 8:
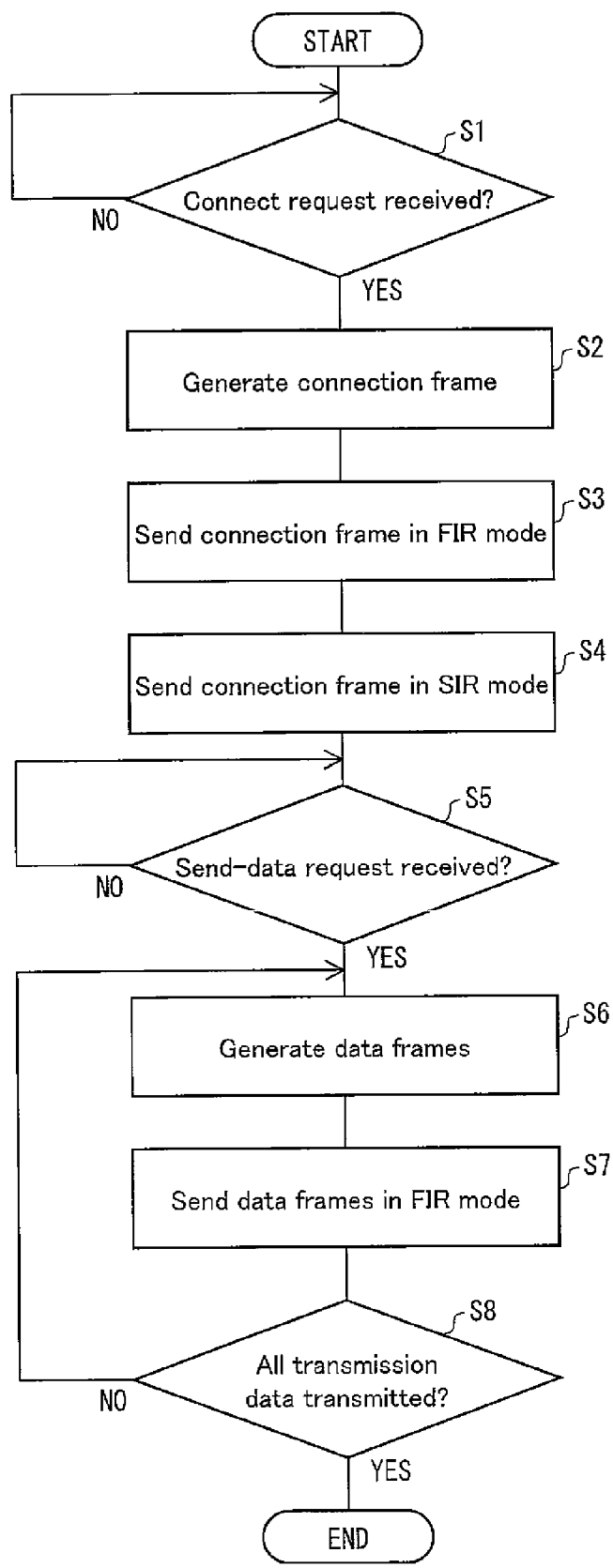
FIG. 8 is a flow chart illustrating processing in the data transmitting device shown in FIG. 1.
Figure 9:
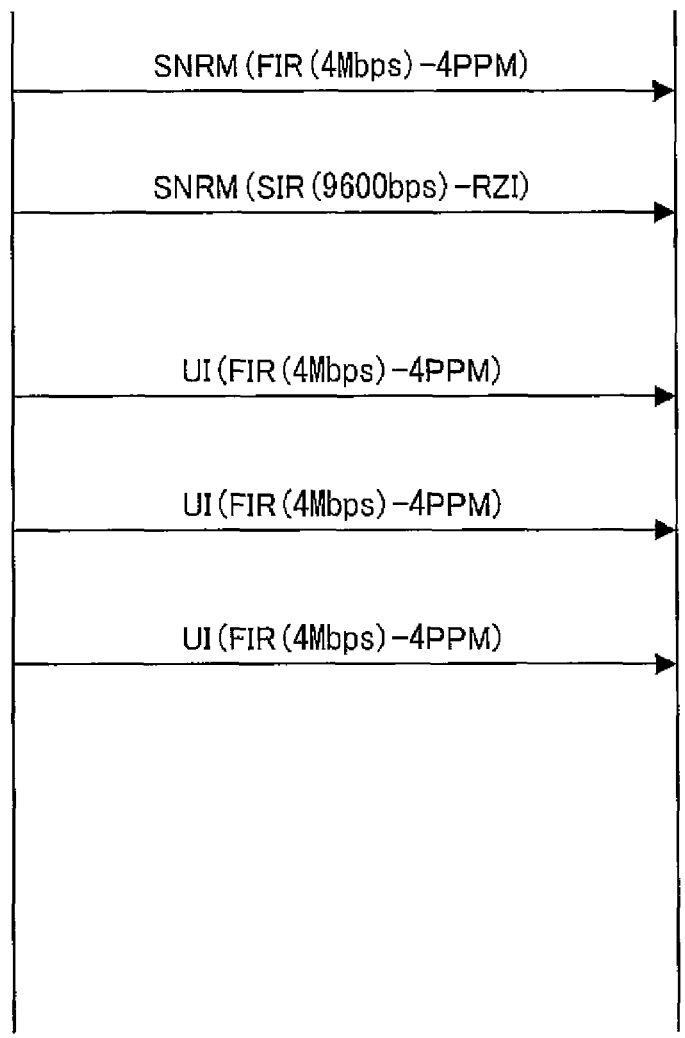
FIG. 9 shows frames transmitted from the data transmitting device shown in FIG. 1 and transmission timings for the frames.

FIG. 8 is a flow chart illustrating a process flow in the data transmitting device 2. FIG. 9 also shows frames transmitted from the data transmitting device 2 to the data receiving device 3 and transmission timings for the frames.

As illustrated in FIG. 8, the transmission control section 22 is monitoring the input I/F section 21 for an incoming connect request (S1). Upon reception of a connect request, the transmission control section 22 outputs an instruction to the various sections in the transmission processing section 20 to generate a connection frame according to the contents of the received connect request (S2). Specifically, the section 22 controls the data retrieving section 24 to retrieve connection parameters from the memory section 23 according to the connect request and passes the parameters to the connection frame generating section 25a. The section 22 also controls the connection frame generating section 25a to generate a connection frame according to the connection parameters fed from the data retrieving section 24.

Next, under the control of the transmission control section 22, the generated connection frame is transmitted to the data receiving device 3 in FIR mode (S3). More specifically, the transmission control section 22 controls the modulating section selector 28 to feed the output (connection frame) of the connection frame generating section 25a to the FIR modulating section 30, controls the FIR modulating section 30 to modulate the connection frame by a modulation scheme which matches FIR mode, and controls the multiplexer 31 to feed the output (connection frame) of the FIR modulating section 30 to the light emitting section 27. The transmission control section 22 then controls the light emitting section 27 to transmit the connection frame fed via the multiplexer 31 at a bit rate which matches FIR mode (here, at 4 Mbps) (transmit "SNRM (FIR (4 Mbps)-4 ppm)" shown in FIG. 9).

Next, under the control of the transmission control section 22, the connection frame generated in S2 is transmitted to the data receiving device 3 in SIR mode (S4). The transmission control section 22 controls the modulating section selector 28 to feed the output (connection frame) of the connection frame generating section 25a to the SIR modulating section 29, controls the SIR modulating section 29 to modulate the connection frame by a modulation scheme which matches SIR mode, and controls the multiplexer 31 to feed the output (connection frame) of the SIR modulating section 29 to the light emitting section 27. Then, the transmission control section 22 controls the light emitting section 27 to transmit the connection frame fed via the multiplexer 31 at a bit rate which matches SIR mode (here, at 9,600 bps) (transmit "SNRM (SIR (9,600 bps)-RZI)" shown in FIG. 9).

The connection frame generated in S2 may be temporarily stored in the memory section 23, another memory, or a buffer, and after the connection frame is transmitted in FIR mode in S3, retrieved from that memory for transmission in SIR mode. Alternatively, the connection frame generated in S2 may be modulated simultaneously by a modulation scheme which matches FIR mode and by a modulation scheme which matches SIR mode, and the result of the modulation according to SIR mode be temporarily stored in the memory section 23, another memory, or a buffer. After the connection frame is transmitted in FIR mode in S3, the connection frame modulated for SIR mode and then stored may be retrieved for transmission in SIR mode. Further alternatively, after the connection frame is transmitted in FIR mode in S3, S2 is carried out again to generate a connection frame for transmission in SIR mode.

Thereafter, the transmission control section 22 determines whether or not a send-data request has been received (S5). If not, the section 22 continues to monitor for an incoming send-data request. The connect request and the send-data request may be input simultaneously.

On the other hand, if a send-data request has been received, the transmission control section 22 sends a data frame generate instruction to the various sections in the transmission processing section 20 according to the contents of the received send-data request (S6). Specifically, the section 22 controls the data retrieving section 24 to retrieve transmission data (here, JPEG data) from the memory section 23 for transfer to the data frame generating section 25b according to the send-data request. The section 22 furthermore controls the data frame generating section 25b to generate data frames according to the transmission data to be sent from the data retrieving section 24.

Next, under the control of the transmission control section 22, the generated data frames are transmitted to the data receiving device 3 in FIR mode (S7). More specifically, the transmission control section 22 controls the modulating section selector 28 to feed the output (data frames) of the data frame generating section 25b to the FIR modulating section 30, controls the FIR modulating section 30 to modulate the data frames by a modulation scheme which matches FIR mode, and controls the multiplexer 31 to feed the output (data frames) of the FIR modulating section 30 to the light emitting section 27. The transmission control section 22 then controls the light emitting section 27 to transmit the data frames fed via the multiplexer 31 at a bit rate which matches FIR mode (here, at 4 Mbps) (transmit "UI (FIR (4 Mbps)-4 ppm)" shown in FIG. 9).

Thereafter, the transmission control section 22 determines whether or not all transmission data has been transmitted (S8). If there remains transmission data yet to be transmitted, the section 22 continues by implementing S6 and S7. On the other hand, if the transmission of all the transmission data has been completed, the section 22 ends the process.

As described in the foregoing, the data transmitting device 2 in accordance with the present embodiment transmits an SIR-mode connection frame and an FIR-mode connection frame. The data receiving device 3 in accordance with the present embodiment is capable of receiving a connection frame both in SIR mode and in FIR mode (includes an FIR demodulating circuit demodulating FIR mode frames). Therefore, according to the data transmitting device 2 and the data receiving device 3 in accordance with the present embodiment, the data receiving device 3 is capable of receiving a connection frame modulated by a modulation scheme which is less likely to be affected by infrared noise than SIR mode. Therefore, the data receiving device can receive the connection frame normally even in a communications environment where there is so much infrared noise that it would otherwise be difficult to receive the connection frame normally in SIR mode (for example, when the communications are performed over a long distance, when there is a liquid crystal television containing a cold cathode tub, a plasma television, or an inverter-type fluorescence lamp in the proximity of the transmission path, or when the data receiving device is a liquid crystal television containing a cold cathode tube, a plasma television, or a like device which emits infrared noise). The data receiving device can properly switch to a reception mode which matches the transmission mode for the data frames.

In the data receiving device 3, if the FIR-mode connection frame transmitted prior to the SIR-mode connection frame is normally received as illustrated in FIG. 8, the SIR-mode connection frame to be subsequently transmitted may be ignored. Accordingly, the data frames can be received in accordance with a connection frame modulated by a modulation scheme which is relatively unlikely to be affected by infrared noise, and the data frames can be received properly (the data transmitting device 2 and the data receiving device 3 can be connected properly to each other).

In the present embodiment, the data receiving device 3 is capable of receiving a connection frame both in SIR mode and in FIR mode. This is by no means intended to be limiting the invention. For example, the conventional data receiving device may be used which is not capable of receiving (or recognizing) an FIR-mode connection frame, but is only capable of receiving an SIR-mode connection frame.

In that case, although an FIR-mode connection frame cannot be received, a connection frame subsequently transmitted in SIR mode can be received, and the data frames can be received in accordance with the SIR-mode connection frame. In other words, if the data receiving device is not capable of receiving an FIR-mode connection frame, the data receiving device ignores the FIR-mode connection frame without recognizing it as a connection frame. By receiving an SIR-mode connection frame transmitted subsequently to the FIR-mode connection frame, the data receiving device can receive data frames in accordance with this SIR-mode connection frame.

In this manner, in the present embodiment, the data transmitting device 2 transmits both an SIR-mode connection frame and an FIR-mode connection frame. Therefore, if the data receiving device can receive a connection frame in both modes, the data receiving device can receive data frames in accordance with the connection frame in FIR mode which is less likely to be affected by infrared noise and hence more reliable; if the data receiving device cannot receive a connection frame in FIR mode, the data receiving device can receive data frames in accordance with the connection frame in SIR mode. In other words, the data transmitting device 2 in accordance with the present embodiment performs conventional communications with the conventional data receiving device which is capable of receiving a connection frame only in SIR mode and performs more reliable communications with a data receiving device which is capable of receiving a connection frame both in SIR mode and in FIR mode than conventional communications (has "upward compatibility").

Furthermore, in the present embodiment, a connection frame is transmitted in FIR mode before another one is transmitted in SIR mode. However, this is not the only possibility: a connection frame may be transmitted in SIR mode before another one is transmitted in FIR mode.

In that case, for example, if the data receiving device has received a connection frame both in SIR mode and in FIR mode or if the device has received a connection frame only in FIR mode, failing to normally receive a connection frame in SIR mode, the device can still receive data frames in accordance with the FIR-mode connection frame. If the device has normally received a connection frame in SIR mode, the device may ignore a connection frame which is subsequently transmitted in FIR mode, only receiving data frames in accordance with the SIR-mode connection frame.

In the present embodiment, connection frames are transmitted, one in SIR mode and the other in FIR mode. This is not the only possibility; connection frames may be transmitted, one in SIR mode and another in a modulation scheme which is less likely to be affected by infrared noise than the modulation scheme for SIR mode.

Examples of the modulation scheme which is less likely to affected by infrared noise than the modulation scheme for SIR mode include those modulation schemes which represent the value of a data bit by the position (on the time axis) of a pulse in a predetermined period of time, unlike those modulation schemes which represent the value of a data bit by the presence or absence of a pulse in a predetermined period as in RZI modulation.

Examples of transmission modes using such a modulation scheme include VFIR mode (HHH (1,13) modulation) as well as FIR mode. Therefore, the FIR modulating section 30 may be replaced with a VFIR modulating section (not shown) so that a connection frame can be sent by a modulation scheme in accordance with VFIR mode (HHH (1,13) modulation).

Figure 10:
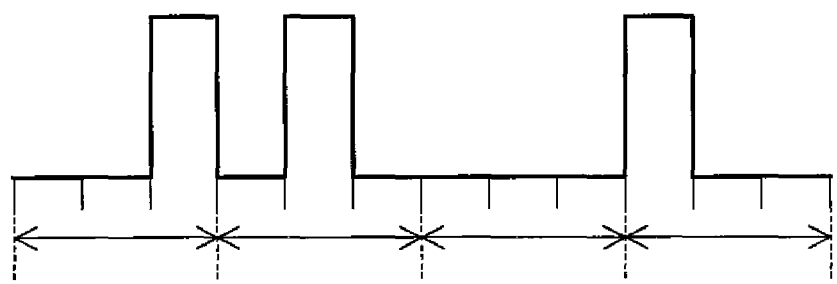
FIG. 10 shows a signal format for VFIR modulation.

FIG. 10 shows a light emitting pattern for the light emitting section 27 in VFIR mode, that is, a signal format for modulation in accordance with VFIR mode. As shown in the figure, the signal format for VFIR modulation follows HHH (1,13) modulation. 2-bit data is represented by the position of an infrared pulse, about 14 nsec wide, in a period of about 42 nsec. Specifications of the signal format (HHH (1,13)) used in VFIR mode do not allow a non-pulse period (absence of pulses) longer than an equivalent to 13 bits (about 180 ns). Hence, no extreme duty variations are likely. In addition, as illustrated in FIG. 18, since a 48-bit STA flag is used to indicate the beginning of a frame, the built-in AGC (automatic gain controller) in the data receiving device can clearly distinguish between signals and noise. Therefore, the signal format used in VFIR mode is more resistant to infrared noise (communications errors are more unlikely in the presence of infrared noise) than the signal format used in SIR mode.

Both the FIR modulating section 30 and a VFIR modulating section may be provided so as to transmit a connection frame both in SIR modulation and in FIR modulation and transmit data frames in at least either FIR modulation or VFIR modulation. In that case, a suitable modulation scheme for the data frames may be specified, for example, by the transmission control section 22 according to the contents of the transmit request received by the input I/F section 21. The modulation scheme and transfer rate for the data frames are communicated from the data transmitting device 2 to the data receiving device by means of connection parameters (for example, the baud rate parameter, one of negotiation parameters) contained in the outgoing connection frame. The data receiving device specifies a reception mode for the data frames according to the connection parameters communicated by the connection frame. For example, the baud rate parameter is set to 16 Mbps for a transmission in VFIR mode and to 4 Mbps for a transmission in FIR mode. Thus, the data receiving device can specify a reception mode (either VFIR mode or FIR mode) by referring to the value of the baud rate parameter.

When both the FIR modulating section 30 and a VFIR modulating section are provided, connection frames may be transmitted, one in SIR mode, another in FIR mode, and the other in VFIR mode.

When there is provided a VFIR modulating section, the transmission control section 22 may control the modulating section selector 28 to feed the output frames of the connection frame generating section 25a or the data frame generating section 25b to the VFIR modulating section where the frames are modulated by a modulation scheme which matches VFIR mode, control the multiplexer 31 to feed the modulated VFIR-mode frames to the light emitting section 27, and control the light emitting section 27 to transmit the frames at a bit rate which matches VFIR mode.

Examples of modulation schemes which are less likely to be affected by infrared noise than the modulation scheme for SIR mode include those modulation schemes which represent the values of data (either 0 or 1) in such a manner that the same value does not occur successively more than or equal to a predetermined number of times. An example of transmission modes using such a modulation scheme is 8B10B modulation. 8B10B modulation represents 8-bit information by 10-bit symbols (transmission characters). 0 s do not appear successively more than or equal to a predetermined number of times in 8B10B modulation.

Therefore, the FIR modulating section 30 may be replaced with an 8B10B modulating section (not shown) so as to transmit a connection frame in 8B10B mode which is less likely to be affected by infrared noise than a connection frame in SIR mode. Both the FIR modulating section 30 and an 8B10B modulating section may be provided so as to transmit a connection frame both in SIR mode and in FIR mode A transmit data frames in at least either FIR modulation or 8B10B modulation. In that case, connection frames may be transmitted, one in SIR mode, another in FIR mode, and the other in 8B10B mode. When there is provided an 8B10B modulating section, the transmission control section 22 may control the modulating section selector 28 to feed the outgoing frames of the connection frame generating section 25a or the data frame generating section 25b to the 8B10B modulating section where the frames are modulated by a modulation scheme which matches 8B10B mode, control the multiplexer 31 to feed the modulated 8B10B-mode frames to the light emitting section 27, and control the light emitting section 27 to transmit the frames at a bit rate which matches 8B10B mode.

In the present embodiment, infrared communications are performed between the data transmitting devices 2, 2b and the data receiving device 3. However, this is not the only possibility for the present invention. The present invention is applicable to any communications system provided that the system transmits a connection frame prior to the transmission of data frames and that the signal format for the connection frame represents the value of a data bit by the presence and absence of a pulse in a predetermined period. The transmission medium may be, for example, a wired line, such as IEEE 1394, TSB, electric power line, a cable TV line, a telephone line, or an ADSL; or wireless, such as Bluetooth®, 802.11 wireless, HDR, a mobile phone network, a satellite line, or a terrestrial digital network, rather than infrared.

Embodiment 2

Another embodiment of the present invention will be described. For convenience, members of the present embodiment that have the same arrangement and function as members of embodiment 1, and that are mentioned in those embodiments are indicated by the same reference numerals and description thereof is omitted.

A data transmitting device 2 in accordance with the present embodiment has substantially the same configuration as the data transmitting device 2 described in embodiment 1. Differences from embodiment 1 are: the transfer bit rate in SIR mode is switchable between 9,600 bps and 115.2 kbps, so that the connection frame is sent both at 9,600 bps in SIR mode (hereinafter, "SIR (9,600 bps) mode") and at 115.2 kbps in SIR mode (hereinafter, "SIR (115.2 kbps) mode"). The data receiving device 3, receiving a connection frame and data frames from the data transmitting device 2, also has substantially the same configuration as the one in embodiment 1: the data receiving device 3 in the present embodiment is capable of receiving a connection frame both in SIR (9,600 bps) mode and in SIR (115.2 kbps) mode.

The SIR modulating section 29 modulates incoming frames fed via the modulating section selector 28 by a modulation scheme which matches either SIR (9,600 bps) mode or SIR (115.2 kbps) mode according to an instruction from the transmission control section 22. The signal format used in SIR mode follows RZI (Return to Zero Inversion) modulation. In SIR (9,600 bps) mode, as illustrated in FIG. 17, a 0 and a 1 are represented by the presence and absence of an infrared pulse, 1.41 μsec to 22.13 μsec wide, in a period of about 104 μsec. In SIR (115.2 kbps) mode, a 0 and a 1 are represented by the presence and absence of an infrared pulse, 1.41 μsec to 2.23 μsec wide, in a period of about 8.7 μsec. In other words, a pulse is generated for a 0, and no pulse for a 1 both in SIR (9,600 bps) mode and in SIR (15.2 kbps) mode.

Figure 11:
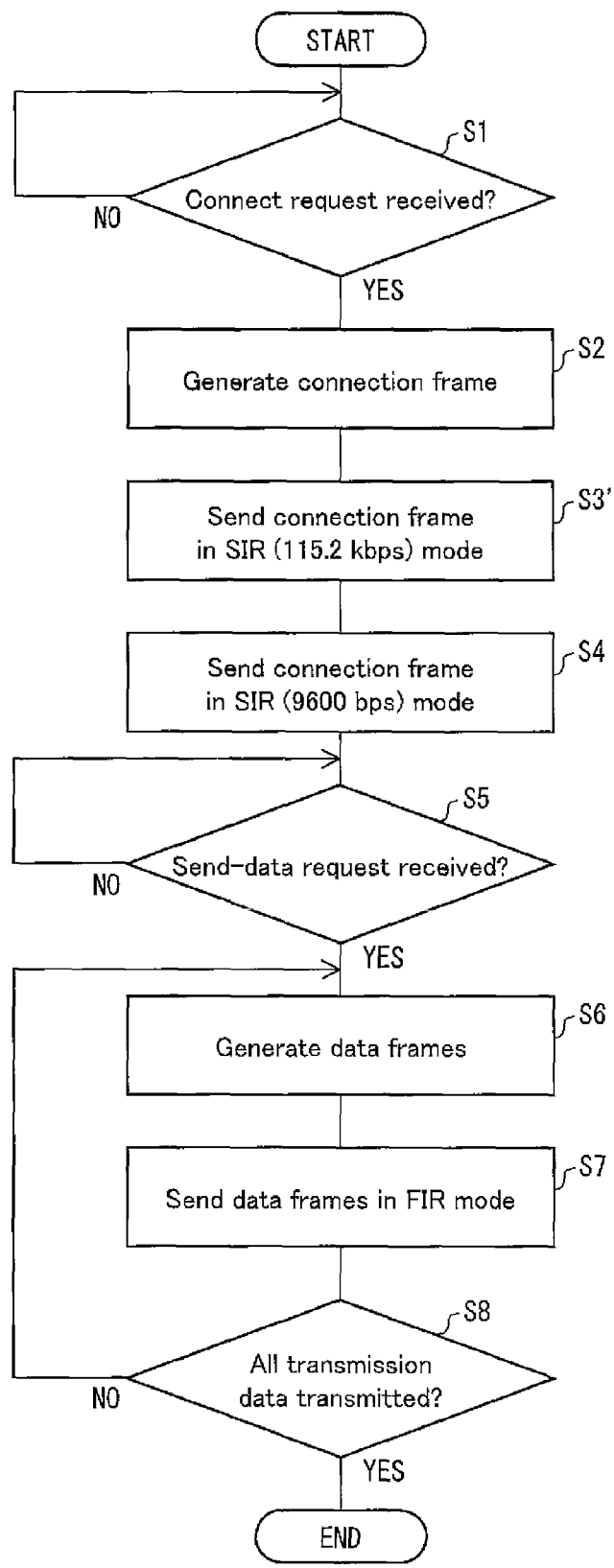
FIG. 11 is a flow chart illustrating processing in a data transmitting device of another embodiment of the present invention.
Figure 12:
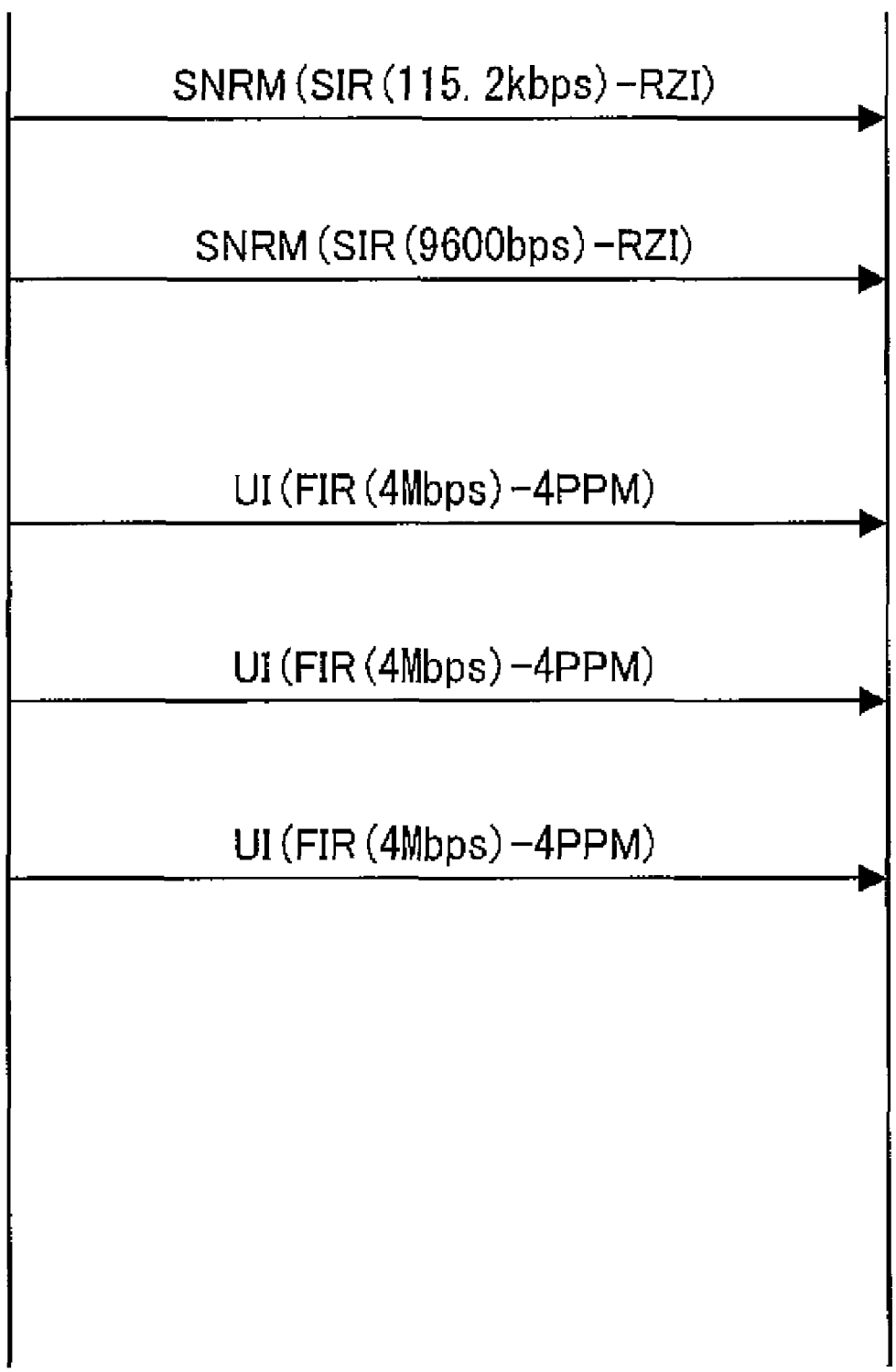
FIG. 12 shows frames transmitted from a data transmitting device of another embodiment of the present invention and transmission timings for the frames.

FIG. 11 is a flow chart illustrating processing in the data transmitting device 2. FIG. 12 shows frames transmitted from the data transmitting device 2 to the data receiving device 3 and transmission timings for the frames. As shown in these figures, a difference from the processing in the data transmitting device 2 of embodiment 1 (see FIGS. 7, 8) lies where the connection frame is transmitted in FIR mode in S3 of embodiments 1, 2, whilst the connection frame is transmitted in SIR (115.2 kbps) mode in the present embodiment (S3').

More specifically, under the control of the transmission control section 22, the connection frame generated by the connection frame generating section 25a in S2 is transmitted to the data receiving device 3 in SIR (115.2 kbps) mode in S3 (S3'). In so doing, the transmission control section 22 controls the modulating section selector 28 to feed the output (connection frame) of the connection frame generating section 25a to the SIR modulating section 29, controls the SIR modulating section 29 to modulate the connection frame by a modulation scheme which matches SIR (115.2 kbps) mode, and controls the multiplexer 31 to feed the output (connection frame) of the SIR modulating section 29 to the light emitting section 27. Then, the transmission control section 22 controls the light emitting section 27 to transmit the connection frame fed via the multiplexer 31 at a bit rate which matches SIR (115.2 kbps) mode (transmit "SNRM (SIR (115.2 kbps)-RZI)" shown in FIG. 12).

As described in the foregoing, the data transmitting device 2 in accordance with the present embodiment transmits a connection frame both in SIR (9,600 bps) mode and in SIR (115.2 kbps) mode. Accordingly, the data receiving device capable of receiving a frame in SIR (115.2 kbps) mode can receive a connection frame at a transfer rate which is less likely to be affected by infrared noise than SIR (9,600 bps) mode. Therefore, the data receiving device can receive the connection frame normally even in a communications environment where there is so much infrared noise that it would otherwise be difficult to receive the connection frame normally in SIR (9,600 bps) mode. Accordingly, the data receiving device can properly switch to a reception mode which matches the transmission mode for the data frames.

The data transmitting device 2 in accordance with the present embodiment transmits a connection frame both in SIR (9,600 bps) mode and in SIR (115.2 kbps) mode. The device 2 performs conventional communications with the data receiving device which is capable of receiving a connection frame only in SIR (9,600 bps) mode and performs more reliable communications with a data receiving device which is capable of receiving a connection frame in SIR (115.2 kbps) mode than conventional communications. Thus, the data transmitting device 2 in accordance with the present embodiment has upward compatibility.

Furthermore, in the present embodiment, a connection frame is transmitted in SIR (115.2 kbps) mode before another one is transmitted in SIR (9,600 bps) mode. However, this is not the only possibility; a connection frame may be transmitted first in SIR (9,600 bps) mode.

If the data receiving device is capable of receiving a connection frame in SIR (115.2 kbps) mode and receiving SIR (9,600 bps) mode, the data frames may be received in accordance with a connection frame in SIR (115.2 kbps) mode. Alternatively, the data frames may be received in accordance with the connection frame in the mode received earlier.

In the present embodiment, the connection frame has been described as being transmitted both in SIR (9,600 bps) mode and in SIR (115.2 kbps) mode. However, this is not the only possibility; the connection frame only needs to be transmitted in SIR (9,600 bps) mode and in any SIR mode in which the transfer rate (transfer bit rate) is greater than in SIR (9,600 bps) mode. IrDA specifies, for example, 2,400 bps, 9,600 bps, 19,200 bps, 38,400 bps, 57,600 bps, 115.2 kbps, 0.576 Mbps, 1.152 Mbps, 4 Mbps, and 16 Mbps as transfer rates. Accordingly, a connection frame may be transmitted in an SIR mode, for example, at a transfer rate of 19,200 bps, 38,400 bps, or 57,600 bps, in place of SIR (115.2 kbps) modulation. In addition, the connection frame may be transmitted in three or more SIR modes at different transfer rates, rather than in two SIR modes at different transfer rates. Furthermore, the connection frame may be transmitted in multiple SIR modes at different transfer rates and by a modulation scheme which is less likely to be affected by infrared noise than the SIR modes (for example, FIR mode, VFIR mode, or 8B10B mode).

The connection frame is not necessarily transmitted in SIR mode; multiple connection frames may be transmitted, for example, by any non-SIR mode modulation schemes at different transfer rates. When that is the case, even in a communications environment where it is difficult to normally receive a connection frame at one transfer rate, the data receiving device can normally receive a connection frame at another transfer rate. Accordingly, the data receiving device can properly switch to a reception mode which matches the transmission mode for the data frames.

Embodiment 3

Another embodiment of the present invention will be described. For convenience, members of the present embodiment that have the same arrangement and function as members of embodiments 1, 2, and that are mentioned in that embodiment are indicated by the same reference numerals and description thereof is omitted.

A data transmitting device 2 in accordance with the present embodiment is adapted to transmit a connection frame in FIR mode. A data receiving device 3 in the present embodiment is capable of receiving a connection frame also in FIR mode.

Figure 13:
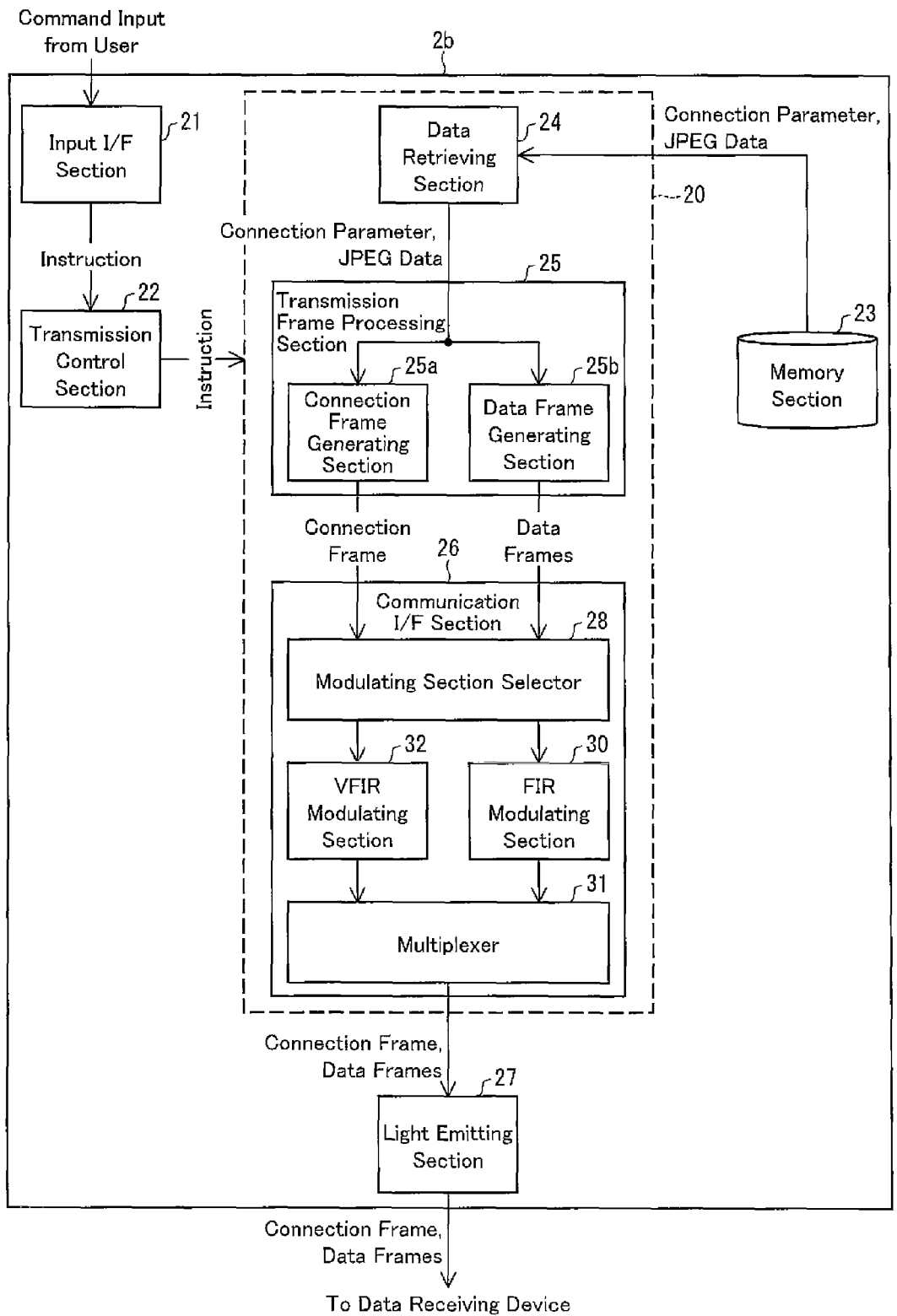
FIG. 13 is a schematic block diagram of a data transmitting device of a further embodiment of the present invention.

FIG. 13 is a schematic block diagram of a data transmitting device 2b in accordance with the present embodiment. As shown in the figure, the data transmitting device 2b includes a VFIR modulating section 32, in place of the SIR modulating section 29 in the data transmitting device 2 of embodiments 1, 2. Otherwise, the data transmitting device 2b has the same configuration as the data transmitting device 2 of embodiments 1, 2.

The VFIR modulating section 32 modulates incoming frames fed via the modulating section selector 28 by a modulation scheme which matches VFIR mode according to an instruction from the transmission control section 22. The signal format used in VFIR mode follows HHH (1,13) modulation as mentioned earlier.

Figure 14:
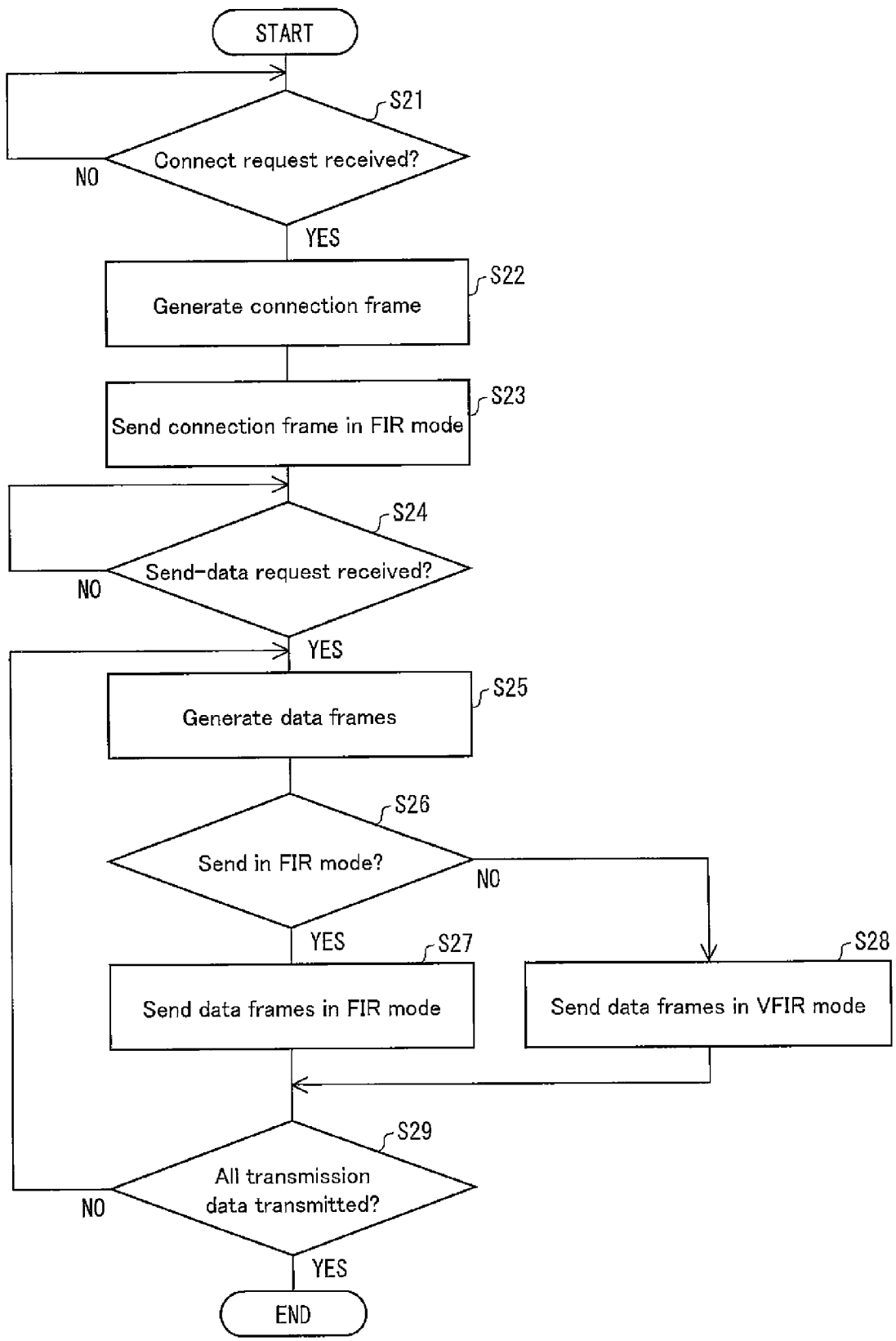
FIG. 14 is a flow chart illustrating processing in the data transmitting device shown in FIG. 13.
Figure 15:
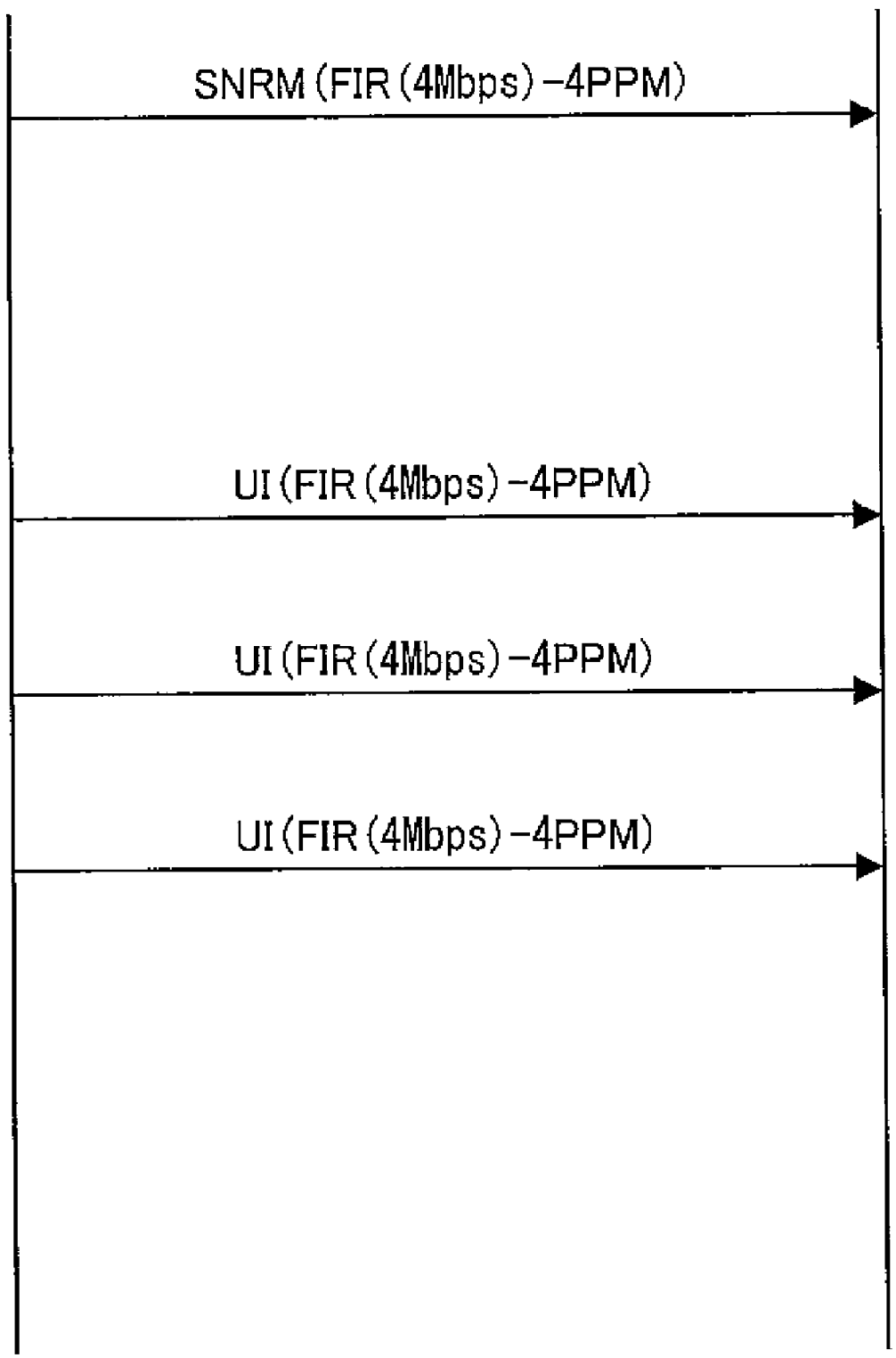
FIG. 15 shows frames transmitted from the data transmitting device shown in FIG. 13 and transmission timings for the frames.
Figure 16:
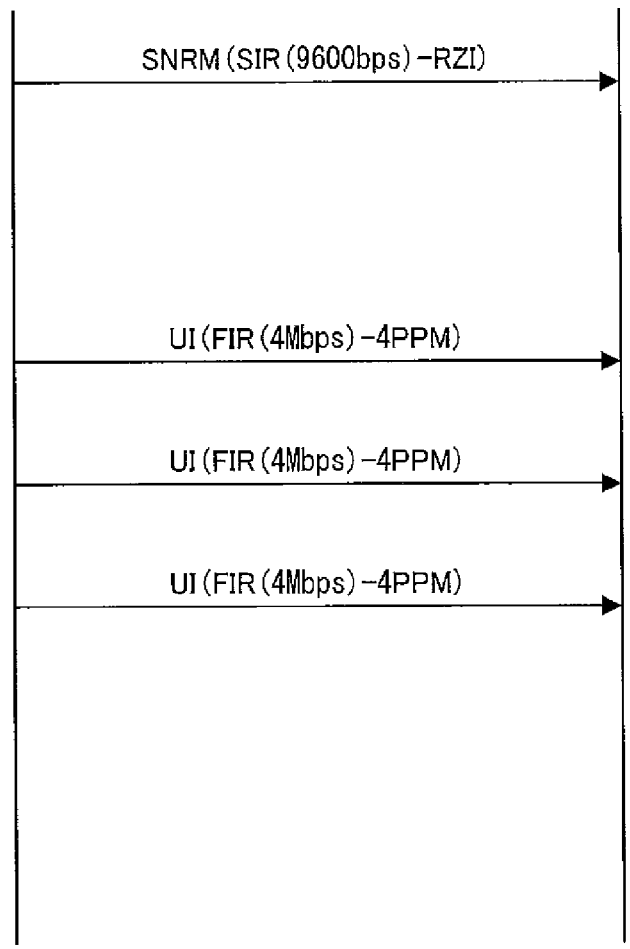
FIG. 16 is a timing chart illustrating transmission timings for a connection frame (SNRM) and data frames (UI) in conventional IrSS-based half-duplex communications.

FIG. 14 is a flow chart illustrating processing in the data transmitting device 2b. FIG. 15 shows frames transmitted from the data transmitting device 2b to the data receiving device 3 and transmission timings for the frames.

As illustrated in FIG. 14, the transmission control section 22 is monitoring the input I/F section 21 for an incoming connect request (S21). Upon reception of a connect request, the transmission control section 22 outputs an instruction to the various sections in the transmission processing section 20 to generate a connection frame according to the contents of the received connect request (S22). Specifically, the section 22 controls the data retrieving section 24 to retrieve connection parameters from the memory section 23 according to the connect request and passes the parameters to the connection frame generating section 25a. The section 22 also controls the connection frame generating section 25a to generate a connection frame according to the connection parameters fed from the data retrieving section 24.

Next, under the control of the transmission control section 22, the generated connection frame is transmitted to the data receiving device 3 in FIR mode (S23). More specifically, the transmission control section 22 controls the modulating section selector 28 to feed the output (connection frame) of the connection frame generating section 25a to the FIR modulating section 30, controls the FIR modulating section 30 to modulate the connection frame by a modulation scheme which matches FIR mode, and controls the multiplexer 31 to feed the output (connection frame) of the FIR modulating section 30 to the light emitting section 27. The transmission control section 22 then controls the light emitting section 27 to transmit the connection frame fed via the multiplexer 31 at a bit rate which matches FIR mode (here, at 4 Mbps) (transmit "SNRM (FIR (4 Mbps)-4 ppm)" shown in FIG. 15).

Thereafter, the transmission control section 22 determines whether or not a send-data request has been received (S24). If not, the section 22 continues to monitor for an incoming send-data request.

On the other hand, if a send-data request has been received, the transmission control section 22 sends a data frame generate instruction to the various sections in the transmission processing section 20 according to the contents of the received send-data request (S25). Specifically, the section 22 controls the data retrieving section 24 to retrieve transmission data (here, JPEG data) from the memory section 23 for transfer to the data frame generating section 25b according to the send-data request. The section 22 furthermore controls the data frame generating section 25b to generate data frames according to the transmission data to be sent from the data retrieving section 24.

Next, the transmission control section 22 determines whether to transmit the generated data frames to the data receiving device 3 in FIR mode or in VFIR mode according to the contents of the send-data request (S26).

If having determined to transmit the data frames in FIR mode, the transmission control section 22 controls the various sections in the transmission processing section 20 to transmit the data frames in FIR mode (S27). More specifically, the transmission control section 22 controls the modulating section selector 28 to feed the output (data frames) of the data frame generating section 25b to the FIR modulating section 30, controls the FIR modulating section 30 to modulate the data frames by a modulation scheme which matches FIR mode, and controls the multiplexer 31 to feed the output (data frames) of the FIR modulating section 30 to the light emitting section 27. Then, the transmission control section 22 controls the light emitting section 27 to transmit the data frames fed via the multiplexer 31 at a bit rate which matches FIR mode (here, at 4 Mbps) (transmit "UI (FIR (4 Mbps)-4 ppm)" shown in FIG. 15).

In contrast, if having determined to transmit the data frames in VFIR mode, the transmission control section 22 controls the various sections in the transmission processing section 20 to transmit the data frames in VFIR mode (S28). More specifically, the transmission control section 22 controls the modulating section selector 28 to feed the output (data frames) of the data frame generating section 25*b* to the VFIR modulating section 32, controls the VFIR modulating section 32 to modulate the data frames by a modulation scheme which matches VFIR mode, and controls the multiplexer 31 to feed the output (data frames) of the VFIR modulating section 32 to the light emitting section 27. Then, the transmission control section 22 controls the light emitting section 27 to transmit the data frames fed via the multiplexer 31 at a bit rate which matches VFIR mode.

After the data frames are transmitted in S27 or S28, the transmission control section 22 determines whether or not all transmission data has been transmitted (S29). If there remains transmission data yet to be transmitted, the section 22 continues by implementing S25 and subsequent steps. On the other hand, if the transmission of all the transmission data has been completed, the section 22 ends the process.

As described in the foregoing, the data transmitting device 2*b* in accordance with the present embodiment transmits a connection frame in FIR mode. Accordingly, a data receiving device capable of receiving frames in FIR mode can receive the connection frame by a modulation scheme which is less likely to be affected by infrared noise than SIR mode. Therefore, the data receiving device can receive the connection frame normally even in a communications environment where there is so much infrared noise that it would otherwise be difficult to receive the connection frame normally in SIR mode. Accordingly, the data receiving device can properly switch to a reception mode which matches the transmission mode for the data frames.

In the present embodiment, the VFIR modulating section 32 is included. However, this is not the only possibility; the VFIR modulating section 32 may not be included. In that case, the connection frame and the data frames are transmitted in FIR mode. In addition, the data frames may be transmitted by a modulation scheme that is neither VFIR mode nor FIR mode.

In the present embodiment, the connection frame is transmitted in FIR mode. However, this is not the only possibility; the connection frame may be transmitted by any modulation scheme so long as that scheme is less likely to be affected by infrared noise than a modulation scheme which matches SIR mode (for example, 4 PPM modulation, HHH (1,13) modulation, or 8B10B modulation) or by any SIR mode in which the transfer rate is faster than 9,600 bps (RZI modulation). When this is the case, a modulating section which can handle the modulation scheme in which the connection frame is transmitted is provided either in place of the FIR modulating section 30 or in addition to the FIR modulating section 30.

In the embodiments, the transmission control section 22 and the various sections in the transmission processing section 20 are realized by software executed by a CPU or like processor. More specifically, the transmission control section 22 and the various sections in the transmission processing section 20 each include, among others, a CPU (central processing unit) and memory devices (storage media). The CPU executes instructions contained in control programs, realizing various functions. The memory devices may be a ROM (read-only memory) which contains programs, a RAM (random access memory) to which the programs are loaded, or a memory containing the programs and various data. The objective of the present invention can be achieved by mounting to the data transmitting devices 2, 2*b* a computer-readable storage medium containing control program code (executable programs, intermediate code programs, or source programs) for the data transmitting devices 2, 2*b* which is software realizing the aforementioned functions, in order for the computer (or CPU, MPU) to retrieve and execute the program code contained in the storage medium.

The storage medium may be, for example, a tape, such as a magnetic tape or a cassette tape; a magnetic disk, such as a Floppy® disk or a hard disk, or an optical disc, such as CD-ROM/MO/MD/DVD/CD-R; a card, such as an IC card (memory card) or an optical card; or a semiconductor memory, such as a mask ROM/EPROM/EEPROM/flash ROM.

The data transmitting devices 2, 2*b* may be arranged to be connectable to a communications network so that the program code may be delivered over the communications network. The communications network is not limited in any particular manner, and may be, for example, the Internet, an intranet, extranet, LAN, ISDN, VAN, CATV communications network, virtual dedicated network (virtual private network), telephone line network, mobile communications network, or satellite communications network. The transfer medium which makes up the communications network is not limited in any particular manner, and may be, for example, a wired line, such as IEEE 1394, USB, an electric power line, a cable TV line, a telephone line, or an ADSL; or wireless, such as infrared (IrDA, remote control), Bluetooth®, 802.11 wireless, HDR, a mobile telephone network, a satellite line, or a terrestrial digital network. The present invention encompasses a carrier wave, or data signal transmission, by which the program code is embodied electronically.

The transmission control section 22 and the various sections in the transmission processing section 20 may not be implemented by software. They may be implemented entirely by hardware or in a combination of hardware responsible for part of the processing and computing means implementing software for control of the hardware and the rest of the processing.

Embodiment 4

Another embodiment of the present invention will be described. For convenience, members of the present embodiment that have the same arrangement and function as members of the previous embodiments and that are mentioned in those embodiments are indicated by the same reference numerals and description thereof is omitted.

4-1. Configuration of Data Receiving Device 3*b*

Figure 19:
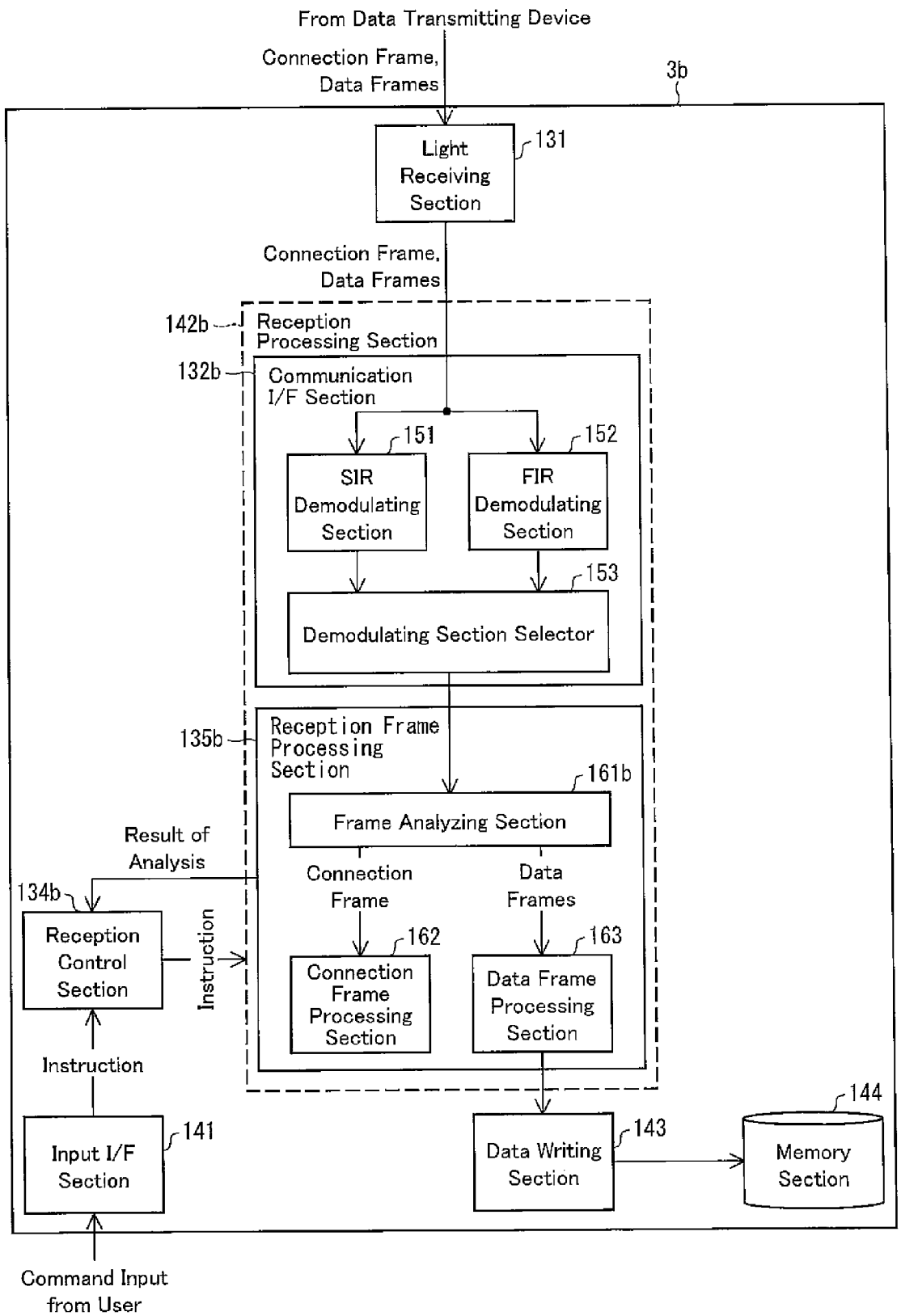
FIG. 19 is a schematic block diagram of a data receiving device of an embodiment of the present invention.

FIG. 19 is a block diagram of a data receiving device 3*b* in accordance with the present embodiment. The data receiving device 3*b* replaces the data receiving device 3 in the data transmitting and receiving system 1 of any one of embodiments 1 to 3. The data receiving device 3*b* can perform communications also with the conventional data receiving device which transmits a connection frame in SIR mode and thereafter transmits data frames in FIR mode.

The present embodiment will discuss, as an example, a data transmitting and receiving system 1 which transmits image data stored in a mobile phone with a built-in camera (data transmitting device 2) to a liquid crystal television (data receiving device 3*b*) by IrSS-based infrared communications. This is, however, by no means limiting the application of the present invention.

In addition, the present embodiment will discuss examples in which the data receiving device 3*b* receives JPEG data (image data) frames as data frames. However, this is not the only possibility; the data frames received by the data receiving device 3*b* may contain other content data (for example, image data encoded by a different method, text data, audio data, or movie data).

As illustrated in FIG. 19, the data receiving device 3*b* includes an input I/F section 141, a reception control section (reception mode switching section) 134*b*, a light receiving section 131, a reception processing section 142*b*, a data writing section 143, and a memory section 144. The reception processing section 142*b* includes a communication I/F section 132*b* and a reception frame processing section 135*b*. The communication I/F section 132*b* includes an SIR demodulating section (demodulating section) 151, an FIR demodulating section (demodulating section) 152, and a demodulating section selector 153.

The light receiving section 131 is a light receiving module (light receiving element) for infrared communications. The section 131 is built around a photo diode for data reception. The light receiving section 131 receives frames by sensing lighting-on/off of the infrared LED in the data transmitting device 2 using the photo diode. The light receiving section 131 includes an amplifier amplifying incoming signals and an AGC adjusting the gain by the amplifier. The AGC changes the built-in amplifier's gain and bandwidth according to the signal format for the mode that matches an instruction from the reception control section 134*b*. The light receiving section 131 is switchable between SIR mode and FIR mode according to an instruction from the reception control section 134*b*. The section 131, when set up for SIR mode, receives SIR frames (frames transmitted in SIR mode). When set up for FIR mode, the section 131 receives FIR frames (frames transmitted in FIR mode). The light receiving section 131 passes the received frames (connection and data frames) to the reception processing section 142*b*. The specifications as to the light reception sensitivity of the light receiving section 131 differ between SIR mode and FIR mode: 4 $\mu$W/cm$^2$ for SIR mode and 10 $\mu$W/cm$^2$ for FIR mode. The section 131 receives weaker infrared light in SIR mode than in FIR mode. SIR mode is thus prone to infrared noise when compared to FIR mode.

The communication I/F section 132*b* includes an SIR demodulating section 151, an FIR demodulating section 152, and a demodulating section selector 153.

The SIR demodulating section 151 demodulates the data fed from the light receiving section 131 by a method which matches SIR mode and outputs the demodulated data to the demodulating section selector 153.

The FIR demodulating section 152 demodulates the data fed from the light receiving section 131 by a method which matches FIR mode and outputs the demodulated data to the demodulating section selector 153.

The demodulating section selector 153 passes either the output of the SIR demodulating section 151 or the output of the FIR demodulating section 152 to the reception frame processing section 135*b* according to an instruction from the reception control section 134*b*.

The reception frame processing section 135*b* includes a frame analyzing section 161*b*, a connection frame processing section 162, and a data frame processing section 163.

The frame analyzing section 161*b* analyzes the output (reception data frames) of the demodulating section selector 153 to determine whether the received data is a connection frame or a data frame, and sends the reception control section 134*b* a signal representing the determined result. The section 161*b* determines, for example, that the received frame is a connection frame if it is in SNRM frame format and that the received frame is a data frame if it is in UI frame format. Alternatively, the frame may have embedded therein a parameter indicating if the frame is a connection frame or a data frame so that the section 161*b* can determine based on the parameter.

If the received data is a connection frame, the frame analyzing section 161*b* outputs the reception data to the connection frame processing section 162; if the received data is a data frame, the section 161*b* outputs the reception data to the data frame processing section 163.

Upon reception of a connection frame analyze instruction from the reception control section 134*b*, the connection frame processing section 162 analyzes a connection frame fed from the frame analyzing section 161*b* (SNRM frame; communications information messaging frame) based on a predetermined frame format and sends the result of the analysis to the reception control section 134*b*. The connection frame contains transmission conditions (ex. bit rate) for data frames which will be transmitted subsequent to the connection frame.

Upon reception of a data frame analyze instruction from the reception control section 134*b*, the data frame processing section 163 analyzes a data frame in UI frame format (UI frame) based on a predetermined frame format. The section 163 sends the result of the analysis to the reception control section 134*b* and outputs the reception data (JPEG data) to the data writing section 143. For example, the section 163 stores the received data frames sequentially in a memory (not shown), and upon having collected all the data frames or at a predetermined timing, decodes the data frames to reproduce original content data.

The data writing section 143 records (writes) the output data of the reception frame processing section 135*b* to the memory section 144 according to an instruction from the reception control section 134*b*.

The memory section 144 is storage means for storing image data (content data), such as incoming JPEG data. The memory section 144 stores also OS (Operating System) programs, various information used in the data receiving device 3*b*, and control programs for the various sections of the data receiving device 3*b*. The configuration of the memory section 144 is not limited in any particular manner; the section 144 may be, for example, non-volatile storage means, such as a flash memory.

The input I/F section 141 is an interface receiving command inputs from the user made on a manipulation input section (not shown). Examples of the commands include a command by which JPEG data is received.

The reception control section (reception mode switching section) 134*b* controls the operation of the various sections of the data receiving device 3*b*.

The reception control section 134*b* controls the operation of the various sections of the reception processing section 142*b*, for example, in response to the contents of an incoming request made by the user on the input I/F section 141, to demodulate incoming frames by a predetermined demodulation scheme and to process the frames in a predetermined frame format.

Furthermore, the reception control section 134*b* obtains from the reception frame processing section 135*b* information on transmission conditions (ex. bit rate) for subsequent data frames communicated by the connection frame. The section 134*b* generates a mode switch instruction signal according to the information for output to the light receiving section 131 and the communication I/F section 132*b*. For example, the light receiving section 131 and the communication I/F section 132*b* are defaulted to operate in FIR mode (initial state). Upon receiving a message from the reception frame processing section 135*b* that a connection frame has been received and also receiving a message on information on transmission conditions for subsequent data frames communicated by the connection frame, the section 134*b* generates a mode switch instruction signal according to the information for output the light receiving section 131 and the communication I/F section 132b. The section 134b then determines that a connection to the data transmitting device 2 has been established and switches the various sections of the reception processing section 142b for standby for incoming data frames.

If the reception control section 134b receives, from the reception frame processing section 135b, a message that the first data frame is received before a message communicating completion of the receiving of the connection frame is received, the reception control section 134b determines that a connection to the data transmitting device 2 has been established and switches the various sections of the reception processing section 142b for data frame reception processing (a state in which the section 142b continues to receive subsequent data frames).

4-2. Operation of Data Receiving Device 3b

Figure 20:
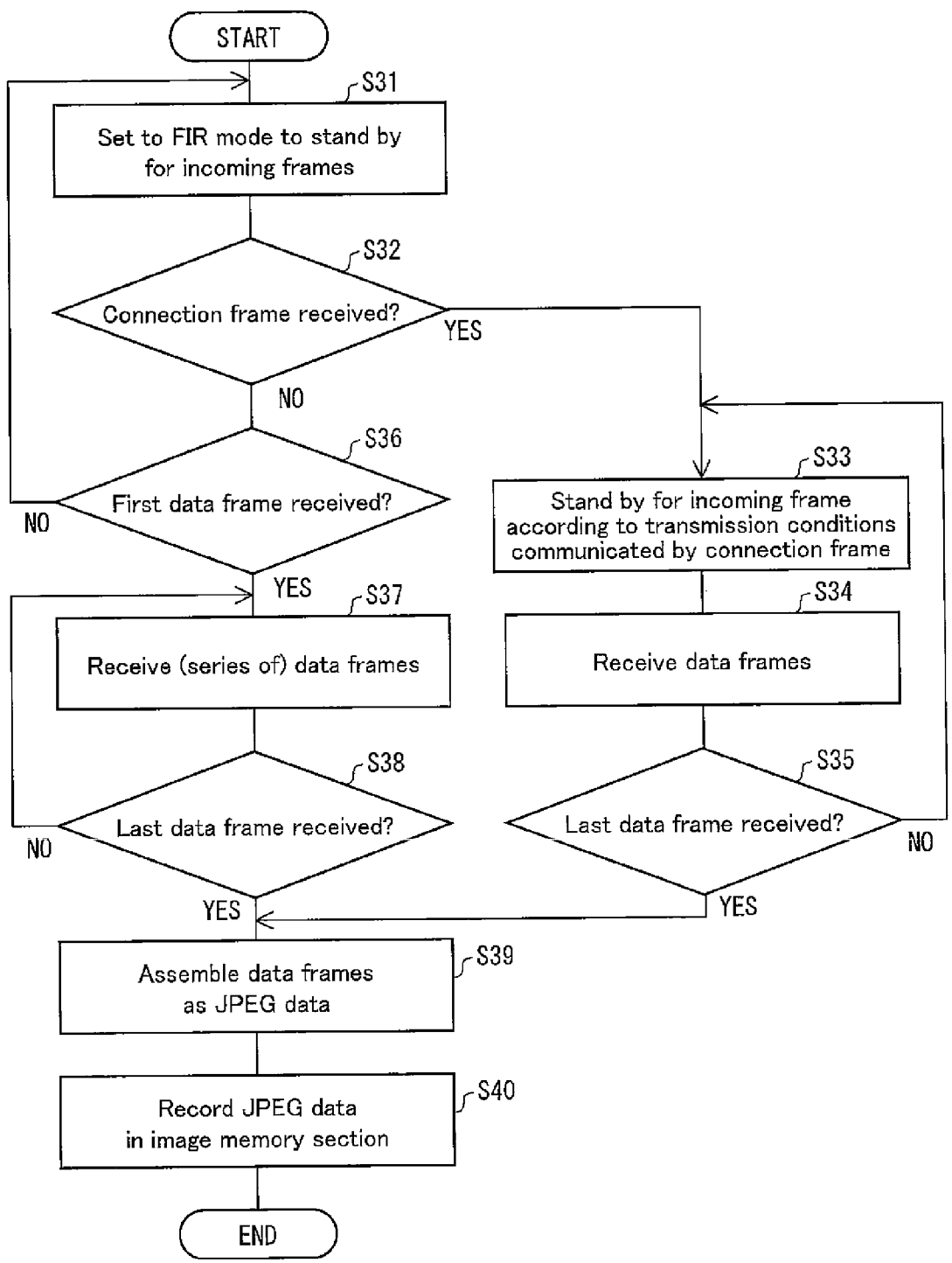
FIG. 20 is a flow chart illustrating processing in the data receiving device shown in FIG. 19.
Figure 21:
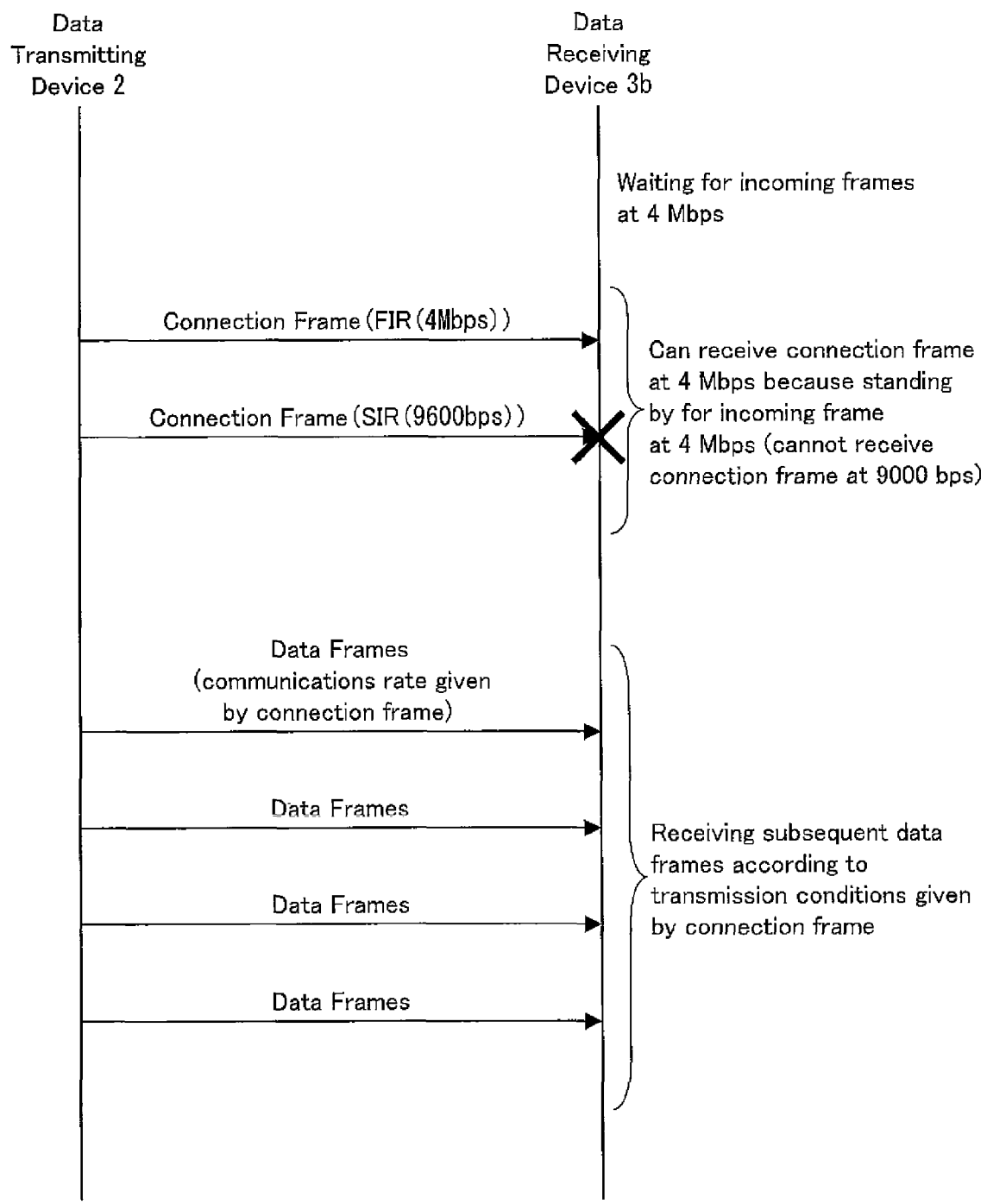
FIG. 21 shows an example of reception timings for a connection frame and data frames in the data receiving device shown in FIG. 19.
Figure 22:
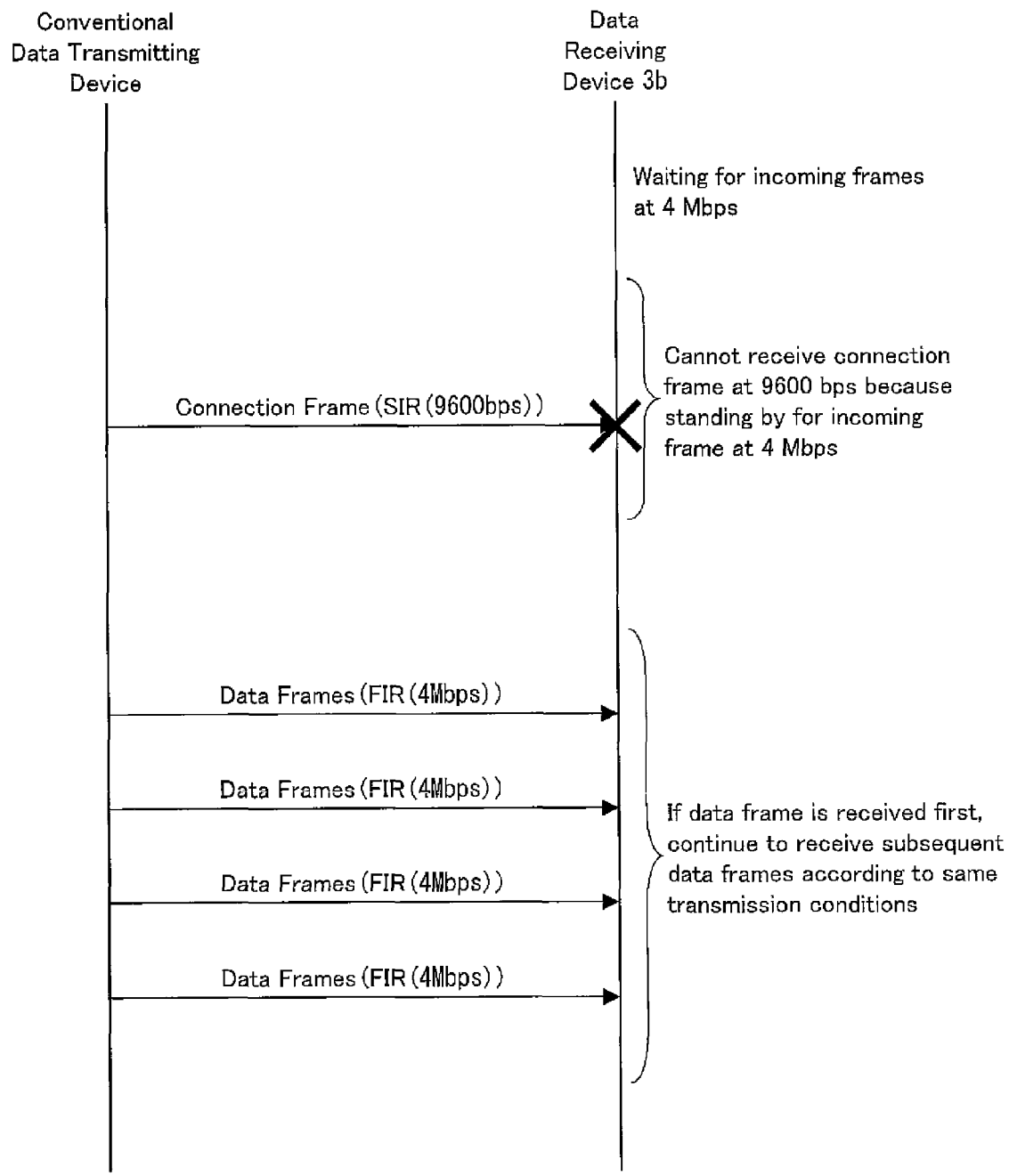
FIG. 22 shows an example of reception timings for a connection frame and data frames in the data receiving device shown in FIG. 19.
Figure 23:
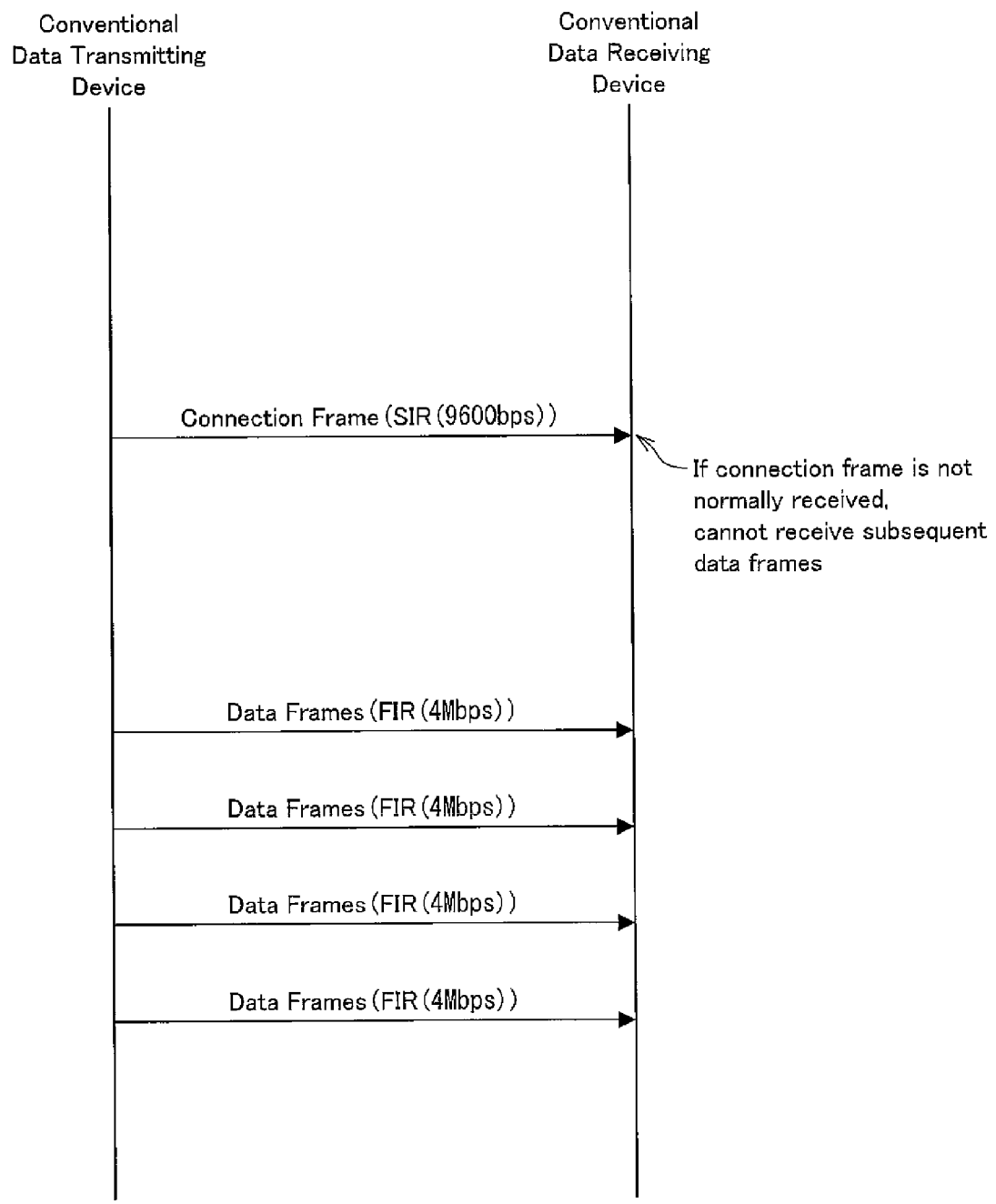
FIG. 23 shows an example of reception timings for a connection frame and data frames in a conventional data receiving device.

Next, the operation of the data receiving device 3b during reception processing will be described in reference to FIGS. 20 to 23. FIG. 20 is a flow chart illustrating the flow of reception processing in the data receiving device 3b. FIG. 21 is a timing chart for communications performed between the data receiving device 3b and the data transmitting device 2, that is, a data transmitting device which transmits connection frames, one in SIR mode and another in FIR mode, before transmitting data frames in FIR mode. FIG. 22 is a timing chart for communications performed between the data receiving device 3b and the conventional data transmitting device which transmits a connection frame in SIR mode (9,600 bps) requesting a connection by IrSS protocols before transmitting data frames in FIR mode (4 Mbps). FIG. 23 is timing chart for communications performed between a conventional data receiving device and the conventional data transmitting device similar to the one shown in FIG. 22.

First, the reception control section 134b defaults the light receiving section 131 and the communication I/F section 132b to FIR mode (4 Mbps) to stand by for an incoming frame (initial state) ((S31).

In addition, the reception control section 134b monitors for an incoming connection frame, in other words, whether or not a connection frame reception message has been received from the reception frame processing section 135b (S32). More specifically, if the light receiving section 131 receives a connection frame in FIR mode from the from the data transmitting device 2, the received connection frame is passed through the FIR demodulating section 152 and the demodulating section selector 153 in the communication I/F section 132b to the reception frame processing section 135b. The connection frame passed to the reception frame processing section 135b is analyzed in the frame analyzing section 161b and found to be a connection frame. As a result, the frame analyzing section 161b transmits to the reception control section 134b a message that a connection frame has been received. At the same time, the received connection frame is sent to the connection frame processing section 162 for analysis. The result of the analysis is sent from the connection frame processing section 162 to the reception control section 134b. The reception control section 134b determines according to the message from the frame analyzing section 161b whether or not a connection frame has been received.

While standing by for reception, the light receiving section 131 and the communication I/F section 132b are set to FIR mode. In addition, as described in reference to FIG. 9, the data transmitting device 2 transmits a connection frame in FIR mode (4 Mbps) requesting a connection by IrSS protocols before transmitting a connection frame in SIR mode (9,600 bps). After transmitting the connection frames in both modes, the device 2 transmits data frames in FIR mode (4 Mbps). As illustrated in FIGS. 21 and 22, while standing by for reception, the data receiving device cannot normally receive the connection frame transmitted in SIR mode (9,600 bps), but can normally receive the connection frame transmitted in FIR mode (4 Mbps). Accordingly, the data receiving device 3b is capable of receiving data frames according to transmission conditions communicated by the connection frame transmitted by a modulation scheme which is less likely to be affected by infrared noise (here, FIR mode). The data frames are thus properly received (the data transmitting device 2 and the data receiving device 3b are properly connected).

If it is determined in S32 that the connection frame has been received, the reception control section 134b switches the various sections of the light receiving section 131, the communication I/F section 132b, and the reception frame processing section 135b to a communications mode which meet the transmission conditions communicated by the connection frame to stand by for incoming data frames (S33).

Then, the light receiving section 131 sequentially receives the data frames transmitted from the data transmitting device following the connection frame as illustrated in FIG. 21 (S34) and transfers the data frames to reception frame processing section 135b via the communication I/F section 132b for storage.

Thereafter, the reception control section 134b determines whether or not all the data frames have been received (S35). This decision can be made by, for example, whether or not a DISC frame has been received. If not all the data frames have been received, the process proceeds to S33 and continues to subsequent steps. If all the data frames have been received, the process proceeds to S39.

On the other hand, if it is determined in S32 that the connection frame has not been received, the reception control section 134b determines whether or not it has received a data frame (S36). More specifically, if the light receiving section 131 has received a data frame transmitted in FIR mode from the data transmitting device 2, the received data frame is sent to the reception frame processing section 135b via the FIR demodulating section 152 and the demodulating section selector 153 of the communication I/F section 132b. The frame sent to the reception frame processing section 135b is analyzed by the frame analyzing section 161b and recognized as a data frame. As a result, the frame analyzing section 161b sends to the reception control section 134b a message that a data frame has been received. The received data frame is sent to the data frame processing section 163, analyzed in the section 163, and sequentially stored in a memory (not shown). The reception control section 134b determines whether or not a data frame has been received, according to the message sent from the frame analyzing section 161b.

If it is determined in S36 that no data frame has been received, the reception control section 134b returns to S31 to continue to monitor for an incoming connection frame or data frame.

On the other hand, if it is determined in S36 that a data frame has been received, the reception control section 134b controls to continue to receive the subsequent data frames (S37).

As mentioned earlier, in the data receiving device 3b, the light receiving section 131 and the communication I/F section 132b are set to FIR mode in the initial state (default). Thus, the data receiving device 3b can receive a data frame transmitted in FIR mode and subsequent data frames in FIR mode, even without first having to receive a connection frame as illustrated in FIG. 22. In other words, if a data frame is received before a connection frame is received, the data receiving device 3b regards a connection as having been established with the data transmitting device 2 and receives subsequent data frames. Therefore, the data receiving device 3b can receive data frames from the conventional data transmitting device which transmits data frames in FIR mode after transmitting only a connection frame in SIR mode as a connection frame.

In contrast, the conventional data receiving device can receive data frames only after the device receives a connection frame. In addition, as illustrated in FIG. 23, the conventional data receiving device can receive a connection frame only in SIR mode, not in FIR mode; if the device fails to normally receive the connection frame in SIR mode, the device cannot receive subsequent data frames in FIR mode. In other words, as mentioned earlier, SIR mode is prone to infrared noise. The conventional data receiving device often fails to normally receive the connection frame in SIR mode, and as a result, cannot receive the data frames in FIR mode.

Thereafter, the reception control section 134b determines whether or not the last data frame has been received (S38). If it is determined that the last data frame has not been received, the process continues at S37. On the other hand, if it is determined that the last data frame has been received, the process proceeds to S39.

If it is determined in S35 or S38 that the last data frame has been received, the reception control section 134b controls the data frame processing section 163 to assemble the data frames stored in the memory into JPEG data (S39) for output to the data writing section 143. Thereafter, the reception control section 134b controls the data writing section 143 to store the JPEG data in the memory section 144 (S40) and ends the process.

As described in the foregoing, the data receiving device 3b can receive both frames transmitted in SIR mode (low velocity communications mode) and frames transmitted in FIR mode (high velocity communications mode). The device 3b is defaulted to stand by in a state that the device 3b can receive frames in FIR mode (initial state). If a connection frame in FIR mode is received, the device 3b receives data frames transmitted subsequently to the connection frame according to the transmission conditions communicated by the received connection frame. In addition, if a data frame in FIR mode is received, the device 3b continues to receive a series of data frames transmitted subsequently to that data frame.

Accordingly, for example, even in an environment where there is so much infrared noise that it would otherwise be difficult to receive frames transmitted in SIR mode (low velocity communications mode) (for example, when the communications are performed over a long distance, when there is a liquid crystal television containing a cold cathode tub, a plasma television, or an inverter-type fluorescence lamp in the proximity of the transmission path, or when the data receiving device is a liquid crystal television containing a cold cathode tube, a plasma television, or a like device which emits infrared noise), the device 3b can receive frames (connection frame or data frames) transmitted in FIR mode (high velocity communications mode) and receive subsequent data frames according to results of the reception, with improved reliability in data reception in IrSS-based infrared communications.

The IrSS standards specifies 2,400 bps, 9,600 bps, 19,200 bps, 38,400 bps, 57,600 bps, and 115,200 bps (for SIR); 0.576 Mbps and 1.152 Mbps (for MIR); 4 Mbps (for FIR); and 16 Mbps (VFIR) as bit rates. IrSS-compatible conventional data transmitting devices available on the market, however, employ 4 Mbps FIR as the bit rate for UI frames. Therefore, even if the SNRM frame (connection frame) is not received, the data frames can be normally received by setting the receiving device to stand by for reception in FIR mode.

When the data transmitting device is the data transmitting device 2 detailed above, connection frames are transmitted, one in SIR mode and the other in FIR mode. The data receiving device 3b cannot receive the connection frame in SIR mode, but can receive the connection frame in FIR mode. Therefore, the device 3b can receive data frames transmitted subsequently to the connection frame, by the transmission scheme indicated in the connection frame. In addition, since the data transmitting device 2 transmits a connection frame in FIR mode, the data receiving device 3b can receive the data frames according to the connection frame in FIR mode which is less likely to be affected by infrared noise than SIR mode. That improve reliability of the transmit/reception of the data frames.

The data transmitting device 2 may transmit connection frames, one in SIR modulation and the other in FIR modulation, and transmit data frames in at least either FIR modulation or VFIR modulation. The modulation scheme and transfer rate for the data frames are communicated from the data transmitting device 2 to the data receiving device 3b by means of connection parameters (for example, the baud rate parameter, one of negotiation parameters) contained in the connection frame. The data receiving device 3b specifies a reception mode for the data frames according to the connection parameters contained in the connection frame. For example, in the data transmitting device 2, the baud rate parameter contained in the connection frame is set to 16 Mbps for a transmission in VFIR mode and to 4 Mbps for a transmission in FIR mode. That enables the data receiving device 3b to set reception mode to VFIR mode or FIR mode by referring to the value of the baud rate parameter. Accordingly, the data frames are transmitted/received in VFIR which is faster than the connection frame in FIR.

Conventional technology required a solution for noise problems at an additional manufacturing cost to maintain reliability in communications. For example, a noise filter (for example, infrared noise filter made of glass) may need to be mounted to a member which is likely to produce noise (for example, infrared noise) affecting the communications medium for the data receiving device. In contrast, the configuration of the present embodiment improves communications reliability without any of these solutions, thereby lowering the manufacturing cost of the data receiving device.

In the present embodiment, infrared communications are performed between the data transmitting device 2 and the data receiving device 3b. However, this is not the only possibility for the present invention. The present invention is applicable to any data transmitting and receiving system provided that the system transmits a connection frame prior to the transmission of data frames. The transmission medium may be, for example, a wired line, such as IEEE 1394, USB, an electric power line, a cable TV line, a telephone line, or an ADSL; or wireless, such as Bluetooth®, 802.11 wireless, HDR, a mobile phone network, a satellite line, or a terrestrial digital network, rather than infrared. In addition, the communications medium may be visible light. In that case, the light emitting section 27 used for frame transmission in the data transmitting device 2 and the light receiving section 131 in the data receiving device 3b are replaced respectively with a light emitting section and a light receiving section which are compatible with visible light. Visible light communications benefit more from the present invention than infrared communications because the former more easily meet noise-producing conditions, for example, when there is an inverter-type fluorescence lamp nearby.

In the present embodiment, the memory section 144 stores JPEG data. However, this is not the only possibility; the JPEG data may be decoded to produce a display on an image display section (not shown). Alternatively, the JPEG data stored in the memory section 144 may be sequentially displayed on the image display section. The structure of the image display section is not limited in any particular manner and may be, for example, a liquid crystal display device, a plasma display device, an organic EL display device, or a CRT display device, to name a few. In addition, if the received content data is still images, text, graphics, etc., images may be formed on a storage medium, such as recording paper, by image form means (not shown) according to the nature of the content data. The structure of the image form means is not limited in any particular manner and may be, for example, an inkjet printer or an electrophotographic printer, to name a few. In addition, if the received content data is audio data, the sound may be output from audio output means (ex. speakers, a headphone, or earphones) according to the nature of the audio data.

Embodiment 5

Another embodiment of the present invention will be described. For convenience, members of the present embodiment that have the same arrangement and function as members of the previous embodiments are indicated by the mentioned in those embodiments are indicated by the same reference numerals and description thereof is omitted.

In the data receiving device 3b of embodiment 4, the communication I/F section 132c includes the SIR demodulating section 151 and the FIR demodulating section 152 so that the device 3b can receive both frames transmitted in SIR mode and frames transmitted in FIR mode. In contrast, in the present embodiment, a data receiving device is used which is capable of receiving frames only in a predetermined mode (FIR (4 Mbps) mode in the present embodiment).

5-1. Configuration of Data Receiving Device 3c

Figure 24:
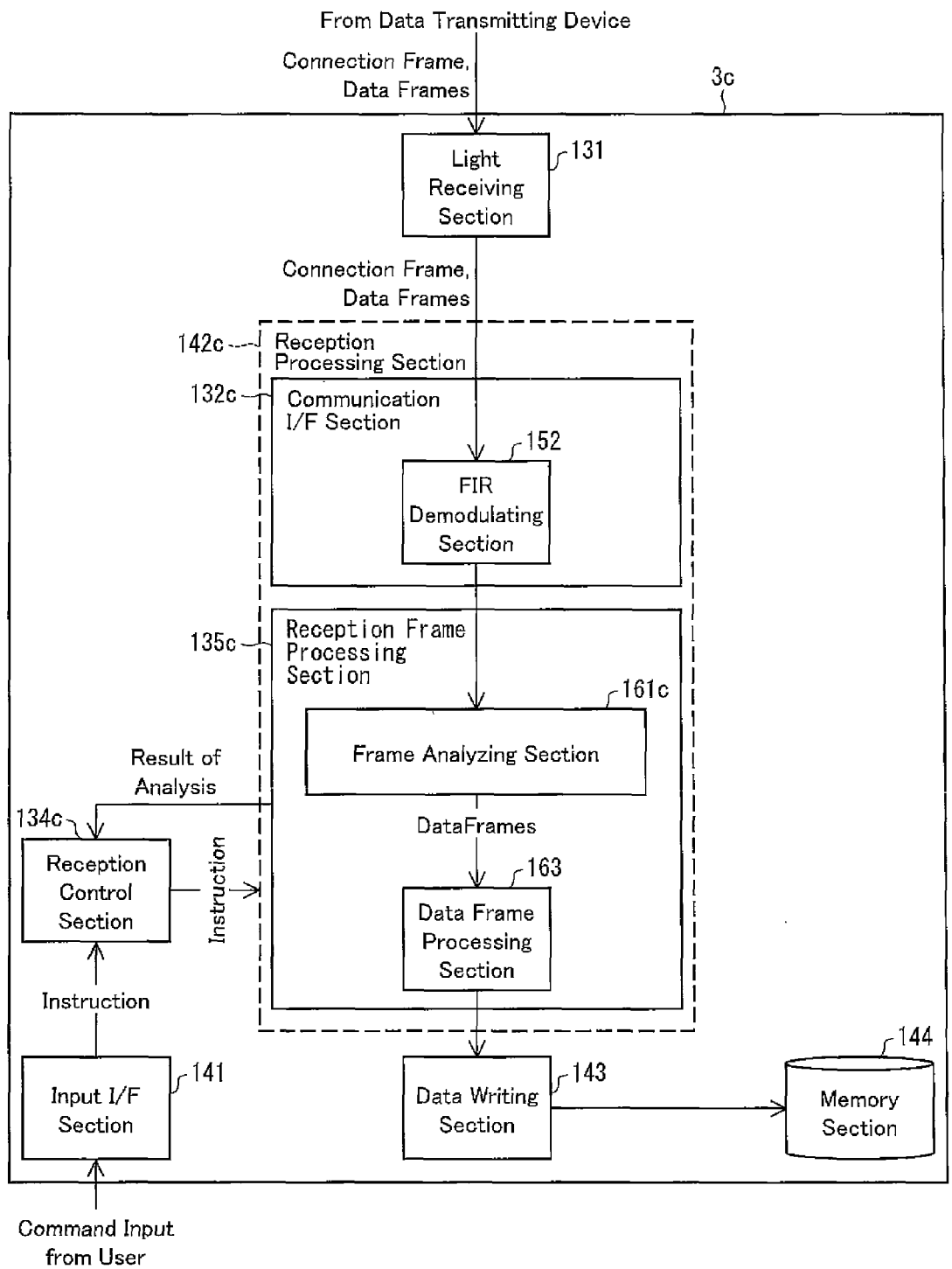
FIG. 24 is a schematic block diagram of a data receiving device of an embodiment of the present invention.

FIG. 24 is a block diagram of a data receiving device 3c in accordance with the present embodiment. The data receiving device 3c replaces the data receiving device 3, 3b in the data transmitting and receiving system 1 of any one of embodiments 1 to 4. The data receiving device 3c can perform communications also with the conventional data transmitting device which transmits a connection frame in SIR mode and thereafter transmits data frames in FIR mode.

The present embodiment will discuss, as an example, a data transmitting and receiving system 1 which transmits image data stored in a mobile phone with a built-in camera (data transmitting device 2) to a liquid crystal television (data receiving device 3c) by IrSS-based infrared communications. This is, however, by no means limiting the application of the present invention.

In addition, the present embodiment will discuss examples in which the data receiving device 3c receives JPEG data (image data) frames as data frames. However, this is not the only possibility; the data frames received by the data receiving device 3c may contain other content data (for example, image data encoded by a different method, text data, audio data, or movie data).

As illustrated in FIG. 24, the data receiving device 3c includes an input I/F section 141, a reception control section (reception mode switching section) 134c, a light receiving section 131, a reception processing section 142c, a data writing section 143, and a memory section 144. The reception processing section 142c includes a communication I/F section 132c and a reception frame processing section 135c. The communication I/F section 132c includes an FIR demodulating section 152.

The communication I/F section 132c includes an FIR demodulating section 152. The FIR demodulating section 152 demodulates the data fed from the light receiving section 131 by a method which matches FIR mode and outputs the demodulated data to the reception frame processing section 135c. Difference from embodiment 4 lies where the SIR demodulating section 151 and the demodulating section selector 153 are not included. However, this is not the only possibility; the same configuration as in embodiment 4 may be used where the SIR demodulating section 151 is not used, and only the FIR demodulating section 152 is used.

The reception frame processing section 135c includes a frame analyzing section 161c and a data frame processing section 163 and performs processing to receive incoming frames from the communication I/F section 132c.

The frame analyzing section 161c analyzes the output (reception data frames) of the communication I/F section 132c to determine whether the received data is a connection frame or a data frame, and sends the reception control section 134c a signal representing the determined result. The section 161c determines, for example, that the received frame is a connection frame if it is in SNRM frame format and that the received frame is a data frame if it is in UI frame format. Alternatively, the frame may have embedded therein a parameter indicating if the frame is a connection frame or a data frame so that the section 161c can determine based on the parameter.

If the received data is a connection frame, the frame analyzing section 161c performs no reception processing; if the received data is a data frame, the section 161c outputs the reception data to the data frame processing section 163. The data frame processing section 163 performs processing similarly to embodiment 4.

The reception control section (reception mode switching section) 134c controls the operation of the various sections of the data receiving device 3c. The reception control section 134c controls the operation of the various sections of the reception processing section 142c, for example, in response to the contents of an incoming request made by the user on the input I/F section 141, to demodulate incoming frames by a predetermined demodulation scheme and to process the frames in a predetermined frame format.

In the present embodiment, the data receiving device 3c is set up to be capable of receiving data frames only in FIR mode, as mentioned earlier. Therefore, the reception control section 134c sets up the light receiving section 131 and the communication I/F section 132c to FIR mode, and only if it has determined that the frame received by the frame analyzing section 161c is a data frame, allows the data frame processing section 163 to perform reception processing.

If the reception control section 134c receives, from the reception frame processing section 135c, a message that the first data frame is received before a message communicating completion of the receiving of the connection frame is received, the reception control section 134c determines that a connection to the data transmitting device 2 has been established and switches the various sections of the reception processing section 142c for data frame reception processing (a state in which the section 142c continues to receive subsequent data frames).

5-2. Operation of Data Receiving Device 3c

Figure 25:
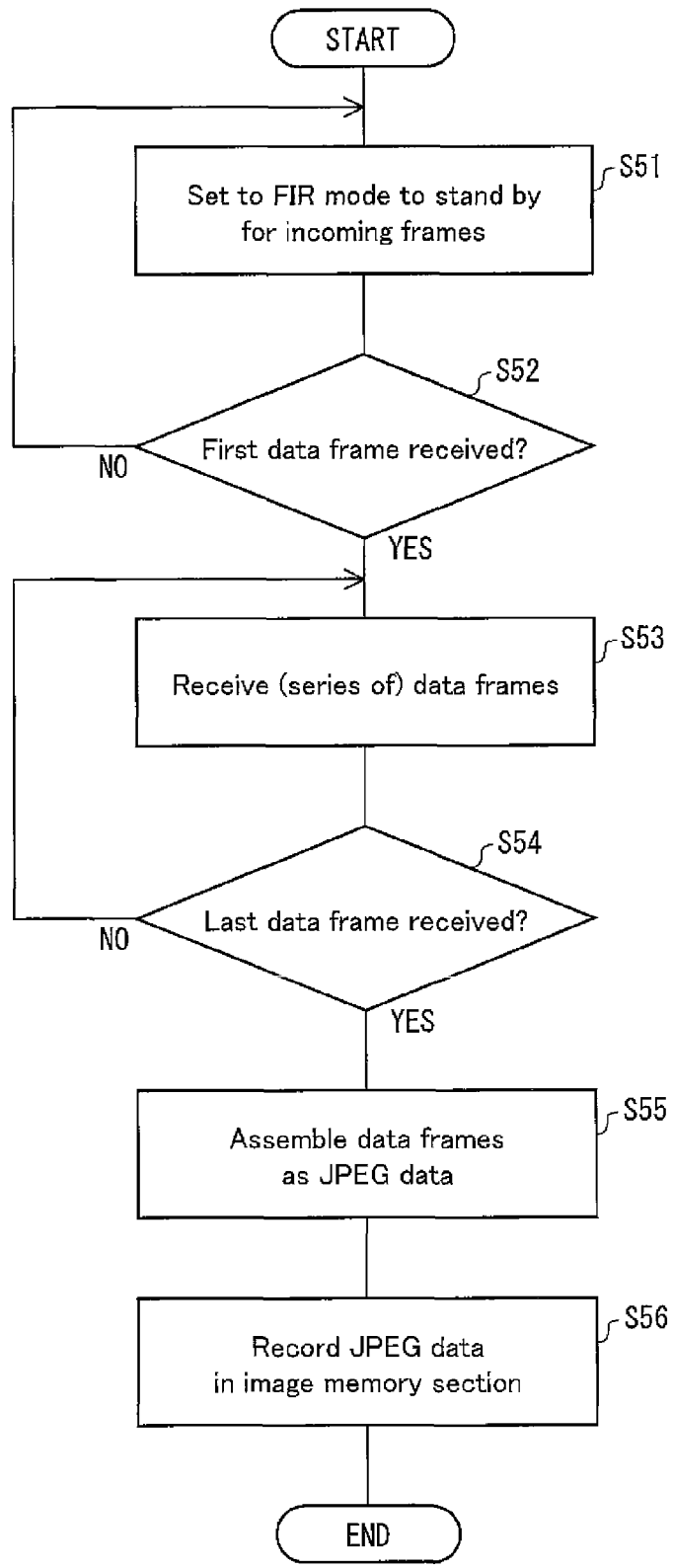
FIG. 25 is a flow chart illustrating processing in the data receiving device shown in FIG. 24.
Figure 26:
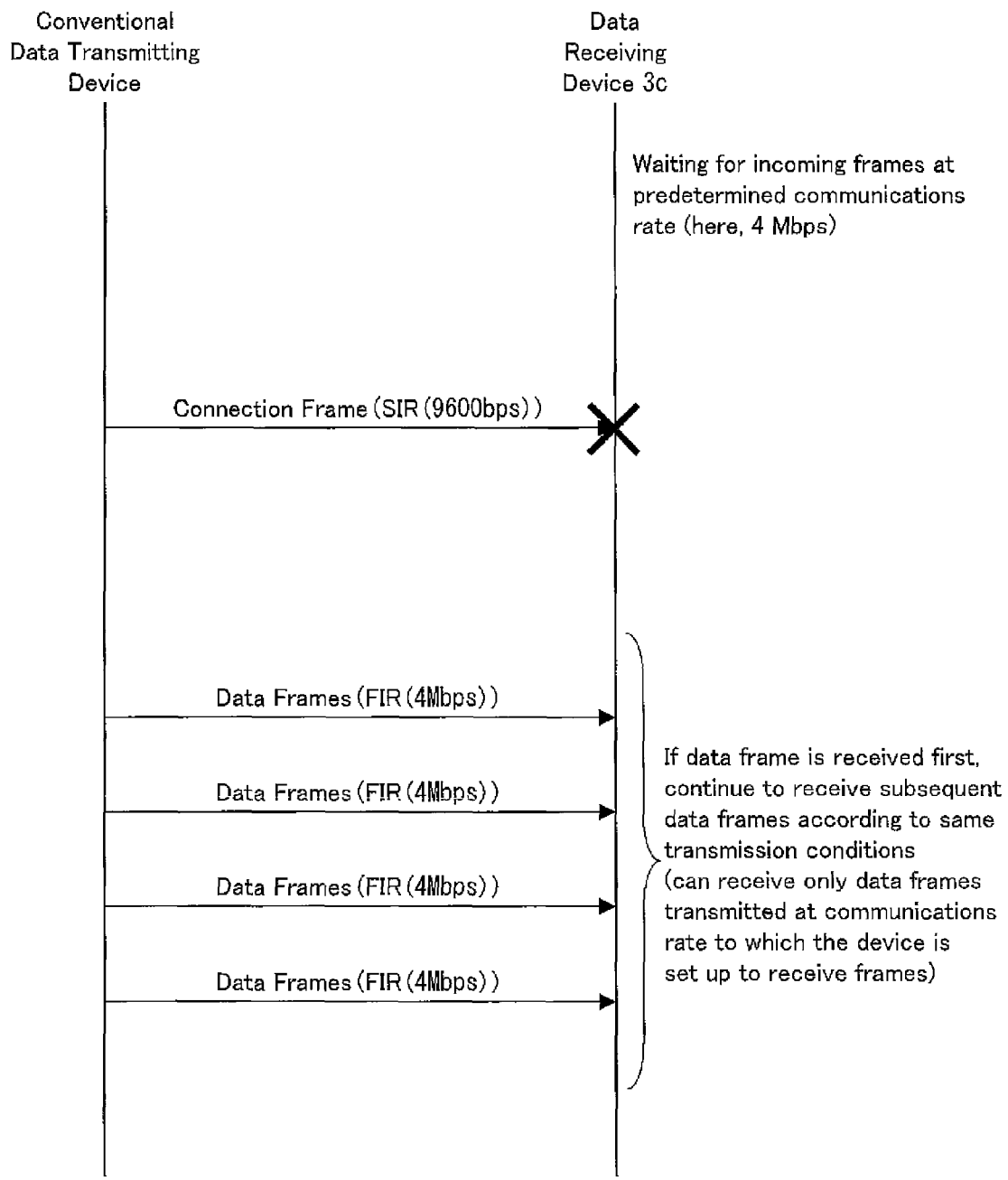
FIG. 26 shows an example of reception timings for a connection frame and data frames in the data receiving device shown in FIG. 24.
Figure 27:
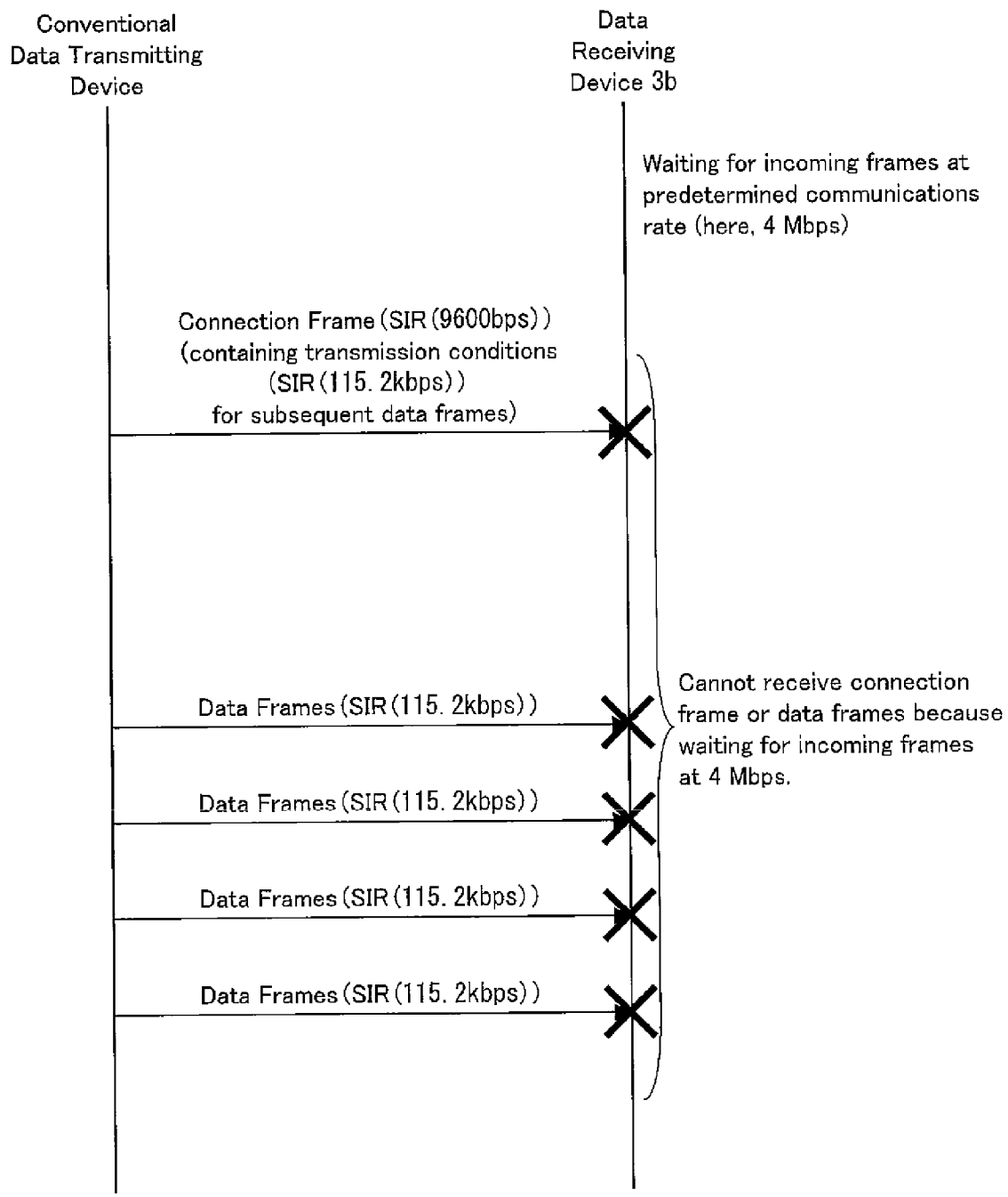
FIG. 27 shows an example of reception timings for a connection frame and data frames in the data receiving device shown in FIG. 24.

Next, the operation of the data receiving device 3c during reception processing will be described in reference to FIGS. 25 to 27. FIG. 25 is a flow chart illustrating the flow of reception processing in the data receiving device 3c. FIG. 26 is a timing chart for communications between the conventional data transmitting device which transmits a connection frame in SIR mode (9,600 bps) before transmitting data frames in FIR mode (4 Mbps) and the data receiving device 3c. FIG. 27 is a timing chart for communications performed between the conventional data transmitting device which transmits a connection frame in SIR mode (9,600 bps) before transmitting data frames in SIR mode (115.2 kbps) and the data receiving device 3c.

First, the reception control section 134c defaults the light receiving section 131 and the communication I/F section 132c to FIR mode (4 Mbps) to stand by for an incoming frame (initial state) (S51).

The reception control section 134c then determines whether or not a data frame has been received (S52). If not, the section 134c maintains the standby state for an incoming frame in FIR mode (4 Mbps). If a data frame has been received, the section 134c proceeds to S53.

When the light receiving section 131 has received a data frame in FIR mode transmitted from the data transmitting device 2, the received data frame is passed through the FIR demodulating section 152 in the communication I/F section 132c to the reception frame processing section 135c. The frame passed to the reception frame processing section 135c is analyzed by the frame analyzing section 161c and found to be a data frame. As a result, the frame analyzing section 161c transmits to the reception control section 134c a message that a data frame has been received. At the same time, the received data frame is sent to the data frame processing section 163 for analysis and sequentially stored in memory (not shown). The reception control section 134c determines whether or not a data frame has been received, according to the message sent from the frame analyzing section 161c.

If it is determined in S52 that a data frame has been received, the reception control section 134c causes to continue to receive subsequent data frames (S53), that is, sequentially transfer a series of data frames to the data frame processing section 163 for analysis and sequentially store them in memory (not shown).

As mentioned earlier, in the data receiving device 3c, the light receiving section 131 and the communication I/F section 132c are set to FIR (4 Mbps) mode in the initial state (default). Thus, the data receiving device 3c can receive a data frame transmitted in FIR (4 Mbps) mode subsequent data frames in FIR (4 Mbps) mode, even without first having to receiving a connection frame as illustrated in FIG. 26. In other words, if a data frame has been received, irrespective of whether a connection frame has been received or not, the data receiving device 3c regards a connection as having been established with the data transmitting device 2 and receives subsequent data frames. Therefore, the data receiving device 3c can receive data frames from the conventional data transmitting device which transmits data frames in FIR (4 Mbps) mode after transmitting a connection frame in SIR mode as a connection frame. If the data frames are transmitted by a method other than FIR (4 Mbps) mode, the data frames cannot be received as illustrated in FIG. 27.

Thereafter, the reception control section 134c determines whether or not the last data frame has been received (S54). If it is determined that the last data frame has not been received, the process continues at S53. On the other hand, if it is determined that the last data frame has been received, the process proceeds to S55.

If it is determined in S54 that the last data frame has been received, the reception control section 134c controls the data frame processing section 163 to assemble the data frames stored in the memory into JPEG data (S55) for output to the data writing section 143. Thereafter, the reception control section 134c controls the data writing section 143 to store the JPEG data in the memory section 144 (S56) and ends the process.

As described in the foregoing, the data receiving device 3c is defaulted to stand by so that it can receive data frames in FIR (4 bps) mode (initial state). Upon receiving a data frame in FIR mode, the device 3c continues to receive a series of data frames transmitted subsequently that data frame.

Accordingly, for example, even in an environment where there is so much infrared noise that it would be otherwise difficult to receive frames transmitted in SIR mode (low velocity communications mode), the device 3c can receive data frames transmitted in FIR (4 Mbps) mode with improved reliability in data reception in IrSS-based infrared communications. In addition, there is no need to includes the SIR demodulating section 151, the demodulating section selector 153, and the connection frame processing section 162; packaging is easier than with the data receiving device 3b of embodiment 4, and circuit size can be reduced. In addition, Conventional technology required a solution for noise problems at additional manufacturing cost to maintain reliability in communications. For example, a noise filter (for example, infrared noise filter made of glass) may need to be mounted to a member which is likely to produce noise (for example, infrared noise) affecting the communications medium for the data receiving device. In contrast, the configuration of the present embodiment improves communications reliability without any of these solutions, thereby lowering the manufacturing cost of the data receiving device.

The IrSS standards specifies 2,400 bps, 9,600 bps, 19,200 bps, 38,400 bps, 57,600 bps, and 115,200 bps (for SIR); 0.57 Mbps and 1.152 Mbps (for MIR); 4 Mbps (for FIR); and 16 Mbps (VFIR) as bit rates. IrSS-compatible conventional data transmitting devices available on the market, however, employ 4 Mbps FIR as the bit rate for UI frames. Therefore, even if the SNRM frame (connection frame) is not received, the data frames can be normally received by setting the receiving device to stand by for an incoming frame in FIR (4 Mbps) mode.

Note that in a default mode (initial state), the receiving device may be set up to be able to receive data frames at a bit rate other than 4 Mbps; the bit rate may be suitably determined by considering the transfer bit rate and other expected properties of the data transmitting device. That improves reliability in communications with expected data transmitting devices. The receiving device, if defaulted to receive frames at a bit rate of 4 Mbps or faster further, will be less likely to be affected by infrared and other noise and thus improves communications reliability.

The medium used for the transmission of the data frames is by no means limited to infrared. The transmission medium may be, for example, a wired line, such as visible light, IEEE 1394, USB, an electric power line, a cable TV line, a telephone line, or an ADSL; or wireless, such as Bluetooth®, 802.11 wireless, HDR, a mobile phone network, a satellite line, or a terrestrial digital network, rather than infrared.

In the present embodiment, the memory section 144 stores JPEG data. However, this is not the only possibility. For example, similarly to embodiment 4, images may be reproduced from the reception data on an image display section (not shown), images may be formed on a storage medium, such as recording paper, or sound may be output from audio output means.

Embodiment 6

Another embodiment of the present invention will be described. For convenience, members of the present embodiment that have the same arrangement and function as members of the previous embodiments and that are mentioned in those embodiments are indicated by the same reference numerals and description thereof is omitted.

In the present embodiment, the data receiving device includes light receiving sections and communication I/F sections in multiple pairs. Each pair of a light receiving section and a communication I/F section is defaulted (initial state) to stand by for incoming frames either by a different modulation scheme or at a different transfer rate, or both, from the other pair(s).

6-1. Configuration of Data Receiving Device 3d

Figure 28:
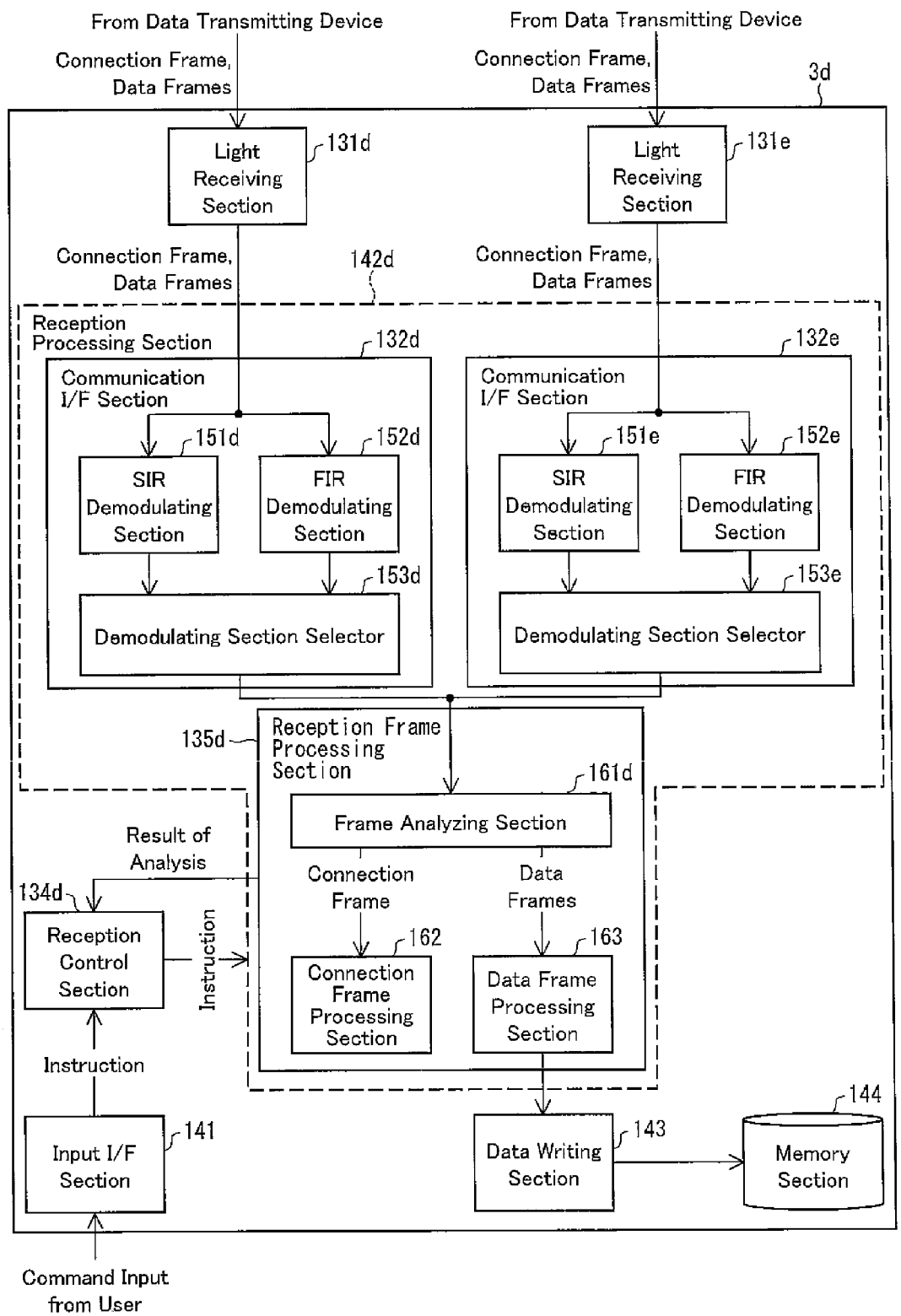
FIG. 28 is a schematic block diagram of a data receiving device of an embodiment of the present invention.

FIG. 28 is a block diagram of a data receiving device 3d in accordance with the present embodiment. The data receiving device 3d replaces the data receiving devices 3, 3b, 3c in the data transmitting and receiving system 1 of any one of embodiments 1 to 5. The data receiving device 3d can perform communications also with the conventional data transmitting device which transmits a connection frame in SIR mode and thereafter transmits data frames in FIR mode.

The present embodiment will discuss, as an example, a data transmitting and receiving system 1 which transmits image data stored in a mobile phone with a built-in camera (data transmitting device 2) to a liquid crystal television (data receiving device 3d) by IrSS-based infrared communications. This is, however, by no means limiting the application of the present invention.

In addition, the present embodiment will discuss examples in which the data receiving device 3d receives JPEG data (image data) frames as data frames. However, this is not the only possibility; the data frames received by the data receiving device 3d may contain other content data (for example, image data encoded by a different method, text data, audio data, or movie data).

As illustrated in FIG. 28, the data receiving device 3d includes an input I/F section 141, a reception control section (reception mode switching section) 134d, a light receiving section (receiving section) 131d, 131e, a reception processing section 142d, a data writing section 143, and a memory section 144. The reception processing section 142d includes communication I/F sections 132d, 132e and a reception frame processing section 135d. The communication I/F section 132d includes an SIR demodulating section (demodulating section) 151d, an FIR demodulating section (demodulating section) 152d, and a demodulating section selector 153d. The communication I/F section 132e includes an SIR demodulating section (demodulating section) 151e, an FIR demodulating section (demodulating section) 152e, and a demodulating section selector 153e.

The light receiving sections 131d, 131e are similarly to the light receiving section 131 in embodiments 1 to 5.

The communication I/F section 132d includes an SIR demodulating section 151d, an FIR demodulating section 152d, and a demodulating section selector 153d. The SIR demodulating section 151d demodulates the data fed from the light receiving section 131d by a method which matches SIR mode and outputs the demodulated data to the demodulating section selector 153d. The FIR demodulating section 152d demodulates the data fed from the light receiving section 131d by a method which matches FIR mode and outputs the demodulated data to the demodulating section selector 153d. The demodulating section selector 153d outputs either the output of the SIR demodulating section 151d or the output of the FIR demodulating section 152d to the reception frame processing section 135d according to an instruction from the reception control section 134d.

The communication I/F section 132e includes an SIR demodulating section 151e, an FIR demodulating section 152e, and a demodulating section selector 153e. The SIR demodulating section 151e demodulates the data fed from the light receiving section 131e by a method which matches SIR mode and outputs the demodulated data to the demodulating section selector 153e. The FIR demodulating section 152e demodulates the data fed from the light receiving section 131e by a method which matches FIR mode and outputs the demodulated data to the demodulating section selector 153e. The demodulating section selector 153e outputs either the output of the SIR demodulating section 151c or the output of the FIR demodulating section 152e to the reception frame processing section 135e according to an instruction from the reception control section 134d.

The reception frame processing section 135d includes a frame analyzing section 161d, a connection frame processing section 162, and a data frame processing section 163.

The frame analyzing section 161d analyzes the outputs (reception data frames) of the demodulating section selectors 153d, 153e to determine whether the received frame is a connection frame or a data frame, and sends the reception control section 134d a signal representing the determined result and a signal indicating whether the received frame is either a frame in SIR mode or a frame in FIR mode. The section 161d determines for example, that the received frame is a connection frame if it is in SNRM frame format and that the received frame is a data frame if it is in UI frame format. Alternatively, the frame may have embedded therein a parameter indicating if the frame is a connection frame or a data frame so that the section 161d can determine based on the parameter.

If the received data is a connection frame, the frame analyzing section 161d outputs the reception data to the connection frame processing section 162; if the received data is a data frame, the section 161d outputs the reception data to the data frame processing section 163.

The reception control section (reception mode switching section) 134d controls the operation of the various sections of the data receiving device 3d. The reception control section 134d controls the operation of the various sections of the reception processing section 142d, for example, in response to the contents of an incoming request made by the user on the input I/F section 141, to demodulate the incoming frames by a predetermined demodulation scheme and to process the frames in a predetermined frame format.

Furthermore, the reception control section 134d obtains from the reception frame processing section 135d information on transmission conditions (ex. bit rate) for subsequent data frames communicated by the connection frame. The section 134d generates a mode switch instruction signal according to the information for output to the light receiving sections 131d, 131e and the communication I/F sections 132d, 131e. For example, the light receiving section 131d and the communication I/F section 132d are defaulted to operate in SIR mode, and the light receiving section 131e and the communication I/F section 132e are defaulted to operate in FIR mode (initial state). Upon receiving a message from the reception frame processing section 135d that a connection frame has been received and also receiving a message on information on transmission conditions for subsequent data frames communicated by the connection frame, the section 134d generates a mode switch instruction signal according to the information for output to the light receiving section 131d and communication I/F section 132d and/or the light receiving section 131e and the communication I/F section 132e. The section 134d then determines that a connection to the data transmitting device 2 has been established and switches the various sections of the reception processing section 142*d* for standby for incoming data frames.

If the reception control section 134*d* receives, from the reception frame processing section 135*d*, a message that the first data frame is received before a message communicating completion of the receiving of the connection frame is received, the reception control section 134*d* determines that a connection to the data transmitting device 2 has been established and switches the various sections of the reception processing section 142*d* for data frame reception processing (a state in which the section 142*d* continues to receive subsequent data frames).

6-2. Operation of Data Receiving Device 3*d*

Figure 29:
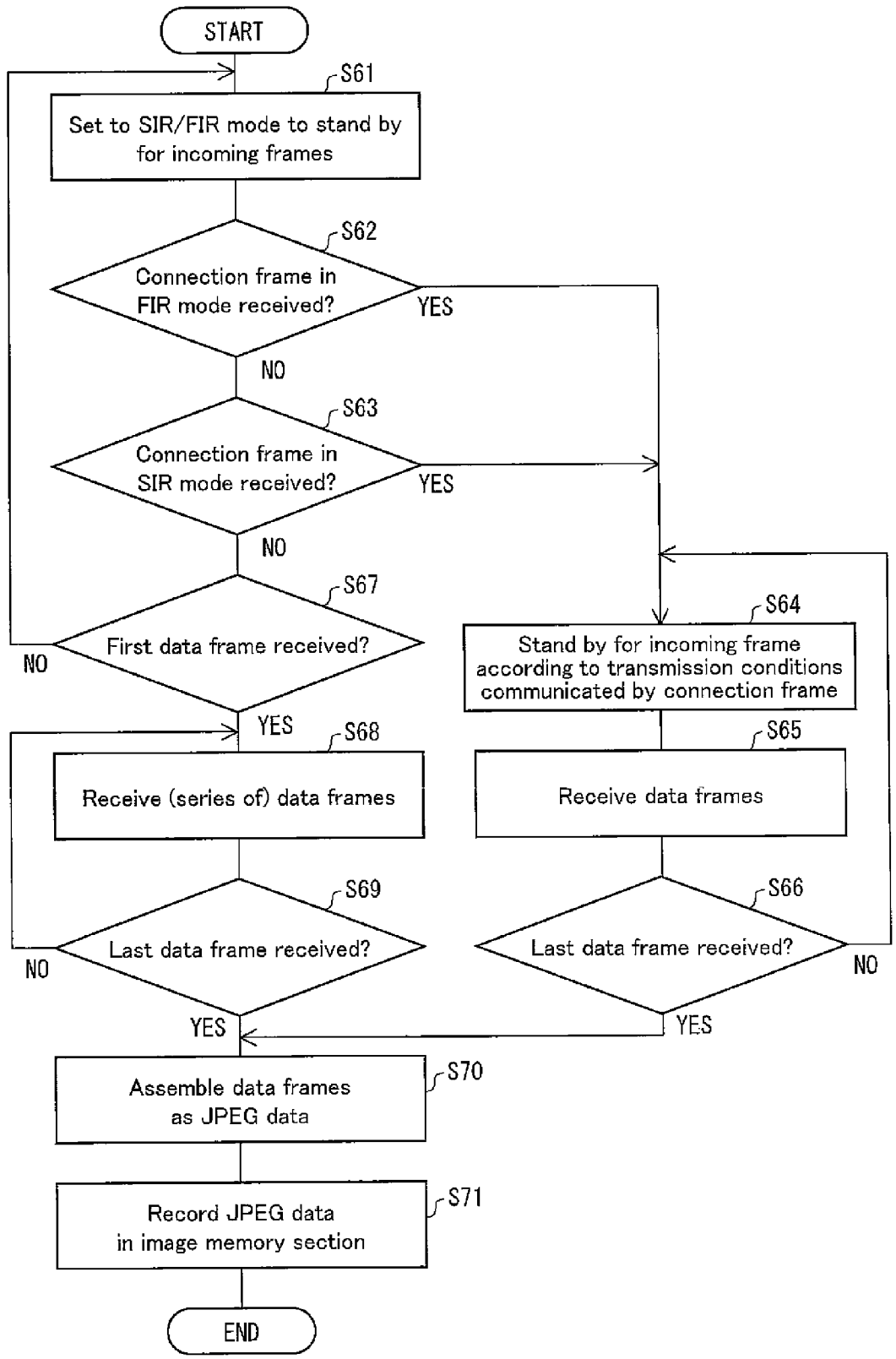
FIG. 29 is a flow chart illustrating processing in the data receiving device shown in FIG. 28.
Figure 30:
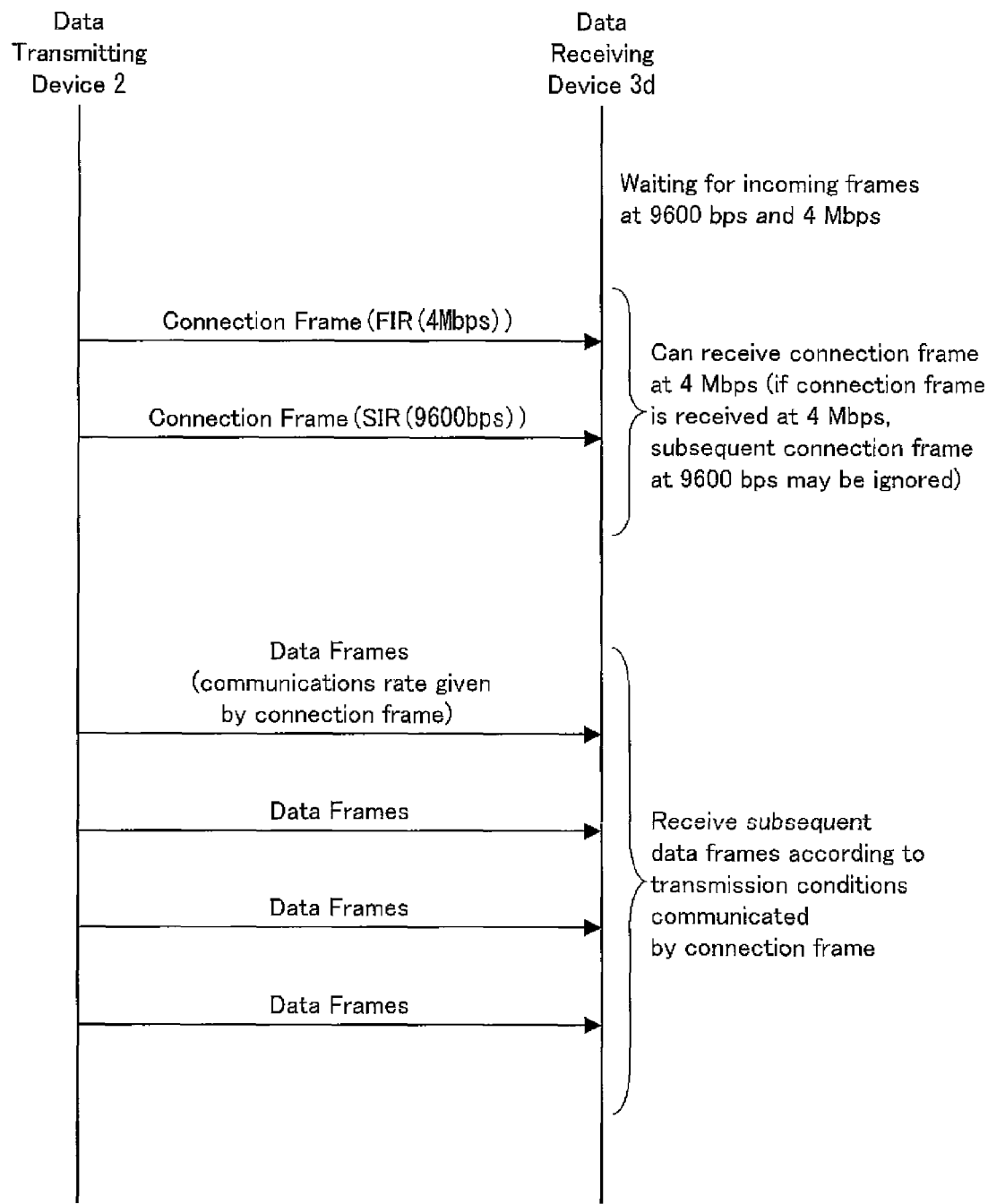
FIG. 30 shows an example of reception timings for a connection frame and data frames in the data receiving device shown in FIG. 28.
Figure 31:
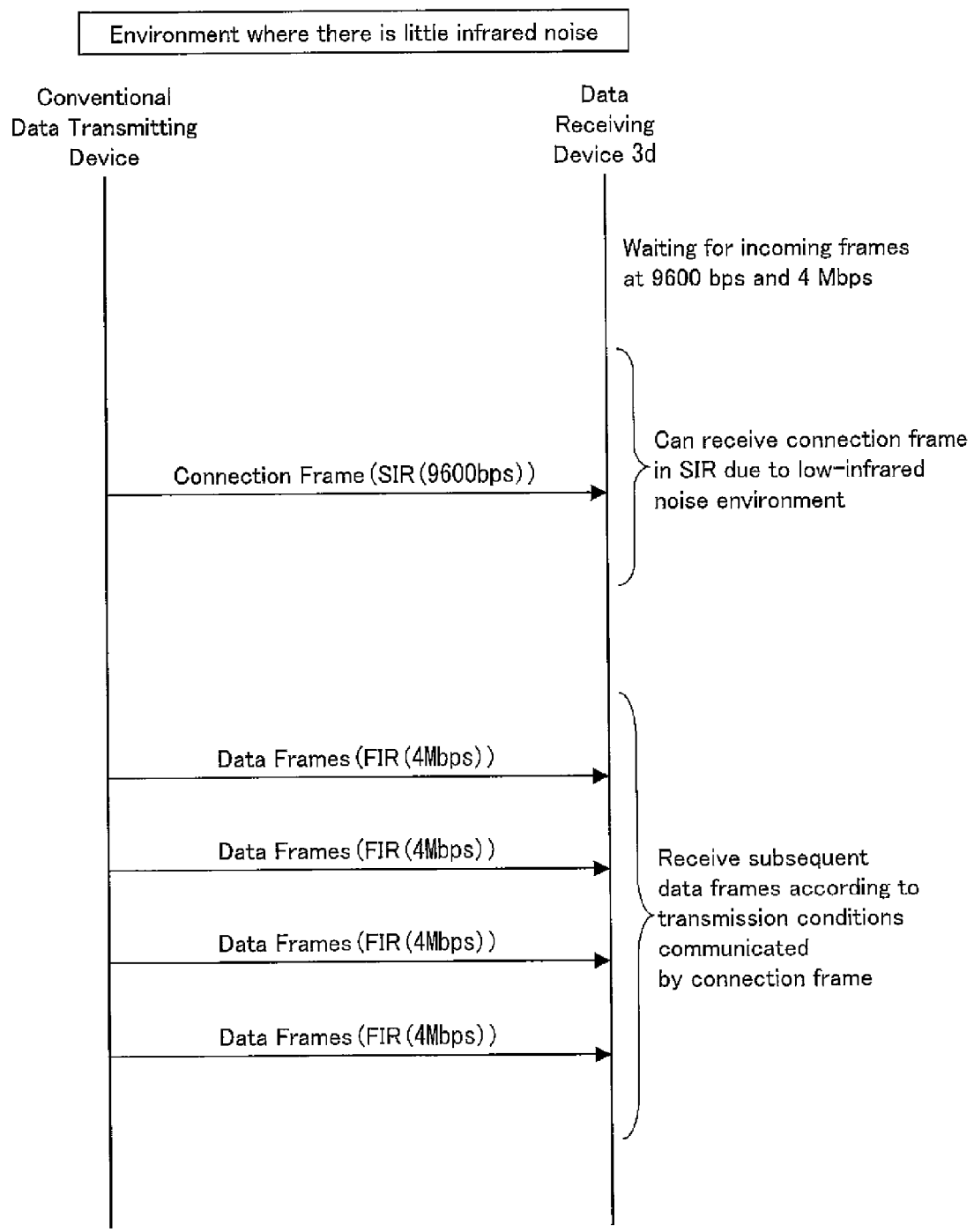
FIG. 31 shows an example of reception timings for a connection frame and data frames in the data receiving device shown in FIG. 28.
Figure 32:
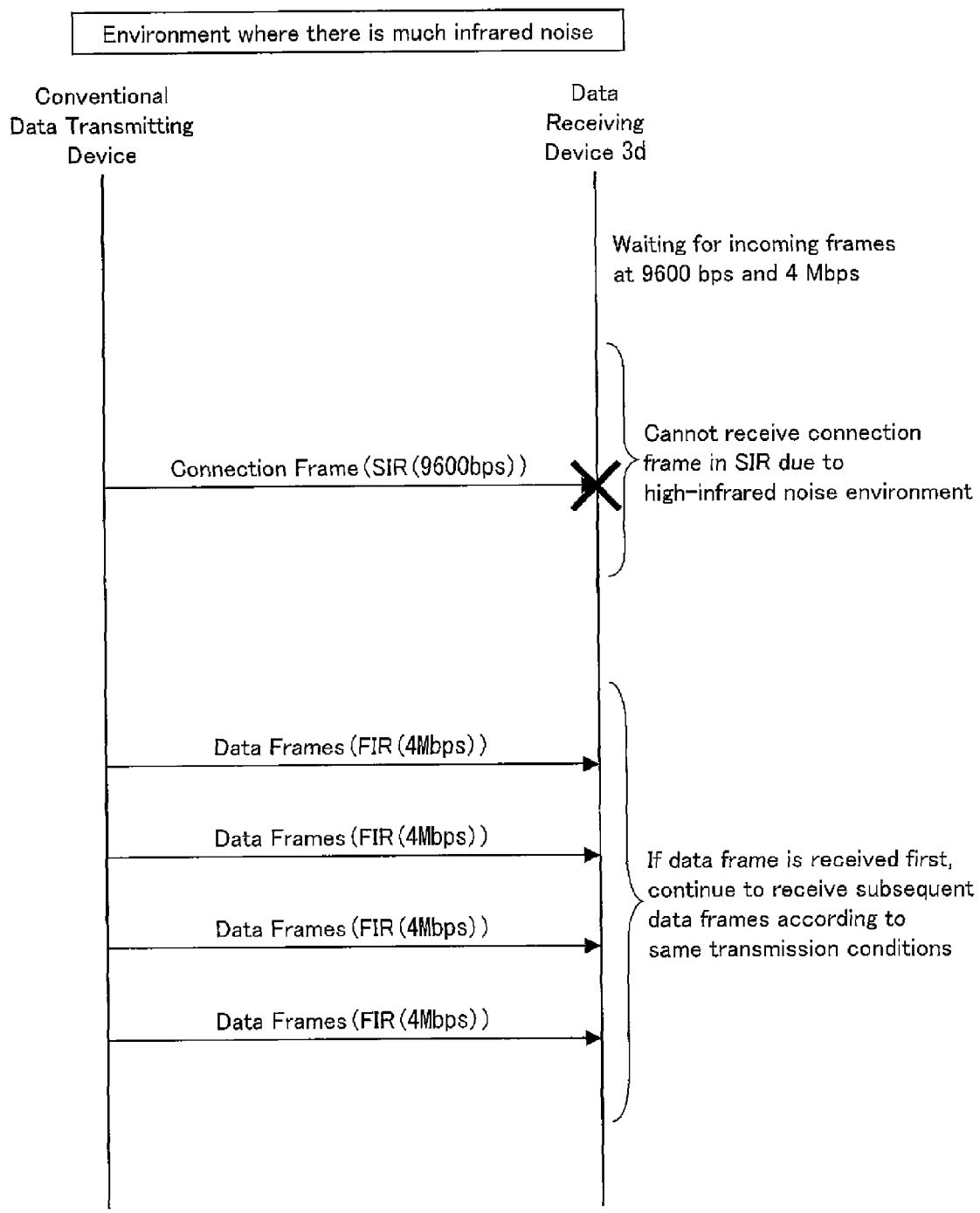
FIG. 32 shows an example of reception timings for a connection frame and data frames in the data receiving device shown in FIG. 28.

Next, the operation of the data receiving device 3*d* during reception processing will be described in reference to FIGS. 29 to 32. FIG. 29 is a flow chart illustrating the flow of reception processing in the data receiving device 3*d*. FIG. 30 is a timing chart for communications between the data receiving device 3*d* and the data transmitting device 2, that is, a data transmitting device which transmits data frames in FIR mode after transmitting a connection frame in SIR mode and a connection frame in FIR mode. FIGS. 31 and 32 are timing charts for communications between the conventional data transmitting device which transmits data frames in FIR mode after transmitting a connection frame in SIR mode and the data receiving device 3*d*. FIG. 31 illustrates a case where a connection frame can be normally received, whilst FIG. 32 illustrates a case where a connection frame is difficult to receive.

First, the reception control section 134*d* defaults the light receiving section 131*d* and the communication I/F section 132*d* to SIR mode to stand by for an incoming frame (initial state) and the light receiving section 131*e* and the communication I/F section 132*e* to FIR mode to stand by for an incoming frame (S61).

The reception control section 134*d* then monitors to see whether or not a connection frame in FIR mode has been received, that is, whether or not a message that a connection frame in FIR mode was received has been received from the reception frame processing section 135*d* (S62).

In the reception standby state, the light receiving section 131*e* and the communication I/F section 132*e* are set to FIR mode. As described in reference to FIG. 9, the data transmitting device 2 first transmits a connection frame in FIR mode and thereafter transmits a connection frame in SIR mode. After transmitting both the connection frames, one in FIR mode and the other in SIR mode, the device 2 transmits data frames in FIR mode. Therefore, as illustrated in FIG. 30, the device 3*d* can normally receive the connection frame transmitted in FIR mode in the reception standby state. Accordingly, the device 3*d* can receive the data frames according to the transmission conditions communicated by the connection frame transmitted by a modulation scheme which is less likely to be affected by infrared noise (here, FIR mode). The device 3*d* can properly receive the data frames (the data transmitting device 2 and the data receiving device 3*d* can be properly connected).

The device 3*d* may be set up to ignore the connection frame in SIR mode if the preceding connection frame in FIR mode was normally received. Accordingly, the device 3*d* can receive the data frames based on the connection frame transmitted by a modulation scheme which is less likely to be affected by infrared noise. The device 3*d* can properly receive the data frames (the data transmitting device 2 and the data receiving device 3*d* can be properly connected).

If both the connection frame in SIR mode and the connection frame in FIR mode have been received or if the connection frame in FIR mode has been normally received, but the connection frame in SIR mode has not, the device 3*d* can receive the data frames based on the connection frame in FIR mode.

If the data transmitting device is configured to transmit a connection frame in SIR mode before transmitting a connection frame in FIR mode, and if the device 3*d* has normally received the connection frame in SIR mode, the device 3*d* may receive the data frames based on the connection frame in SIR mode and ignore the connection frame in FIR mode.

If it is determined in S62 that the connection frame in FIR mode has been received, the reception control section 134*d* proceeds to S64.

On the other hand, if it is determined that the connection frame in FIR mode has not been received, the reception control section 134*d* monitors to see whether or not the connection frame in SIR mode has been received, that is, whether or not a message that a connection frame in SIR mode was received from the reception frame processing section 135*d* S63.

In the reception standby state, the light receiving section 131*d* and the communication I/F section 132*d* are set to SIR mode. Therefore, as illustrated in FIG. 31, the device 3*d* can normally receive the connection frame transmitted in SIR mode in a communications environment where there is little infrared noise.

If it is determined in S63 that the connection frame in SIR mode has been received, the reception control section 134*d* proceeds to S64; if it is determined that the connection frame in SIR mode has not been received, the section 134*d* proceeds to S67.

If either the connection frame in FIR mode or the connection frame in SIR mode has been received, the section 134*d* sets the various sections of the data receiving device 3*d* to the communications mode which matches the transmission conditions communicated by the connection frame to stand by for incoming data frames (S64).

For example, if the connection frame in FIR mode is received, and the connection frame specifies FIR mode as a data frame transmission condition, the section 134*d* sets up to receive the data frames using the light receiving section 131*e* and the FIR demodulating section 152*c* in accordance with the transmission condition; if the connection frame in FIR mode is received, and the connection frame specifies SIR mode as a data frame transmission condition, the section 134*d* sets up to receive the data frames using the light receiving section 131*e* and the SIR demodulating section 151*e* in accordance with the transmission condition. On the other hand, if the connection frame in SIR mode is received, and the connection frame specifies FIR mode as a data frame transmission condition, the section 134*d* sets up to receive the data frames using the light receiving section 131*d* and the FIR demodulating section 152*d* in accordance with the transmission condition; if the connection frame in SIR mode is received, and the connection frame specifies SIR mode as a data frame transmission condition, the section 134*d* sets up to receive the data frames using the light receiving section 131*d* and the SIR demodulating section 151*d* in accordance with the transmission condition.

However, this is not the only possibility. Irrespective of whether the connection frame is in SIR mode or in FIR mode, the section 134*d* may set up to receive the data frames using the light receiving section 131*e* and the FIR demodulating section 152*e* in accordance with a data frame transmission condition if the connection frame specifies FIR mode as the transmission condition; the section 134d may set up to receive the data frames using the light receiving section 131d and the SIR demodulating section 151d in accordance with a data frame transmission condition if the connection frame specifies SIR mode as the transmission condition. In this case, the FIR demodulating section 152d, the demodulating section selector 153d, the SIR demodulating section 151e, and the demodulating section selector 153e may be omitted.

Thereafter, the reception control section 134d may sequentially receive, through the light receiving section 131d or 131e, the data frames transmitted subsequently to the connection frame from the data transmitting device (S65) and transfers the data frames via the communication I/F section 132d or 132e for storage in the reception frame processing section 135d as illustrated in FIGS. 30 and 31.

Thereafter, the reception control section 134d determines whether or not all the data frames have been received (S66). This decision can be made by, for example, whether or not a DISC frame has been received. If not all the data frames have been received, the process proceeds to S64 and continues to subsequent steps. If all the data frames have been received, the process proceeds to S70.

On the other hand, if it is determined in S63 that the connection frame in SIR mode has not been received, the reception control section 134D determines whether or not it has received a data frame (S67).

If it is determined in S67 that no data frame has been received, the reception control section 134d proceeds to S61 and its subsequent steps.

On the other hand, if it is determined in S67 that a data frame has been received, the reception control section 134d controls to continue to receive the subsequent data frames (S68).

As mentioned earlier, in the data receiving device 3d, the light receiving section 131e and the communication I/F section 132e are set to FIR mode in the initial state (default). Thus, the data receiving device 3d can normally receive a data frame transmitted in FIR mode as illustrated in FIG. 32 even if no connection frame has not been normally received due to, for example, a communications environment where there is so much infrared noise. In other words, if the data receiving device 3d receives a data frame before receiving a connection frame, the device 3d regards a connection as having been established with the data transmitting device 2 and receives subsequent data frames.

Thereafter, the reception control section 134d determines whether or not the last data frame has been received (S69). If it is determined that the last data frame has not been received, the process continues at S68. On the other hand, if it is determined that the last data frame has been received, the process proceeds to S70.

If it is determined in S66 or S69 that the last data frame has been received, the reception control section 134d controls the data frame processing section 163 to assemble the data frames stored in the memory into JPEG data (S70) for output to the data writing section 143. Thereafter, the reception control section 134d controls the data writing section 143 to store the JPEG data in the memory section 144 (S71), and ends the process.

As described in the foregoing, the data receiving device 3d defaults the light receiving section 131d and the communication I/F section 132d to a state where the sections 131d and 132d can receive frames in SIR mode (initial state) to stand by for incoming frames and defaults the light receiving section 131e and the communication I/F section 132e to a state where the sections 131e and 132e can receive frames in FIR mode (initial state) to stand by for incoming frame. Upon receiving a connection frame in SIR mode and/or FIR mode, the device 3d receives the data frames transmitted subsequently to the connection frame in accordance with the transmission conditions communicated by the received connection frame. In addition, if a data frame in FIR mode is received, the device 3d continues to receive a series of data frames transmitted subsequently to that data frame.

Accordingly, for example, even in an environment where there is so much infrared noise that it would otherwise difficult to receive frames transmitted in SIR mode, the device 3d can receive frames (connection frame or data frames) transmitted in FIR mode and receive subsequent data frames according to results of the reception, with improved reliability in data reception. In addition, irrespective of whether a connection frame has been received or not, the device 3d can receive data frames transmitted at the predetermined bit rate; the data is received more reliably.

In a communications environment where there is little effect of infrared noise, the device 3d can receive the connection frame in SIR mode. Therefore, in an environment where there is not much infrared noise, the device 3d can receive data from a data transmitting device which transmits only a connection frame in SIR mode as the connection frame as specified by IrSS standards. Therefore, a receiving device is realized which complies with IrSS standards and at the same time is more resistant to errors.

The medium used for the transmission of the data frames is by no means limited to infrared. The transmission medium may be, for example, a wired line, such as visible light, IEEE 1394, USB, an electric power line, a cable TV line, a telephone line, or an ADSL; or wireless, such as Bluetooth®, 802.11 wireless, HDR, a mobile phone network, a satellite line, or a terrestrial digital network, rather than infrared.

In the present embodiment, the memory section 144 stores JPEG data. However, this is not the only possibility. For example, similarly to embodiments 4, 5, images may be reproduced from the reception data on an image display section (not shown), images may be formed on a storage medium, such as recording paper, or sound may be output from audio output means.

In the embodiments, the various sections of the data receiving devices 3b, 3c, 3d (ex. part of the reception control sections 134b, 134c, 134d, the reception processing sections 142b, 142c, 142d, and the light receiving sections 131, 131d, 131e) are realized by software executed by a CPU or like processor. More specifically, the various sections of the data receiving devices 3b, 3c, 3d each include, among others, a CPU (central processing unit) and memory devices (storage media). The CPU executes instructions contained in control programs, realizing various functions. The memory devices may be a ROM (read-only memory) which contains programs, a RAM (random access memory) to which the programs are loaded, or a memory containing the programs and various data. The objective of the present invention can be achieved by mounting to data receiving devices 3b, 3c, 3d a computer-readable storage medium containing control program code (executable programs, intermediate code programs, or source programs) for the data receiving devices 3b, 3c, 3d which is software realizing the aforementioned functions, in order for the computer (or CPU, MPU) to retrieve and execute the program code contained in the storage medium.

The storage medium may be, for example, a tape, such as a magnetic tape or a cassette tape; a magnetic disk, such as a Floppy® disk or a hard disk, or an optical disc, such as CD-ROM/MO/MD/DVD/CD-R; a card, such as an IC card (memory card) or an optical card; or a semiconductor memory, such as a mask ROM/EPROM/EEPROM/flash ROM.

The data receiving devices 3b, 3c, 3d may be arranged to be connectable to a communications network so that the program code may be delivered over the communications network. The communications network is not limited in any particular manner, and may be, for example, the Internet, an intranet, extranet, LAN, ISDN, VAN, CATV communications network, virtual dedicated network (virtual private network), telephone line network, mobile communications network, or satellite communications network. The transfer medium which makes up the communications network is not limited in any particular manner, and may be, for example, a wired line, such as IEEE 1394, USB, an electric power line, a cable TV line, a telephone line, or an ADSL; or wireless, such as infrared (IrDA, remote control), Bluetooth®, 802.11 wireless, HDR, a mobile telephone network, a satellite line, or a terrestrial digital network. The present invention encompasses a carrier wave, or data signal transmission, by which the program code is embodied electronically.

The various sections of the data receiving devices 3b, 3c, 3d may not be implemented by software. They may be implemented entirely by hardware or in a combination of hardware responsible for part of the processing and computing means implementing software for control of the hardware and the rest of the processing.

The present invention is not limited to the description of the embodiments above, but may be altered by a skilled person within the scope of the claims. An embodiment based on a proper combination of technical means disclosed in different embodiments is encompassed in the technical scope of the present invention.

As described in the foregoing, a first data transmitting device of the present invention is characterized in that the data transmitting device includes: a modulating section for modulating frames to be transmitted to a data receiving device; and a transmitting section for transmitting the modulated frames to the data receiving device, wherein the data transmitting device transmits, to the data receiving device, a plurality of connection frames each representing a transmission condition for data frames containing content information before transmitting the data frames to the data receiving device, the plurality of connection frames differing from each other in at least either one of modulation scheme and transfer rate.

A first data transmitting method of the present invention is characterized in that the method includes the connection transmission step of transmitting, from a data transmitting device to a data receiving device, a plurality of connection frames each representing a transmission condition for data frames containing content information before transmitting the data frames from the data transmitting device to the data receiving device, the plurality of connection frames differing from each other in at least either one of modulation scheme and transfer rate.

A first data transmitting and receiving system of the present invention includes: a data transmitting device and a data receiving device, the data transmitting device including a modulating section for modulating frames to be transmitted to the data receiving device; and a transmitting section for transmitting the modulated frames to the data receiving device, the data transmitting device transmitting, to the data receiving device, a plurality of connection frames each representing a transmission condition for data frames containing content information before transmitting the data frames to the data receiving device, the data receiving device receiving the connection frame and receiving the data frames according to the transmission condition communicated by the received connection frame, the plurality of connection frames differing from each other in at least either one of modulation scheme and transfer rate.

According to the first data transmitting device, the first data transmitting method, and the data transmitting device included in the first data transmitting and receiving system, a receiving-end device can receive a plurality of connection frames differing from each other in either one of modulation scheme and transfer rate. Even if the receiving-end device cannot normally receive one of the connection frames, the receiving-end device will likely normally receive the other connection frame different from that connection frame in either modulation scheme or transfer rate. Accordingly, the receiving-end device will likely be able to control the reception of the data frames in accordance with the normally received connection frame. The receiving-end device can properly receive the data frames in an environment where one of the connection frames is prone to noise.

The plurality of connection frames may include a connection frame modulated by a scheme according to which data values are represented by presence and absence of a pulse in a predetermined period and a connection frame modulated either by a scheme according to which values contained in the connection frame are represented by positions of pulses on a time axis in a predetermined period or by a scheme according to which values of data bits are not successively identical more than or equal to a predetermined number of times.

The modulation scheme according to which data values are represented by positions of pulses on a time axis in a predetermined period and the modulation scheme according to which values of data bits are not successively identical more than or equal to a predetermined number of times are less likely to be affected by noise than the modulation scheme according to which data values are represented by presence and absence of a pulse in a predetermined period. Therefore, according to the configuration, the data transmitting device is capable of transmitting a connection frame which is less likely to be affected by noise than transmitting only a connection frame modulated by a scheme according to which data values are represented by presence and absence of a pulse in a predetermined period.

The plurality of connection frames may include a connection frame modulated by RZI and a connection frame modulated by any one of 4 PPM, HHH (1,13), and 8B10B.

4 PPM and HHH (1,13) are modulation schemes according to which data values are represented by positions of pulses on a time axis in a predetermined period. 8B10B is a modulation scheme according to which values of data bits are not successively identical more than or equal to a predetermined number of times. RZI is a modulation scheme according to which data values are represented by presence and absence of a pulse in a predetermined period. Therefore, according to the configuration, the data transmitting device is capable of transmitting a connection frame which is less likely to be affected by noise than transmitting only a connection frame modulated by RZI.

The plurality of connection frames may include a connection frame modulated by RZI for a transfer rate of 9,600 bps and a connection frame modulated by RZI for a transfer rate higher than 9,600 bps.

The connection frame modulated by RZI for a transfer rate higher than 9,600 bps is less likely to be affected by noise than the connection frame modulated by RZI for a transfer rate of 9,600 bps. Therefore, according to the configuration, the data transmitting device is capable of transmitting a connection frame which is less likely to be affected by noise than transmitting only a connection frame modulated by RZI for a transfer rate of 9,600 bps.

A second data transmitting device of the present invention is characterized in that the data transmitting device includes: a modulating section for modulating frames to be transmitted to a data receiving device; and a transmitting section for transmitting the modulated frames to the data receiving device, wherein the data transmitting device transmits, to the data receiving device, a connection frame representing a transmission condition for data frames containing content information before transmitting the data frames to the data receiving device, the connection frame being modulated either by a scheme according to which values contained in the connection frame are represented by positions of pulses on a time axis in a predetermined period or by a scheme according to which values of data bits are not successively identical more than or equal to a predetermined number of times.

A second data transmitting method of the present invention is characterized in that the method includes the connection transmission step of transmitting, from a data transmitting device to a data receiving device, a connection frame representing a transmission condition for data frames containing content information before transmitting the data frames from the data transmitting device to the data receiving device, the connection frame being modulated either by a scheme according to which values contained in the connection frame are represented by positions of pulses on a time axis in a predetermined period or by a scheme according to which values of data bits are not successively identical more than or equal to a predetermined number of times.

A second data transmitting and receiving system of the present invention includes: a data transmitting device and a data receiving device, the data transmitting device including a modulating section for modulating frames to be transmitted to the data receiving device; and a transmitting section for transmitting the modulated frames to the data receiving device, the data transmitting device transmitting, to the data receiving device, a connection frame representing a transmission condition for data frames containing content information before transmitting the data frames to the data receiving device, the data receiving device receiving the connection frame and receiving the data frames according to the transmission condition communicated by the received connection frame, the connection frame being modulated either by a scheme according to which values contained in the connection frame are represented by positions of pulses on a time axis in a predetermined period or by a scheme according to which values of data bits are not successively identical more than or equal to a predetermined number of times.

The modulation scheme according to which data values are represented by positions of pulses on a time axis in a predetermined period and the modulation scheme according to which values of data bits are not successively identical more than or equal to a predetermined number of times are less likely to be affected by noise than the modulation scheme according to which data values are represented by presence and absence of a pulse in a predetermined period.

Therefore, according to the second data transmitting device, the second data transmitting methods and the second data transmitting and receiving system, a receiving-end device will likely normally receive the connection frame in an environment where the connection frame is prone to noise when compared with the conventional configuration in which a connection frame is transmitted by a modulation scheme according to which data values are represented by presence and absence of a pulse in a predetermined period (RZI).

The connection frame may be modulated by any one of 4 PPM, HHH (1,13), and 8B10B.

4 PPM and HHH (1,13) are modulation schemes according to which data values are represented by positions of pulses on a time axis in a predetermined period. 8B10B is a modulation scheme according to which values of data bits are not successively identical more than or equal to a predetermined number of times. Therefore, according to the configuration, a receiving-end device will likely normally receive the connection frame in an environment where the connection frame is prone to noise when compared with the conventional configuration in which a connection frame is transmitted by a modulation scheme according to which data values are represented by presence and absence of a pulse in a predetermined period (RZI).

The connection frame may have a transfer rate equal to that for IrDA-based FIR, and the data frames may have a transfer rate equal to that for IrDA-based FIR or IrDA-based VFIR.

According to the configuration, a receiving-end device will likely normally receive the connection frame and hence the data frames.

In the first or second data transmitting device, the connection frame may be transmitted using infrared as a transmission medium.

According to the configuration, the receiving-end device will likely be capable of properly receiving the connection frame in an environment where infrared noise tends to occur during transmission of the connection frame.

The connection frame may have an IrDA-based SNRM frame format.

According to the configuration, the connection frame has an IrDA-based SNRM frame format. That enables information, such as the transfer rate for the data frames and disconnection time, to be additionally included in the connection parameters for the SNRM frame. Accordingly, the transfer rate, the disconnection time, and other information during communications of data frames are obtainable by the data receiving device analyzing connection parameters for the SNRM frame.

The first and second data transmitting methods may be implemented on a computer. In that case, the present invention encompasses a data transmitting program executed on a computer to implement the data transmitting method by manipulating the computer to carry out the connection transmission step. The invention also encompasses a computer-readable storage medium containing the program.

A data receiving device of the present invention is characterized in that the data receiving device receives data frames containing content information from a data transmitting device which, before transmitting the data frames, transmits a connection frame representing a transmission condition for the data frames, wherein the data transmitting device either transmits the data frames according to a first transmission condition and the connection frame according to a second transmission condition differing from the first transmission condition in at least either one of modulation scheme and transfer rate or transmits the data frames according to the first transmission condition and the connection frame according to both the first transmission condition and the second transmission condition, the data receiving device includes: a receiving section for receiving frames from the data transmitting device; and a demodulating section for demodulating the frames received by the receiving section, wherein: in a reception standby state before receiving the connection frame, the receiving section is set up to receive a frame transmitted according to the first transmission condition, and the demodulating section is set up to demodulate the frame received by the receiving section according to the first transmission condition; and if the frame demodulated by the demodulating section is a data frame, the data receiving device receives and demodulates those data frames transmitted subsequently to that data frame according to the first transmission condition.

A data receiving method of the present invention is characterized in that the method involves receiving data frames containing content information from a data transmitting device which, before transmitting the data frames, transmits a connection frame representing a transmission condition for the data frames, wherein the data transmitting device either transmits the data frames according to a first transmission condition and the connection frame according to a second transmission condition differing from the first transmission condition in at least either one of modulation scheme and transfer rate or transmits the data frames according to the first transmission condition and the connection frame according to both the first transmission condition and the second transmission condition, the data receiving method includes: the reception step of receiving frames from the data transmitting device; and the demodulation step of demodulating the frames received in the receiving step, wherein: in a reception standby state before receiving the connection frame, the reception step is set up to receive a frame transmitted according to the first transmission condition, and the demodulation step is set up to demodulate the frame received in the reception step according to the first transmission condition; and if the frame demodulated in the demodulation step is a data frame, those data frames transmitted subsequently to that data frame are received and demodulated according to the first transmission condition.

A data transmitting and receiving system of the present invention is characterized in that the system includes: a data transmitting device and a data receiving device, the data transmitting device transmitting a connection frame representing a transmission condition for data frames containing content information before transmitting the data frames, the data receiving device receiving the data frames from the data transmitting device, wherein the data transmitting device either transmits the data frames according to a first transmission condition and the connection frame according to a second transmission condition differing from the first transmission condition in at least either one of modulation scheme and transfer rate or transmits the data frames according to the first transmission condition and the connection frame according to both the first transmission condition and the second transmission condition, the data receiving device includes: a receiving section for receiving frames from the data transmitting device; and a demodulating section for demodulating the frames received by the receiving section, wherein: in a reception standby state before receiving the connection frame, the receiving section is set up to receive a frame transmitted according to the first transmission condition, and the demodulating section is set up to demodulate the frame received by the receiving section according to the first transmission condition; and if the frame demodulated by the demodulating section is a data frame, the data receiving device receives and demodulates those data frames transmitted subsequently to that data frame according to the first transmission condition.

According to the data receiving device, the data receiving method, and the data transmitting and receiving system, in a reception standby state before receiving the connection frame, either the receiving section or the reception step is set up to receive a frame transmitted according to the first transmission condition, and either the demodulating section or the demodulation step is set up to demodulate the frame received according to the first transmission condition; and if the demodulated frame is a data frame, those data frames transmitted subsequently to that data frame are received and demodulated according to the first transmission condition. Accordingly, even when it is difficult to receive the connection frame transmitted according to the second transmission condition, the data frames transmitted according to the first transmission condition can be received with enhanced reliability.

The data receiving device of the present invention may further include: a frame analyzing section for detecting whether the frame demodulated by the demodulating section is a connection frame or a data frame; and a reception control section for controlling a reception condition for the receiving section and a demodulation condition for the demodulating section, wherein if the frame demodulated by the demodulating section is a connection frame, the reception control section controls the receiving section and the demodulating section to receive and demodulate the data frames transmitted after the connection frame according to a transmission condition for the data frames communicated by the connection frame.

According to the configuration, if the connection frame transmitted according to the first transmission condition is received, the data frames transmitted after the connection frame can be received and demodulated according to a transmission condition for the data frames communicated by the connection frame. Therefore, even in an environment where it is difficult to receive frames transmitted according to the second transmission condition, the data frames can be received in accordance with the connection frame transmitted according to the first transmission condition from the data transmitting device which transmits a connection frame according to both the first transmission condition and the second transmission condition. That improves reliability in data transmission/reception.

The receiving section may be capable of receiving only frames transmitted according to the first transmission condition; and the demodulating section may be capable of demodulating only frames transmitted according to the first transmission condition.

According to the configuration, even when it is difficult to receive the connection frame transmitted according to the second transmission condition, the data frames transmitted according to the first transmission condition can be received. That improves reliability in data reception. In addition, the receiving section and the demodulating section are always set up to receive and demodulate the frames transmitted according to the first transmission condition; there is no need to receive the connection frame. It is therefore easy to implement the receiving section and the demodulating section. Circuit size is smaller.

The data receiving device of the present invention may further include: a second receiving section for receiving frames from the data transmitting device; and a second demodulating section for demodulating the frames received by the second receiving section, wherein: in a reception standby state before receiving the connection frame, the second receiving section is set up to receive a frame transmitted according to the second transmission condition, and the second demodulating section is set up to demodulate the frame received by the second receiving section according to the second transmission condition; and if the frame demodulated by the second demodulating section is a connection frame, the reception control section controls either the receiving section or the second receiving section to receive the data frames transmitted after the connection frame according to a transmission condition for the data frames communicated by the connection frame and controls either the demodulating section or the second demodulating section to demodulate the data frames received by either the receiving section or the second receiving section according to a transmission condition for the data frames communicated by the connection frame.

According to the configuration, if the second receiving section and the second demodulating section can receive and demodulate the connection frame transmitted according to the second transmission condition, the data receiving device can receive the data frames transmitted after the connection frame according to the transmission condition for the data frames communicated by the connection frame. That further improves reliability in data reception.

The data receiving device may further include image display means for displaying an image from the data frames.

According to the configuration, when the data receiving device receives image data, the image display means can display images based on the image data.

As a modulation scheme, RZI may be used under the second transmission condition, and any one of 4 PPM, HHH (1,13), or 8B10B may be used under the first transmission condition.

RZI is known to generally be more prone to noise and produce more communications errors than 4 PPM, HHH (1,13), and 8B10B.

According to the configuration, even when it is difficult to receive the RZI-modulated connection frame due to noise, a frames can be received which is transmitted using any one of 4 PPM, HHH (1,13), and 8B10B which is less prone to noise and produce fewer communications errors than RZI. That further improves reliability in data reception.

The receiving section may receive frames transmitted from the data transmitting device using infrared as a transmission medium.

According to the configuration, the frames transmitted using infrared can be received. In addition, the data frames can be properly received even in an environment where the data frames are likely to be affected by infrared noise.

The data receiving method may be implemented on a computer. In that case, the present invention encompasses a data receiving program executed on a computer to implement the data receiving method by manipulating the computer to carry out the steps. The invention also encompasses a computer-readable storage medium containing the program.

As described in the foregoing, the first data transmitting device, the first data transmitting method, and the first data transmitting and receiving system of the present invention transmits, as the connection frames, a plurality of connection frames differing from each other in at least either one of modulation scheme and transfer rate.

Therefore, the receiving-end device will likely be able to control the reception of data frames in accordance with the normally received connection frame. The receiving-end device can properly receive the data frames in an environment where one of the connection frames is prone to noise.

The second data transmitting device, the second data transmitting method, and the second data transmitting and receiving system of the present invention transmits, as the connection frame, either a connection frame modulated by a scheme according to which values contained in the connection frame are represented by positions of pulses on a time axis in a predetermined period or a connection frame modulated by a scheme according to which values of data bits are not successively identical more than or equal to a predetermined number of times.

Therefore, the receiving-end device will likely normally receive the connection frame in an environment where the connection frame is prone to noise when compared with the conventional configuration in which a connection frame is transmitted by a modulation scheme according to which data values are represented by presence and absence of a pulse in a predetermined period (RZI).

In a reception standby state before receiving the connection frame, in the data receiving device of the present invention, the receiving section is set up to receive a frame transmitted according to the first transmission condition, and the demodulating section is set up to demodulate the frame received by the receiving section according to the first transmission condition; and if the frame demodulated by the demodulating section is a data frame, the data receiving device receives and demodulates those data frames transmitted subsequently to that data frame according to the first transmission condition.

Therefore, even when it is difficult to receive the connection frame transmitted according to the second transmission condition, the data frames transmitted according to the first transmission condition can be received. That improves reliability in data reception.

The present invention is applicable to any data transmitting device that transmits a connection frame containing a transmission condition for data frames prior to transmission of the data frames, any data receiving device that receives data from the data transmitting device, and any data transmitting and receiving system that includes the data transmitting device and the data receiving device.

The invention being thus described, it will be obvious that the same way may be varied in many ways. Such variations are not to be regarded as a departure from the spirit and scope of the invention, and all such modifications as would be obvious to one skilled in the art are intended to be included within the scope of the following claims.

What is claimed is:

1. A data transmitting device, comprising:
a modulating section for modulating frames to be transmitted to a data receiving device; and
a transmitting section for transmitting the modulated frames to the data receiving device,
wherein:
said data transmitting device transmits a plurality of connection frames to the data receiving device without receiving responses to the respective plurality of connection frames, the plurality of connection frames each representing a transmission condition for data frames containing content information before transmitting the data frames to the data receiving device, the plurality of connection frames differing from each other in at least either one of modulation scheme and transfer rate; and
a first connection frame of the plurality of connection frames is a connection frame modulated by a scheme according to which data values are represented by presence and absence of a pulse in a predetermined period.

2. The data transmitting device of claim 1, wherein a second connection frame of the plurality of connection frames is a connection frame modulated either by a scheme according to which values contained in the connection frame are represented by positions of pulses on a time axis in a predetermined period or by a scheme according to which values of data bits are not successively identical more than or equal to a predetermined number of times.

3. The data transmitting device of claim 2, wherein the plurality of connection frames include a connection frame modulated by RZI and a connection frame modulated by any one of 4 PPM, HHH (1,13), and 8B10B.

4. The data transmitting device of claim 2, wherein the second connection frame is modulated by any one of 4 PPM, HHH (1,13), and 8B10B.

5. The data transmitting device of claim 2, wherein:
the second connection frame has a transfer rate equal to that for IrDA-based FIR; and
the data frames have a transfer rate equal to that for IrDA-based FIR or IrDA-based VFIR.

6. The data transmitting device of claim 1, wherein the plurality of connection frames include a connection frame modulated by RZI for a transfer rate of 9,600 bps and a connection frame modulated by RZI for a transfer rate higher than 9,600 bps.

7. The data transmitting device of claim 1, wherein each of the plurality of connection frames is transmitted using infrared as a transmission medium.

8. The data transmitting device of claim 1, wherein each of the plurality of connection frames has an IrDA-based SNRM frame format.

9. A data receiving device receiving data frames containing content information from a data transmitting device which, before transmitting the data frames, transmits connection frames each representing a transmission condition for the data frames, wherein the data transmitting device transmits the data frames according to a first transmission condition and the connection frames according to both the first transmission condition and a second transmission condition without receiving responses to the respective connection frames,
the second transmission condition being a modulation scheme according to which data values are represented by presence and absence of a pulse in a predetermined period,
said data receiving device comprising:
a receiving section for receiving frames from the data transmitting device; and
a demodulating section for demodulating the frames received by the receiving section,
wherein:
in a reception standby state before receiving the connection frames, the receiving section is set up to receive a frame transmitted according to the first transmission condition, and the demodulating section is set up to demodulate the frame received by the receiving section according to the first transmission condition; and
if the frame demodulated by the demodulating section is a data frame, said data receiving device receives and demodulates those data frames transmitted subsequently to that data frame according to the first transmission condition.

10. The data receiving device of claim 9, further comprising:
a frame analyzing section for detecting whether the frame demodulated by the demodulating section is a connection frame or a data frame; and
a reception control section for controlling a reception condition for the receiving section and a demodulation condition for the demodulating section,
wherein
if the frame demodulated by the demodulating section is a connection frame, the reception control section controls the receiving section and the demodulating section to receive and demodulate the data frames transmitted after the connection frame according to a transmission condition for the data frames communicated by the connection frame.

11. The data receiving device of claim 9, wherein:
the receiving section is capable of receiving only frames transmitted according to the first transmission condition; and
the demodulating section is capable of demodulating only frames transmitted according to the first transmission condition.

12. The data receiving device of claim 11, further comprising:
a second receiving section for receiving frames from the data transmitting device; and
a second demodulating section for demodulating the frames received by the second receiving section,
wherein:
in a reception standby state before receiving the connection frames, the second receiving section is set up to receive a frame transmitted according to the second transmission condition, and the second demodulating section is set up to demodulate the frame received by the second receiving section according to the second transmission condition; and
if the frame demodulated by the second demodulating section is a connection frame, the reception control section controls either the receiving section or the second receiving section to receive the data frames transmitted after the connection frame according to a transmission condition for the data frames communicated by the connection frame and controls either the demodulating section or the second demodulating section to demodulate the data frames received by either the receiving section or the second receiving section according to a transmission condition for the data frames communicated by the connection frame.

13. The data receiving device of claim 9, further comprising an image display section for displaying an image from the data frames.

14. The data receiving device of claim 9, wherein as a modulation scheme, RZI is used under the second transmission condition, and any one of 4 PPM, HHH (1,13), or 8B10B is used under the first transmission condition.

15. The data receiving device of claim 9, wherein the receiving section receives frames transmitted from the data transmitting device using infrared as a transmission medium.

* * * * *